US012748766B2

(12) United States Patent
Sadr et al.

(10) Patent No.: US 12,748,766 B2
(45) Date of Patent: Sep. 29, 2026

(54) SEARCH PROCESSING BASED ON ROUTING PREDICTIONS FOR SEARCHING ACROSS LOCAL AND SERVER DATASETS

(71) Applicant: Google LLC, Mountain View, CA (US)

(72) Inventors: Arash Sadr, Belmont, CA (US); Timothy Youngjin Sohn, Los Altos, CA (US); Maryam Gholami, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/909,548

(22) Filed: Oct. 8, 2024

(65) Prior Publication Data

US 2026/0099501 A1 Apr. 9, 2026

(51) Int. Cl.
*G06F 16/248* (2019.01)
*G06F 9/54* (2006.01)

(52) U.S. Cl.
CPC ............ *G06F 16/248* (2019.01); *G06F 9/547* (2013.01)

(58) Field of Classification Search
None
See application file for complete search history.

(56) References Cited

U.S. PATENT DOCUMENTS 6,829,603 B1 * 12/2004 Chai .................... G06F 16/3344 707/999.005
11,574,634 B2 * 2/2023 Hussain .............. G10L 15/1822 707/737
2016/0227259 A1 * 8/2016 Brav ....................... H04N 23/69 707/999.005
2019/0370370 A1 * 12/2019 Wittern ............. G06F 16/24556 707/999.005
2020/0019628 A1 1/2020 Chen et al.
2021/0244332 A1 8/2021 Hagihara et al.
2023/0027713 A1 1/2023 Wu et al.
2023/0077508 A1 * 3/2023 Takemoto .......... G06V 10/7796 382/103
2024/0185001 A1 * 6/2024 Nagaraju .............. G06F 40/284 707/999.005

(Continued)

FOREIGN PATENT DOCUMENTS

WO WO-2025064877 A1 * 3/2025 ............. G06N 3/045

OTHER PUBLICATIONS

International Search Report and Written Opinion for PCT/US2024/032378, mailed on Sep. 26, 2024, 13 pages.

*Primary Examiner* — Yuk Ting Choi
(74) *Attorney, Agent, or Firm* — DORITY & MANNING, P.A.

(57) ABSTRACT

Systems and methods for performing user data search can include obtaining a search query, processing the search query with one or more machine-learned planning model to generate one or more specialized queries and instructions to search one or more specific user datasets with the one or more specialized queries, and processing the obtained search results with a generative response model to generate a response to the search query. The systems and methods can search across local databases and server databases. An on-device generative response model can be utilized for device local search results, while a server generative response model may be utilized for server-based search results.

10 Claims, 24 Drawing Sheets

(56) References Cited

U.S. PATENT DOCUMENTS

| | | | | |
|---|---|---|---|---|
| 2024/0281410 | A1* | 8/2024 | Williams | G06F 16/122<br>707/999.005 |
| 2024/0338554 | A1* | 10/2024 | Schmidt | G06N 3/045<br>707/737 |
| 2025/0190437 | A1* | 6/2025 | Hope | G06F 16/2455<br>707/999.005 |
| 2025/0238449 | A1* | 7/2025 | Sharma | G06F 16/33295<br>707/999.005 |

* cited by examiner

1110

SEARCH PROCESSING BASED ON ROUTING PREDICTIONS FOR SEARCHING ACROSS LOCAL AND SERVER DATASETS

FIELD

The present disclosure relates generally to user data search across different application service datasets. More particularly, the present disclosure relates to processing a user query with a planning model to generate specialized queries and instructions to search specific datasets and processing the search results with a generative model to generate a response.

BACKGROUND

Computing systems can struggle with handling search tasks across different applications, data types, and devices. In particular, search systems can struggle with identifying where to search, how to search across more complex data styles, and how to handle complex multi-part queries associated with user data search instances. Knowing what to search for and where to find such data can be a multi-part task that can be difficult for search systems. For example, data can be stored in separate data silos spread across different application storage files, different devices, and different server systems. A comprehensive search for information in this setting may rely on searching each different data silo separately, which may result in unnecessary and/or unfruitful searches being executed, resulting in wasted computational resources.

Additionally, the search results provided to the user may not be associated with the information and/or actions the user wants. In particular, the search results may be associated with tangential and/or irrelevant information. The search results may be one dimensional and may only include one type of information and/or one type of resource.

SUMMARY

Aspects and advantages of embodiments of the present disclosure will be set forth in part in the following description, or can be learned from the description, or can be learned through practice of the embodiments.

One example aspect of the present disclosure is directed to a computing system for cross-application search. The system can include one or more on-device generative response models tuned to process queries and result datasets to generate predicted responses. The one or more on-device generative response models can be stored on a user computing device. The system can include a memory comprising a plurality of different application-specific index datasets. The memory can be stored on the user computing device. The system can include one or more processors and one or more non-transitory computer-readable media that collectively store instructions that, when executed by the one or more processors, cause the computing system to perform operations. The operations can include obtaining a search query via the user computing device associated with a particular user. The operations can include transmitting the search query to one or more machine-learned planning models stored on one or more server computing systems. The one or more machine-learned planning models may have been tuned to determine one or more particular datasets to search of the plurality of different application-specific index datasets. The operations can include receiving, via the user computing device, one or more application programming interface calls from the one or more server computing systems. The one or more application programming interface calls can include instructions for searching the one or more particular datasets based on one or more refined queries generated with the one or more machine-learned planning models. The operations can include searching, at an operating system level of the user computing device, the one or more particular datasets based on the one or more refined queries to determine one or more search results. The operations can include processing the one or more search results and the search query with the one or more on-device generative response models to generate one or more model-generated responses and providing the one or more model-generated responses for display.

In some implementations, the operations can include obtaining location data from one or more location sensors of a user computing device. The one or more search results can be determined based on the location data. The operations can include processing the search query and the one or more search results with the machine-learned planning model to generate a follow-up planning output. The follow-up planning output can include instructions to transmit the search query and the one or more search results to the one or more on-device generative response models based on determining the one or more search results includes details descriptive of information that is directly responsive to the search query. In some implementations, the follow-up planning output can include one or more follow-up queries and instructions for searching one or more second datasets based on the one or more follow-up queries. The operations can further include: searching, at the operating system level of the user computing device, the one or more second datasets based on the one or more follow-up queries to determine one or more follow-up search results; processing the one or more search results, the one or more follow-up search results, and the search query with the one or more on-device generative response models to generate one or more second model-generated responses; and providing the one or more second model-generated responses for display.

In some implementations, the one or more on-device generative response models may have been trained via distillation learning with one or more teacher models. The one or more teacher models may have been trained based on a synthetic training dataset comprising a plurality of synthetic personal data associated with a synthetic user profile. A subset of parameters of the one or more on-device generative response models may have been fine-tuned on an on-device-specific training dataset while remaining parameters of the one or more on-device generative response models were fixed. The on-device-specific training dataset can include training examples specific to on-device search tasks.

In some implementations, the plurality of different application-specific index datasets may have been generated with one or more indexing engines. The one or more indexing engines can be configured to: obtain content data. The content data can be descriptive of at least one of: content provided for display to the particular user or content generated by the particular user. The one or more indexing engines can be configured to: process the content data to generate a centerpiece dataset descriptive of a central focus of the at least one of: content provided for display to the particular user or content generated by the particular user. The one or more indexing engines can be configured to: process the centerpiece dataset with one or more embedding models to generate one or more content embeddings and store the one or more content embeddings.

In some implementations, the one or more indexing engines can include one or more generative language models configured to process one or more content items to generate semantic understanding output and the one or more embedding models configured to generate feature representations based on at least one of the content items or the semantic understanding output. The one or more indexing engines can include one or more vision language models configured to process one or more images to generate one or more respective image captions to be embedded by the one or more embedding models. In some implementations, the one or more indexing engines can include one or more document understanding models tuned to process documents to generate document representations based on content features and layout features of the documents and one or more segmentation models tuned to segment portions of the documents based on the document representations.

Another example aspect of the present disclosure is directed to a computer-implemented method for personal data indexing and search. The method can include obtaining, by a computing system including one or more processors, a search query from a user computing device associated with a particular user. The method can include processing, by the computing system, the search query with one or more machine-learned planning models to generate one or more first application programming interface calls. The one or more first programming interface calls can include one or more first queries and instructions to interface with one or more first application-specific index datasets of a plurality of different application-specific index datasets. The method can include performing, by the computing system, the one or more first application programming interface calls to obtain one or more first result sets. The method can include processing, by the computing system, the search query and the one or more first result sets with the one or more machine-learned planning models to generate one or more second application programming interface calls. In some implementations, the one or more second programming interface calls can include one or more second queries and instructions to interface with one or more second application-specific index datasets of the plurality of different application-specific index datasets. The method can include performing, by the computing system, the one or more second application programming interface calls to obtain one or more second result sets. The method can include processing, by the computing system, the search query, the one or more first result sets, and the one or more second result sets with one or more generative response models to generate one or more model-generated responses to the search query. The one or more model-generated responses can include details of the one or more first result sets and the one or more second result sets in a natural language response to one or more prompts of the search query. The method can include transmitting, by the computing system, the one or more model-generated responses to the user computing device associated with the particular user.

In some implementations, the method can include obtaining, by the computing system, a plurality of personal datasets from a plurality of different applications associated with a plurality of different profiles associated with the particular user; processing, by the computing system, the plurality of personal datasets to generate the plurality of different application-specific index datasets; and storing, by the computing system, plurality of different application-specific index datasets in association with one or more personal identifiers associated with the particular user. The one or more personal identifiers can be associated with a centralized profile of the particular user. The centralized profile can include information descriptive of biographical data of the particular user. In some implementations, the one or more machine-learned planning models can be communicatively connected with the centralized profile. Predictions of the one or more machine-learned planning models can be conditioned on the information of the centralized profile.

In some implementations, the one or more first application programming interface calls can include instructions for interfacing with indexed email data associated with the particular user. The one or more second application programming interface calls can include instructions for interfacing with indexed image data associated with the particular user. The indexed image data may have been obtained from a native image gallery application on the user computing device.

Another example aspect of the present disclosure is directed to a server computing system for cross-application search. The system can include one or more machine-learned planning models configured to process a query to generate predicted planning data descriptive of particular tools to utilize and particular datasets to search and one or more server-side generative response models tuned to process queries and result datasets to generate predicted responses. The system can include a memory including a plurality of different application-specific index datasets. The plurality of different application-specific index datasets can be descriptive of personal data instances across a plurality of different application profiles associated with a particular user. The system can include one or more processors and one or more non-transitory computer-readable media that collectively store instructions that, when executed by the one or more processors, cause the computing system to perform operations. The operations can include obtaining a search query from a user computing device associated with the particular user. The operations can include processing the search query with the one or more machine-learned planning models to generate one or more refined queries and to determine one or more particular subsets of the plurality of different application-specific index datasets to search. The operations can include searching, via one or more personal data intelligence models based on one or more planning model outputs, the one or more particular subsets of the plurality of different application-specific index datasets based on the one or more refined queries to determine one or more search results. The operations can include processing the search query and the one or more search results with the one or more server-side generative response models to generate one or more model-generated responses to the search query. In some implementations, the one or more model-generated responses can include details of the one or more search results in a natural language response to a prompt of the search query. The operations can include transmitting the one or more model-generated responses to the user computing device associated with the particular user.

In some implementations, the system can include one or more application programming interfaces configured to interface with one or more application indexes based on outputs of the one or more machine-learned planning models. The one or more application programming interfaces can interface with the personal data intelligence model to perform the search of the one or more particular subsets of the plurality of different application-specific index datasets. The one or more particular subsets of the plurality of different application-specific index datasets can include an email index dataset and a photo gallery index dataset.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
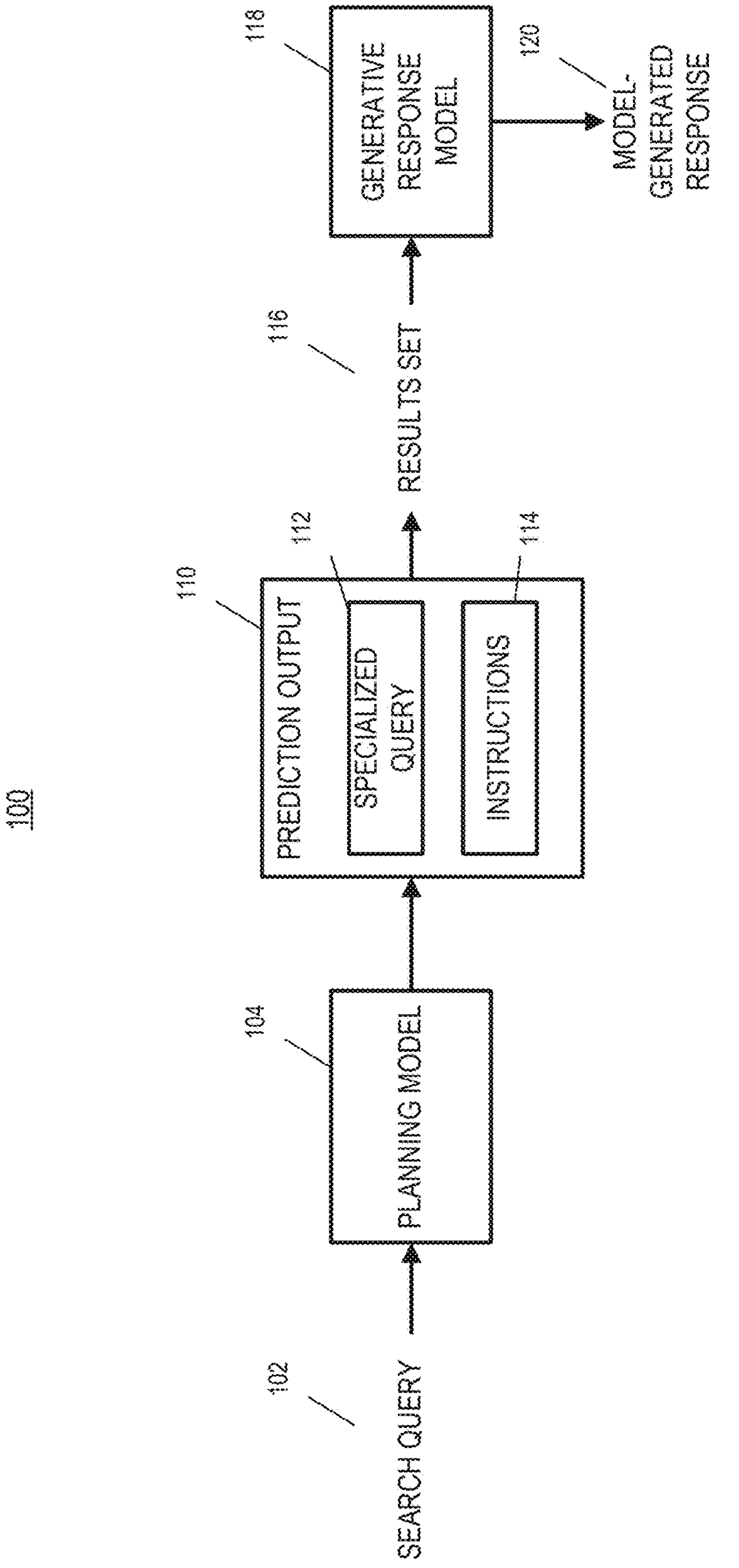
FIG. 1 depicts a block diagram of an example search routing system according to example embodiments of the present disclosure.

Reference numerals that are repeated across plural figures are intended to identify the same features in various implementations.

DETAILED DESCRIPTION

Generally, the present disclosure is directed to systems and methods for cross-application search for user-specific data. In particular, the systems and methods disclosed herein may utilize a hybrid architecture between on-device and server-side components for cross-application search across devices, instances, applications, surfaces, and/or profiles. In some implementations, the cross-application search system may include a tool use and planning model (e.g., a machine-learned planning model that may leverage a pre-trained large language model that has been tuned for complex search tasks and tool use interfacing), which determines the optimal data sources and search strategies based on the user's query and context. The planning model may generate refined queries (e.g., dataset-specific training and/or task-specific queries for handling at least a portion of the search task) and instructions for retrieving data from various sources, including on-device storage and/or server-side databases. The system may then retrieve the relevant data and aggregate the search result data into a single response using a generative response model, which can be either on-device or server-side depending on the complexity of the query, the type of data being searched, and/or the desired response quality. The system may also incorporate advanced indexing techniques, such as leveraging machine-learned document understanding models, generative language models, and/or other machine-learned models for determining a semantic understanding of the content being viewed and/or composed, then embedding the portions of the content and/or the semantic understanding output to then be indexed for future search instances.

The systems and methods disclosed herein may provide an interface that allows users to initiate searches with natural language queries (and/or other query types (e.g., a multi-modal query with images and audio)) and receive comprehensive and personalized results. The systems and methods may include features like proactive assistance and context-based content generation, which may further enhance the user experience and provide valuable insights into their personal data.

The systems and methods can include a computing system for cross-application search. The system may include one or more on-device generative response models tuned to process queries and result datasets to generate predicted responses. The one or more on-device generative response model can be stored on a user computing device. The system may include a memory that includes a plurality of different application-specific index datasets. The memory may be stored on the user computing device. The system may include one or more processors and one or more non-transitory computer-readable media that collectively store instructions that, when executed by the one or more processors, cause the computing system to perform operations. The operations may include obtaining a search query via the user computing device associated with a particular user. The operations may include transmitting the search query to one or more machine-learned planning models stored on one or more server computing systems. The one or more machine-learned planning models may have been tuned to determine one or more particular datasets to search of the plurality of different application-specific index datasets. The operations may include receiving, via the user computing device, one or more application programming interface calls from the one or more server computing systems. The one or more application programming interface calls can include instructions for searching the one or more particular datasets based on one or more refined queries generated with the one or more machine-learned planning models. The operations may include searching, at an operating system level of the user computing device, the one or more particular datasets based on the one or more refined queries to determine one or more search results. The operations may include processing the one or more search results and the search query with the one or more on-device generative response models to generate one or more model-generated responses.

The cross-search system can be leveraged for a plurality of different uses. For example, a user may be attempting to find details on a flight confirmation or an event invite. The user may know the flight confirmation is somewhere in their email, but the confirmation may be buried under years of other emails. In another example, a user may remember visiting a good restaurant but may not know where to find the restaurant. Therefore, the cross-search system may leverage location data search, web search, email search, message search, and/or restaurant log search to find the relevant information for determining the restaurant, obtaining the address, and providing the details to the user in an understandable format. In another example, a user may be researching a topic and may want to pull together information they've found across various web searches, emails, and/or other documents.

Computing systems can struggle with handling search tasks across different applications, data types, and devices. In particular, search systems can struggle with identifying where to search, how to search across more complex data styles, and how to handle complex multi-part queries associated with user data search instances. Knowing what to search for and where to find such data can be a multi-part task that can be difficult for search systems. For example, data can be stored in separate data silos spread across different application storage files, different devices, and different server systems. A comprehensive search for information in this setting may rely on searching each different data silo separately, which may result in unnecessary and/or unfruitful searches being executed, resulting in wasted computational resources.

The cross-application search system can leverage a hybrid architecture between on-device and server-side components. In particular, the cross-application search system can leverage a machine-learned planning model that can process a search query to generate one or more dataset specific queries and one or more instruction sets for interfacing with one or more particular index datasets based on predictions performed by the planning model. More specifically, the planning model can predict which application-specific index datasets to search based on the search query and can generate a specific query for each of the determined application-specific index datasets. The use of the planning model can efficiently determine and parallelize multi-part tasks to mitigate redundancy and limit excess dataset searches. The search result datasets can then be aggregated and processed with a generative response model to generate a model-generated response that is responsive to the search query while including the details determined from the searches.

Another feature of the cross-application search system can include performing on-device generative response generation when the index datasets being searched are stored on-device, which can reduce transmittal cost and latency while maintaining user privacy. For example, the planning model output may include instructions for searching one or more on-device datasets local to the user computing device. The system can search the one or more on-device datasets then process the search result data with an on-device generative model to mitigate the transmission cost and keep the on-device data private to the device.

Additionally, the cross-application search system can efficiently embed and index different content items based on performing a centerpiece determination, performing image captioning for images, and embedding the resulting text, which can reduce the cost of indexing complex web pages, emails, or other content items, while being inclusive of key content features. For example, the system can perform content segmentation before embedding and indexing the content to avoid embedding and indexing irrelevant information, which may include advertisements, secondary content, and/or non-pertinent user interface features.

Moreover, searching across a user-specific application data can be difficult as the information is scattered across various applications and devices. Information can be spread across different profiles, applications, dates, and/or mediums. Users may have conversations with the same person across multiple messaging services, may share pictures via a plurality of different applications, and/or may keep track of events using a plurality of different applications.

The cross-application search system can leverage a hybrid architecture between on-device and server-side components. The system can enable users to search through their personal data, including emails, photos, location history, search history, browsing history, and/or other application data, with a single query. In particular, the cross-search system may leverage the planning model to generate a plurality of different application programming interface calls to search a plurality of different application-specific index datasets.

For example, the different application programming interface calls may be configured to interface with different application indexes based on outputs of the one or more machine-learned planning models. In some implementations, the one or more application programming interfaces may interface with the personal data intelligence model to perform the search of a subset of application-specific index datasets provided by a suite of different services (e.g., a particular platform may provide email services, image gallery services, and/or search services that may be searched to determine relevant information for responding to the initial user query). Additionally and/or alternatively, one or more of the application programming interface calls may include instructions for interfacing with indexed datasets at an operating system level of a user computing device and/or interfacing with applications on a device to search localized application data. The cross-search system may then retrieve the relevant data and aggregate it into a single response using a generative response model, which can be either on-device or server-side depending on the complexity of the query, the type of data being searched, and/or the desired response quality.

The user data search system can be leveraged to index user data and search across applications and systems while maintaining user privacy. The user data search system can handle complex search tasks that may rely on multiple search instances and may generate a model-generated response based on the obtained search result data.

The systems and methods can be leveraged to navigate the vast information stored across the user's different applications, local files, profiles, and/or other services. In particular, the systems and methods can allow users to uncover forgotten emails, documents, photos, receipts, and/or notes that hold valuable information or sentimental value. Additionally and/or alternatively, the systems and methods can analyze a user's data to identify trends, patterns, and/or connections the user may have missed. The systems and methods can maintain user privacy by keeping the user data secure and private, without relying on external servers or cloud services, which can include leveraging on-device models to mitigate the transmission of personal data. The systems and methods can optimize productivity by quickly finding the information the user requests, in real-time, without being distracted by irrelevant online results.

A user may provide a query (e.g., provide a voice command asking a question), such as "How much did I spend on my trip?" The particular task may rely on multiple pieces of data, such that the flow starts with a tool use and planning model. The tool use and planning model may sit server-side on the model size, device processing capabilities, and/or latency. The output of the tool use and planning model may include "User may need to search in user location data, photos, and email." The device may then know that there are multiple places on the device that are to be searched to perform the requested task. For location data, which sits on the device, the device may collect location log data, obtain search log data of a map application, and/or query metadata of captured images and/or messages. For photos and email, a server-side query may be issued to grab the data from those services. Within photos and email, individual components may be leveraged for the search capability, such as image embeddings for photos. While email may not have text embeddings, the system may process and embed the email and/or details associated with the emails. The planning model may turn a natural language query into a specific query. The email search can operate with labels, such as "category purchases" or "category travel," which can improve search results. The relevant data can then be then returned to the client device and/or a server-side generative response model, which can combine different search result data sets into a single response using an on-device model or a server-side model. The process may be run server-side, user device-side, and/or a hybrid approach. Both first-party and third-party data may be indexed to make the data accessible for retrieval and ranking when a user issues a query. The indexing may be performed and/or stored locally and/or server-side.

The system can include a hyper-personalized search engine for searching across first party data and/or third party data for which the user grants permission for to the search engine. The systems and methods can leverage a user's vast profile data ecosystem (e.g., search history, browsing history, emails, texts, purchase history, social media accounts, etc.) to understand a user's interests, preferences, habits, and/or context in real-time. This understanding can fuel a search experience that's uniquely tailored to the user at any given moment.

In some implementations, the systems and methods can include a personal search scoped to a user's personal data corpus. For example, the search system can search through a user's personal data (which can include a user granting permissions to the system to search one or more datasets/indexes) across apps and services provided by a platform (or system) associated with the search system and/or third party platforms (or third party systems), as well as a user's own on-device data to answer any questions the user may have. The personal search can be directed to the user's personal data and public web sphere.

The systems and methods can be configured for privacy first and may provide users with transparency and a plurality of options to choose. The personalized search engine can become a personal knowledge assistant, expertly navigating the vast information stored across platform services and local files. The systems and methods can provide an interface for users to rediscover "lost" information (e.g., uncover forgotten emails, documents, photos, receipts, and notes that hold valuable information or sentimental value), gain insights (e.g., analyze your data to identify trends, patterns, and connections a user might have missed), maintain privacy (e.g., keep a user's data secure and private, without relying on external servers or cloud services), and optimize productivity (e.g., quickly find the information a user requests, without being distracted by irrelevant online results).

The search system can search across user data on first party platforms, search across user data on third party platforms, search across user data on local indexes, perform contextual searches, generate contextual insights, generate personalized recommendations, perform proactive insights, perform natural language processing, provide privacy controls, generate artificial intelligence-based insights, perform smart tagging, and/or perform cross-device syncing.

The search across user data on first party platforms can include a search engine that seamlessly connects and analyzes data from a search application, a browser application, an email application, a photo application, a calendar application, a file storage application, a map application, a video player application, a news application, a smart home application, and/or other applications. The search of the search application can include processing a user search history (e.g., downloading a record of user searches, including queries, timestamps, and clicked results) and/or tracking and processing web/app activity (e.g., extracting data about user activity across different services, including searches, visited websites, and/or app usage). The search of the browser application can include processing browser history data, interactions, web progressions, and/or other data, which may include downloading data, determining key information, and indexing the key information.

The search of the email application can include identifying important contacts, upcoming events, travel plans, etc. The search system may download all or a portion of the emails, including attachments, labels, and metadata. The search system may download a user contact list, including names, email addresses, phone numbers, and other details. In some implementations, the search system may download and/or determine user calendar events, including descriptions, locations, and invitees. In some implementations, the search system may download and/or determine user tasks and associated details. The search system may determine and/or download receipts and shipping details.

The search of the photo application can include recognizing people the user knows in the images and recognizing the places the user has been based on the images. The person and location recognitions can then be utilized to adjust one or more knowledge graphs associated with the user (e.g., to update information known about the user). The search of the photo application can include downloading user photos and videos, including metadata like creation date, location (if enabled), and camera information. The search system may determine and/or download user albums and their contents. In some implementations, the search system may determine and/or download photos and videos from shared albums a user created or is a part of.

The search system may interact with a calendar application to understand a user's daily schedule, meetings, free time, etc. The search system may interact with a file storage/creation application to recognize documents a user may work on and/or recognize topics a user researches.

In some implementations, the search system may interface with a maps application to determine a user location, determine places a user frequents, and/or determine user commute routes. Interfacing with the map application may include downloading a timeline of a user location history (if enabled), including timestamps and visited places. The search system may determine and store a list of places a user has saved in the maps application. In some implementations, the search system may download reviews and ratings a user has given to places on the map platform. Additionally and/or alternatively, the search system may download photos and videos a user has added to the map platform.

The search system may interface with a video application to learn a user's video preferences and the channels the user follows. The search system may interface with a news application to track topics a user reads about and may learn a user's news interests. In some implementations, the search system may interface with a smart home application to learn about the people in the user's home (e.g., determine the active periods in the home and/or user preferences).

The search across user data on third party platforms can include searching across financial applications, music streaming applications, third party browser applications, third party photo applications, third party messaging applications, third party photo applications, and/or other third party applications.

The systems and methods disclosed herein can perform local indexing. The local indexing may include an engine generating a comprehensive index of user data, including: server-based services datasets (e.g., emails, calendar events, contacts, drive documents, photos, etc.), local files (e.g., documents, PDFs, images, videos, music, and other file types), and/or device data (e.g., text messages, call logs, notes, etc. (with the user's permission)).

In some implementations, the systems and methods can perform contextual search, which may include a non-user data search. The search results may be adapted based on a time of day (e.g., prioritize morning news in the AM and/or dinner recipes in the PM), a location (e.g., recommend nearby restaurants, local events, and/or weather updates), recent activities (e.g., if a user just booked a flight and/or shows hotel options at a user destination), and/or current tasks (e.g., if a user is working on a presentation, the system may suggest relevant templates).

In some implementations, the systems and methods can perform contextual insights. The contextual insight may include a timeline view (e.g., visualize how information and events connect over time) and/or a summarization (e.g., generates a summary of long documents and/or email threads).

Additionally and/or alternatively, the systems and methods can determine and provide personalized recommendations. For example, the systems and methods may recommend news articles (aligned with user interests and/or avoiding topics a user dislikes), videos (from channels a user prefers, filtered by user preferred genres), applications (based on recent user usage data and needs), and/or products (e.g., products tailored to past user purchases and/or browsing history).

The systems and methods can perform proactive assistance. For example, the proactive assistance can include reminding the user of upcoming events, birthdays, bill payments, etc. In some implementations, the proactive assistance can include alerting a user about traffic delays on usual user routes. The systems and methods may suggest relevant documents when a user starts a new email draft. In some implementations, the systems and methods may offer personalized travel tips based on upcoming trips.

The systems and methods may leverage natural language processing techniques to understand complex queries like "Find me a good Italian restaurant near my office that's open now".

In some implementations, the search system may provide privacy controls that give users full control over what data is used and how the data is shared. The search system may perform some or all data processing locally on the user device. The user may control what data is indexed and how the indexed data is used. The user may choose a setting to have no data sent to external servers or shared with third parties.

In some implementations, the search system may generate AI-powered insights by analyzing user search patterns to offer insights about user habits and preferences. Additionally and/or alternatively, the search system may perform smart tagging to automatically tag files and information based on content, making the information easier to find later. The search system may perform cross-device syncing to access user indexed data from any of the user devices associated with a user.

The systems and methods of the present disclosure provide a number of technical effects and benefits. As one example, the system and methods can provide a search results interface that includes search results from a plurality of datasets in which the search results include search results determined based on a prediction by a machine-learned planning model, an application programming interface, and an embedding. The search results may be based on embedding similarity and/or a learned distribution to provide visually similar search results regardless of the dataset searched. The systems and methods may utilize the same and/or similar learned embeddings paces across different datasets, which may include using the same and/or similar embedding models across different datasets.

Another technical benefit of the systems and methods of the present disclosure is the ability to leverage context data to determine a specialized dataset to search. For example, the systems and methods disclosed herein can obtain and/or determine context data that can then be utilized to determine a specific specialized database (e.g., an email database, a local database, and/or a social media database) to search using a planning model, APIs, and embedding-based search techniques. The specialized database search may be performed with a generative model processing the search results to provide a formatted and directed response to the original user query.

Another example of technical effect and benefit relates to improved computational efficiency and improvements in the functioning of a computing system. For example, the cross-application search system can leverage a hybrid architecture between on-device and server-side components. In particular, the cross-application search system can leverage a machine-learned planning model that can process a search query to generate one or more dataset specific queries and one or more instruction sets for interfacing with one or more particular index datasets based on predictions performed by the planning model. More specifically, the planning model can predict which application-specific index datasets to search based on the search query and can generate a specific query for each of the determined application-specific index datasets. The use of the planning model can efficiently determine and parallelize multi-part tasks to mitigate redundancy and limit excess dataset searches. The search result datasets can then be aggregated and processed with a generative response model to generate a model-generated response that is responsive to the search query while including the details determined from the searches.

Another feature of the cross-application search system can include performing on-device generative response generation when the index datasets being searched are stored on-device, which can reduce transmittal cost and latency while maintaining user privacy.

Additionally and/or alternatively, the cross-application search system can efficiently embed and index different content items based on performing a centerpiece determination, performing image captioning for images, and embedding the resulting text, which can reduce the cost of indexing complex web pages, emails, or other content items, while being inclusive of key content features.

With reference now to the Figures, example embodiments of the present disclosure will be discussed in further detail.

FIG. 1 depicts a block diagram of an example search routing system 100 according to example embodiments of the present disclosure. In some implementations, the search routing system 100 is configured to receive, and/or obtain, a search query 102 descriptive of a request for information associated with one or more datasets and, as a result of receipt of the search query 102, generate, determine, and/or provide a model-generated response 120 that is descriptive of a response to the search query 102 while including details determined from a results set 116. Thus, in some implementations, the search routing system 100 can include a planning model 104 that is operable to generate a prediction output 110 that generates a specialized query 112 and routes the query to be utilized to search one or more particular databases based on generated instructions 114.

In particular, the search routing system 100 can obtain a search query 102 from a user computing device. The search query 102 can be descriptive of a request for information associated with one or more datasets. The search query 102 can include a natural language query, a text query, a voice query, an image query, and/or other types of queries. The search query 102 may be obtained via a graphical user interface, an ambient retrieval, a microphone, and/or other input medium. The search query 102 may be formatted as a question, a command, and/or another format. The search query 102 may be open-ended or directed. In some implementations, the search query 102 may include a request that is reliant on retrieving an initial set of information then determining the follow-up actions for retrieving the information necessary to respond to the request. The search query 102 may be associated with a task that may be reliant on querying a plurality of different indexed datasets.

The search routing system 100 can transmit the search query 102 to a server computing system that then processes the search query 102 with a machine-learned planning model 104 (e.g., a tool use and planning model). The machine-learned planning model 104 can be operable to process the search query 102 to generate a prediction output 110 that includes a specialized query 112 and instructions 114 descriptive of an application programming interface call that routes the specialized query 112 to be utilized to search one or more particular databases. The machine-learned planning model 104 can include a generative model tuned to perform query generation and search routing predictions. In some implementations, the machine-learned planning model 104 can include a neural network, such as a transformer neural network. The machine-learned planning model 104 can include a pre-trained large language model (LLM) tuned to perform search routing tasks.

The instructions 114 may then be executed by one or more processors (and/or one or more application programming interfaces (APIs)) to search one or more particular databases with the specialized query 112 to determine one or more results sets 116. The instructions 114 may include a code, a generated application programming interface call, and/or other data types. The specialized query 112 may be formatted to be compatible with the datasets being searched and may be formatted to be directed at a given task predicted by the machine-learned planning model 104. The one or more results sets 116 may include one or more search results that are determined based on the specialized query 112. In some implementations, the one or more results sets 116 may include details obtained from emails, texts, user profiles, viewed web pages, and/or other information sources.

The search routing system 100 can then process the one or more results sets 116 and the search query 102 with a generative response model 118 to generate a model-generated response 120 that is descriptive of a response to the search query 102 while including details determined from the results set 116. The generative response model 118 can include a pre-trained generative model tuned to generate a structured response to the search query 102 with information gleaned from the one or more results sets 116. In some implementations, the generative response model 118 can include a neural network, such as a transformer neural network. The generative response model 118 may be stored on the user computing device and/or on the server. For example, the search routing system 100 may include an on-device generative response model and a server-side generative response model in which the on-device generative response model may be leveraged in some instances, while the server-side generative response model may be leveraged in other instances. In particular, if the results sets 116 are obtained from datasets stored locally on the user computing device, the on-device generative response model may be utilized. Additionally and/or alternatively, the server-side generative response model may be utilized for complex tasks.

The model-generated response 120 may include a structured output, which may include an information graphic, a table, a list, an itinerary, a calendar invite, etc. The model-generated response 120 may be provided back to the user (e.g., via the user computing device and/or other computing device.

Figure 2:
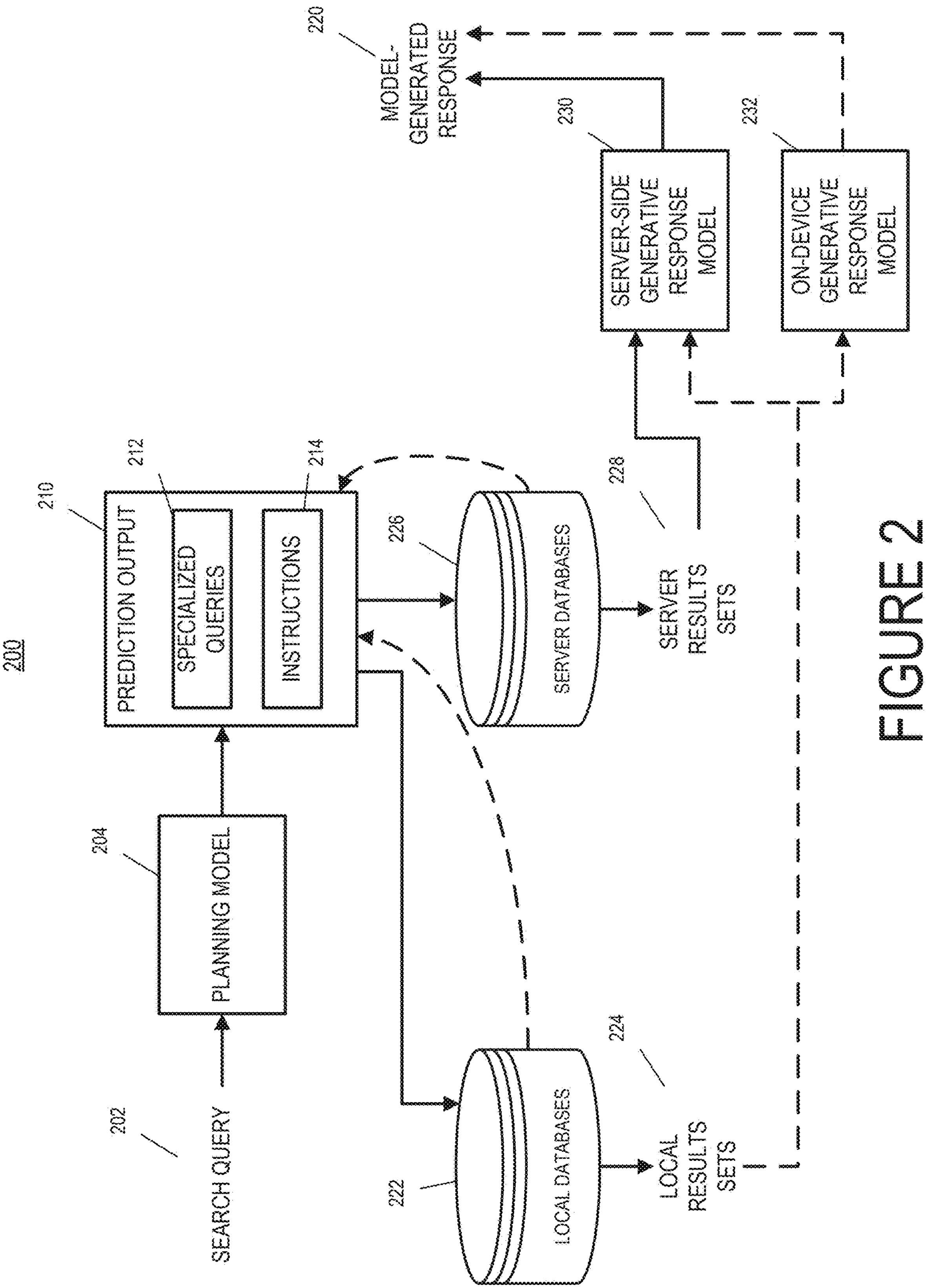
FIG. 2 depicts a block diagram of an example multi-database search system according to example embodiments of the present disclosure.

FIG. 2 depicts a block diagram of an example multi-database search system 200 according to example embodiments of the present disclosure. The multi-database search system 200 is similar to search routing system 100 of FIG. 1 except that the multi-database search system 200 further includes local databases 222, server databases 226, a server-side generative response model 230, and an on-device generative response model 232.

In particular, the multi-database search system 200 can obtain a search query 202 from a user computing device. The search query may include a question and/or command associated with retrieving user information associated with user data possibly stored in one or more different databases, which may include local databases 222 and/or server databases 226. In some implementations, the search query 202 may be descriptive of a request for information that is reliant on a plurality of different tasks being performed with the data then aggregated and processed to generate a response.

The search query 202 can be descriptive of a request for information associated with one or more datasets. The search query 202 can include a natural language query, a text query, a voice query, an image query, and/or other types of queries. The search query 202 may be obtained via a graphical user interface, an ambient retrieval, a microphone, and/or other input medium. The search query 202 may be formatted as a question, a command, and/or another format. The search query 202 may be open-ended or directed. In some implementations, the search query 202 may include a request that is reliant on retrieving an initial set of information then determining the follow-up actions for retrieving the information necessary to respond to the request. The search query 202 may be associated with a task that may be reliant on querying a plurality of different indexed datasets.

The multi-database search system 200 can transmit the search query 202 to a server computing system that then processes the search query 202 with a machine-learned planning model 204 (e.g., a tool use and planning model). The machine-learned planning model 204 can be operable to process the search query 202 to generate a prediction output 210 that includes one or more specialized queries 212 and instructions 214 descriptive of one or more application programming interface calls that route the specialized queries 212 to be utilized to search one or more particular databases. The machine-learned planning model 204 can include a generative model tuned to perform query generation and search routing predictions. In some implementations, the machine-learned planning model 204 can include a neural network, such as a transformer neural network. The machine-learned planning model 204 can include a pre-trained large language model (LLM) tuned to perform search routing tasks.

In some implementations, the prediction output 210 can include a plurality of model-generated task-specific queries and a plurality of different application programming interface calls associated with the plurality of model-generated task-specific queries. For example, the plurality of specialized queries 212 and the instruction sets 214 may include a first specialized query and an email API call to search an email index dataset with the first specialized query, a second specialized query and a text API call to search a messaging index dataset with the second specialized query, a third specialized query and a browsing history API call to search a user browsing history index dataset with the third specialized query, a fourth specialized query and a calendar API call to search a calendar index dataset with the fourth specialized query, and/or other specialized query and API call.

The instructions 214 may then be executed by one or more processors (and/or one or more application programming interfaces (APIs)) to search one or more particular databases with the one or more specialized queries 212 to determine one or more results sets. The instructions 214 may include a code, a generated application programming interface call, and/or other data types. The specialized queries 212 may be formatted to be compatible with the datasets being searched and may be formatted to be directed at a given task predicted by the machine-learned planning model 204. The one or more results sets may include one or more search results that are determined based on the specialized query 212. In some implementations, the one or more results sets may include details obtained from emails, texts, user profiles, viewed web pages, and/or other information sources.

In particular, the prediction output 210 may cause the one or more specialized queries 212 to be utilized to search one or more local databases 222 and/or one or more server databases 226. For example, one or more particular specialized queries may be utilized to search one or more local databases 222 to determine one or more local results sets. The one or more particular specialized queries and/or one or more other specialized queries may be utilized to search one or more server databases 226 to determine one or more server results sets 228. The one or more local databases 222 may include native application data, user profile data, first party app data, third party data, operating system held data, and/or other data. The one or more server databases 226 may include web platform data, application services data, social media data, email data, calendar data, browser history data, search history data, and/or other data. The one or more local results sets 224 may include notes data, messaging data, smart home data, location data, image gallery data, and/or other data. The one or more server results sets 228 may include email data, calendar data, server image gallery data, social media data, search history data, browsing history data, web messaging data, web platform data, and/or other data.

The multi-database search system 200 can then process the one or more results sets (e.g., the one or more local results sets 224 and/or one or more server results sets 228) and the search query 202 with a generative response model to generate a model-generated response 220 that is descriptive of a response to the search query 202 while including details determined from the results set. The generative response model can include a pre-trained generative model tuned to generate a structured response to the search query 202 with information gleaned from the one or more results sets 216. In some implementations, the generative response model can include a neural network, such as a transformer neural network.

The generative response model may be stored on the user computing device and/or on the server. For example, the multi-database search system 200 may include an on-device generative response model 232 and a server-side generative response model 230 in which the on-device generative response model 232 may be leveraged in some instances, while the server-side generative response model 230 may be leveraged in other instances. In particular, if the results sets are obtained from datasets stored locally on the user computing device, the on-device generative response model 232 may be utilized (e.g., the one or more local results sets 224 may be maintained on device to maintain privacy and generate the model-generated response 220 locally). Additionally and/or alternatively, the server-side generative response model 230 may be utilized for complex tasks and/or more computationally expensive tasks.

The model-generated response 220 may be provided for display via one or more graphical user interfaces. In some implementations, the model-generated response 220 may be provided in a dialogue format such that the model-generated response 220 appears as a dialogue response to a "user message" that includes the search query 202. The model-generated response 220 may include a structured output, which may include an information graphic, a table, a list, an itinerary, a calendar invite, etc. The model-generated response 220 may be provided back to the user (e.g., via the user computing device and/or other computing device.

Figure 3:
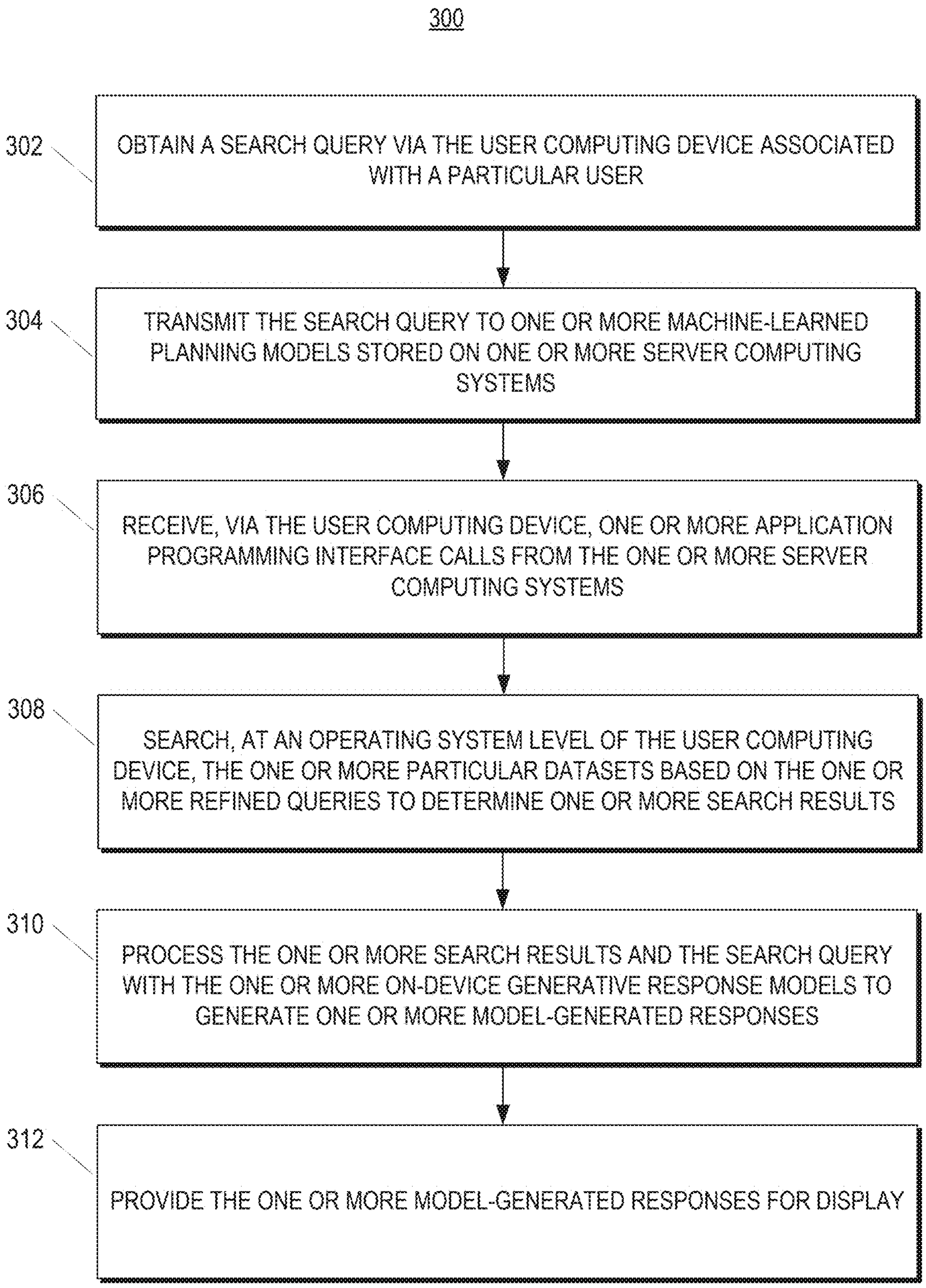
FIG. 3 depicts a flow chart diagram of an example method to perform device-side search processing according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain a search query via the user computing device associated with a particular user. The search query can include text data, image, data, audio data, latent encoding data, location data, multimodal data, and/or other data. The search query can be descriptive of a general question associated with multiple data instances (e.g., "Where have I eaten in Chicago during my three trips?", "How much money have I spent on bags over the past two years?", "Between all communication methods, how many messages have I sent to John and what were they about?", etc.) and/or specific instance questions (e.g., "What was our booking number for the hotel reservation next week?", "Where did we go on our anniversary last year?", "What was the last movie I watched?", etc.).

At 304, the computing system can transmit the search query to one or more machine-learned planning models stored on one or more server computing systems. The one or more machine-learned planning models may have been tuned to determine one or more particular datasets to search of the plurality of different application-specific index datasets. A plurality of different application-specific index datasets may be stored in the memory of the computing system. The memory may be stored on the user computing device. The one or more machine-learned planning models can include a pre-trained large language model tuned to perform dataset predictions and task-specific query generation. The tuning may include a labeled training dataset, reinforcement based learning, fixing a large subset of the model parameters while only tuning the remaining parameters, soft prompt tuning, and/or other tuning techniques.

At 306, the computing system can receive, via the user computing device, one or more application programming interface calls from the one or more server computing systems. The one or more application programming interface calls can include instructions for searching the one or more particular datasets based on one or more refined queries generated with the one or more machine-learned planning models. The one or more application programming interfaces may be communicatively connected with the one or more machine-learned planning models, such that the calls may be performed without user input. The one or more application programming interfaces may be configured to generally interface with a plurality of different applications and/or may be specialized to specific applications and/or datasets.

At 308, the computing system can search, at an operating system level of the user computing device, the one or more particular datasets based on the one or more refined queries to determine one or more search results. The one or more search results may be determined with an embedding-based search, a keyword search, and/or other search techniques. The search may be performed via the one or more processors of the user computing device. The search may be performed without any further interfacing with resources outside of the resources on-device.

In some implementations, the computing system can obtain location data from one or more location sensors of a user computing device. The one or more search results may be determined based on the location data. The one or more location data may be determined based on global positioning system (GPS) sensors, proximity sensors, cell tower triangulation, and/or other location determination techniques. The location data may be encoded and leveraged to condition the determination of the one or more machine-learned planning models and/or the one or more generative response models.

At 310, the computing system can process the one or more search results and the search query with the one or more on-device generative response models to generate one or more model-generated responses. One or more on-device generative response models can be tuned to process queries and result datasets to generate predicted responses. The one or more on-device generative response model can be stored on a user computing device. The one or more on-device generative response models can include one or more language models (e.g., an autoregressive language model), one or more vision language models, one or more image generation models (e.g., a text-to-image diffusion model), and/or one or more other generative models.

In some implementations, the one or more on-device generative response models may have been trained via distillation learning with one or more teacher models. The one or more teacher models may have been trained based on a synthetic training dataset comprising a plurality of synthetic personal data associated with a synthetic user profile. In some implementations, a subset of parameters of the one or more on-device generative response models may have been fine-tuned on an on-device-specific training dataset while remaining parameters of the one or more on-device generative response models were fixed. The on-device-specific training dataset can include training examples specific to on-device search tasks.

At 312, the computing system can provide the one or more model-generated responses for display. The one or more model-generated responses may be provided for display in a search results interface, a virtual assistant interface, a pop-up interface, and/or other interface. The one or more model-generated responses may cause the user computing device to perform one or more actions, which may include booking a reservation, generating audio feedback, composing a message to another user, opening a particular application, and/or other actions.

In some implementations, the computing system can process the search query and the one or more search results with the machine-learned planning model to generate a follow-up planning output. The follow-up planning output can include instructions to transmit the search query and the one or more search results to the one or more on-device generative response models based on determining the one or more search results includes details descriptive of information that is directly responsive to the search query.

In some implementations, the follow-up planning output can include one or more follow-up queries and instructions for searching one or more second datasets based on the one or more follow-up queries. The computing system can search, at the operating system level of the user computing device, the one or more second datasets based on the one or more follow-up queries to determine one or more follow-up search results, process the one or more search results, the one or more follow-up search results, and the search query with the one or more on-device generative response models to generate one or more second model-generated responses, and provide the one or more second model-generated responses for display.

In some implementations, the plurality of different application-specific index datasets may have been generated with one or more indexing engines. The one or more indexing engines can be configured to: obtain content data. The content data can be descriptive of at least one of: content provided for display to the particular user or content generated by the particular user. The one or more indexing engines can be configured to: process the content data to generate a centerpiece dataset descriptive of a central focus of the at least one of: content provided for display to the particular user or content generated by the particular user. The one or more indexing engines can be configured to: process the centerpiece dataset with one or more embedding models to generate one or more content embeddings and store the one or more content embeddings.

Additionally and/or alternatively, the one or more indexing engines can include one or more generative language models configured to process one or more content items to generate semantic understanding output and the one or more embedding models configured to generate feature representations based on at least one of the content items or the semantic understanding output. The one or more indexing engines can include one or more vision language models configured to process one or more images to generate one or more respective image captions to be embedded by the one or more embedding models. In some implementations, the one or more indexing engines can include one or more document understanding models tuned to process documents to generate document representations based on content features and layout features of the documents and one or more segmentation models tuned to segment portions of the documents based on the document representations.

Figure 4:
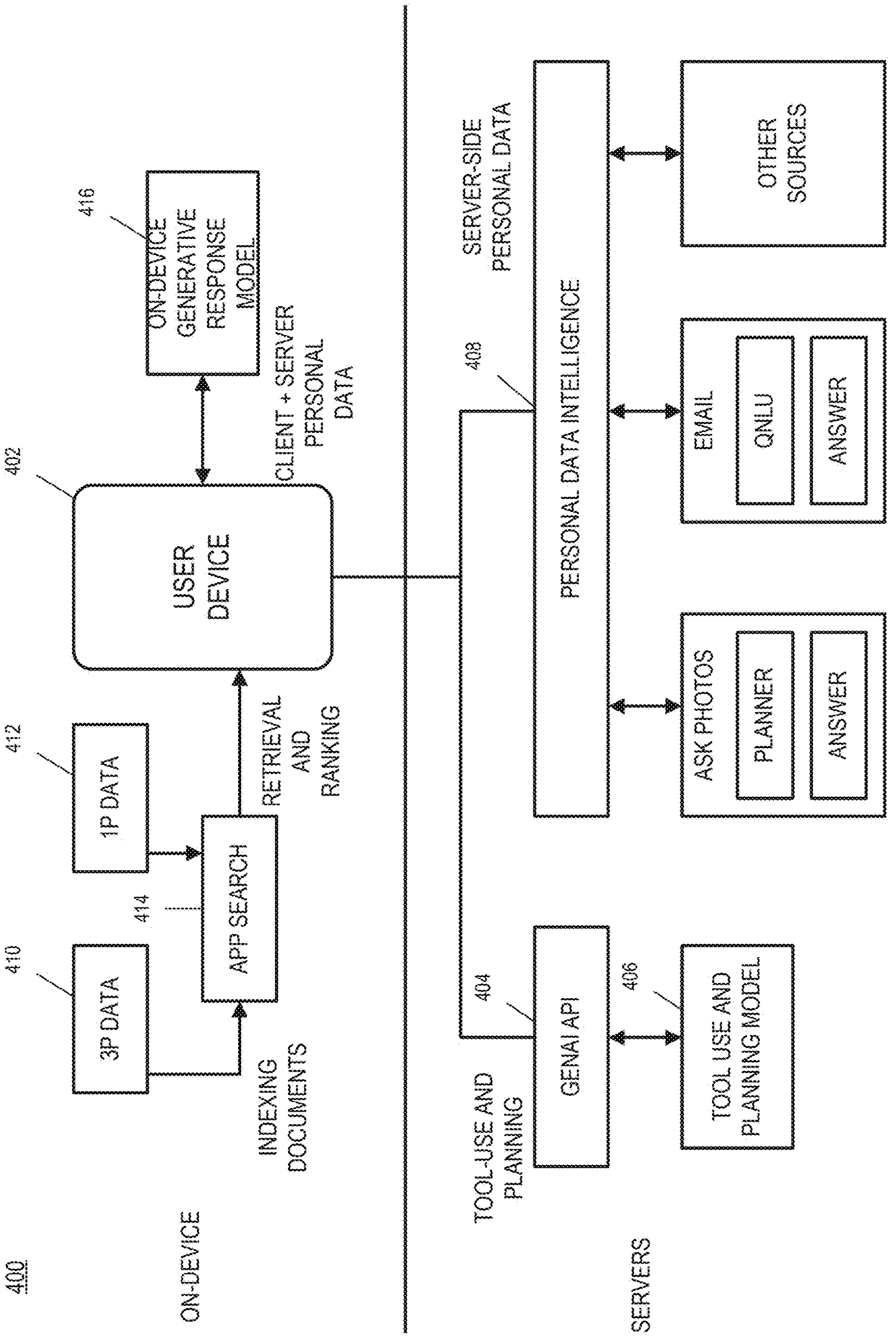
FIG. 4 depicts a block diagram of an example search processing system according to example embodiments of the present disclosure.

FIG. 4 depicts a block diagram of an example search processing system 400 according to example embodiments of the present disclosure. In particular, the search processing system 400 can obtain a search query via a user device 402. The user device 402 can then transmit the search query to a server computing system. The server computing system can then process the search query with a tool use and planning model 406 to generate a prediction output for tool use and planning.

The prediction output can then be processed with a generative artificial intelligence application programming interface block 404 to perform one or more interface actions based on the prediction output. If the prediction output is descriptive of instructions to search one or more server databases, the generative artificial intelligence application programming interface block 404 may interface with a personal data intelligence block 408 for searching server-side personal data. The personal data intelligence block 408 can then interface with server-based photo applications, email applications, and/or other web platforms. In some implementations, the server-based photo application may have a specialized planner model and/or an answer generation model specialized for the application. Additionally and/or alternatively, the email application may include a question natural language understanding model for processing the query and an answer generation model for responding to the query.

If the prediction output is descriptive of instructions to search one or more local databases, the generative artificial intelligence application programming interface block 404 may interface with an app search block 414 of the user device 402 to retrieve and ranks search results associated with first party data 412, third party data 410, and/or other data stored on the user device 402. The app search block 414 may be further leveraged for indexing first party and/or third party documents.

The search results from the on-device search and/or the server-side search may then be aggregated and processed with the on-device generative response model 416 to generate a model-generated response. The model-generated response may then be provided via the user device 402. In some implementations, search results may be transmitted back to the tool use and planning model 406 to perform additional planning predictions to cause additional specialized queries and API calls to be generated and performed. Once the tool use and planning model 406 determines enough information is available to respond to the search query, the tool use and planning model 406 may cause the generative artificial intelligence application programming interface block 404 to transmit the information in the on-device generative response model 416 to perform the model-generated response generation.

Figure 5:
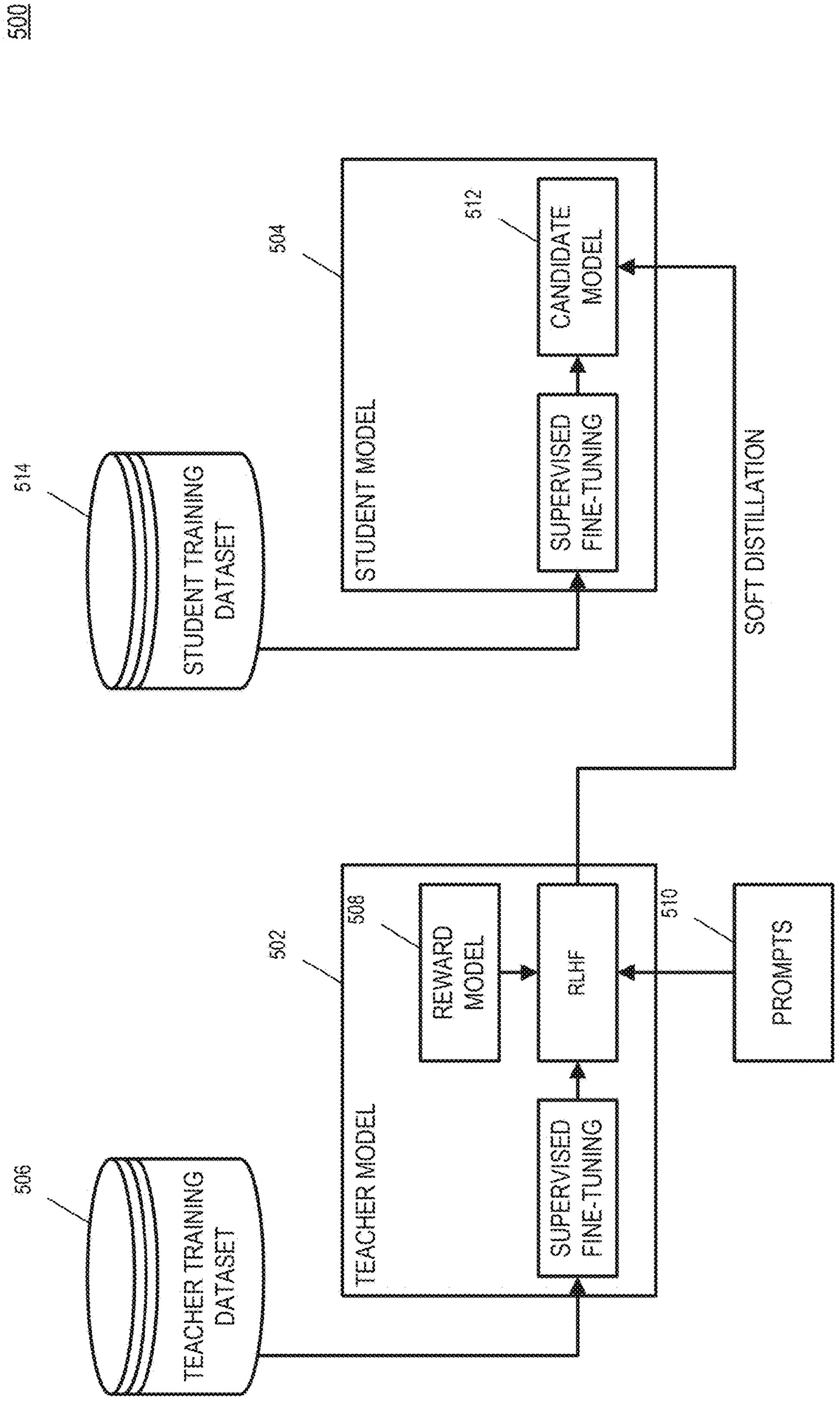
FIG. 5 depicts a block diagram of an example training system according to example embodiments of the present disclosure.

FIG. 5 depicts a block diagram of an example training system 500 according to example embodiments of the present disclosure. In particular, the on-device generative response model, the server-side generative response model, and/or the planning model may be trained via the training system 500. The training system 500 can include distillation training, reinforcement learning from human feedback, supervised fine-tuning, prompt tuning, reward model-based training, and/or other training techniques.

For example, a teacher model 502 can be trained on a teacher training dataset 506 via supervised fine-tuning. The teacher model 502 can then be further tuned via reinforcement learning from human feedback, which may include leveraging a reward model 508 for tuning loops. The reward model 508 can be trained to evaluate outputs of a model, which can then be utilized during model training for adjusting parameters of the teacher model 502. Additionally and/or alternatively, the teacher model 502 may be further fine-tuned based on processing and/or tuning one or more prompts 510. The one or more prompts 510 may include one or more hard prompts (e.g., a text input prompt) and/or one or more soft prompts (e.g., a set of tuned parameters).

The one or more trained teacher models 508 can then be leveraged to train and/or tune one or more student models 504. The one or more student models 504 can then be trained and/or tuned based on the student training dataset 514 and/or soft distillation from the one or more student models 504. For example, the one or more student models 504 may be trained based on supervised fine-tuning based on the student training dataset 514. The one or more student models 504 can then be tuned to generate outputs similar to the outputs generated by the one or more teacher models, which may include L2 loss training.

The tuned student model 504 can be leveraged as a candidate model 512 to be utilized for generative response model inference tasks and/or planning tasks. In some implementations, the server-side generative response model may be larger than the on-device generative response model. For example, the server-side generative response model may include at least ten times more parameters than the on-device generative response model.

In some implementations, one or more parameter layers may be learned on top of the candidate model 512. For example, one or more parameter sets may be tuned while the candidate model 512 parameters remained fixed. The one or more parameter sets may be tuned for specific tasks and may then be interwoven within the candidate model 512 and/or on top of the candidate model 512. The tasks may include user insight tasks, query response tasks, and/or other tasks.

Figure 6:
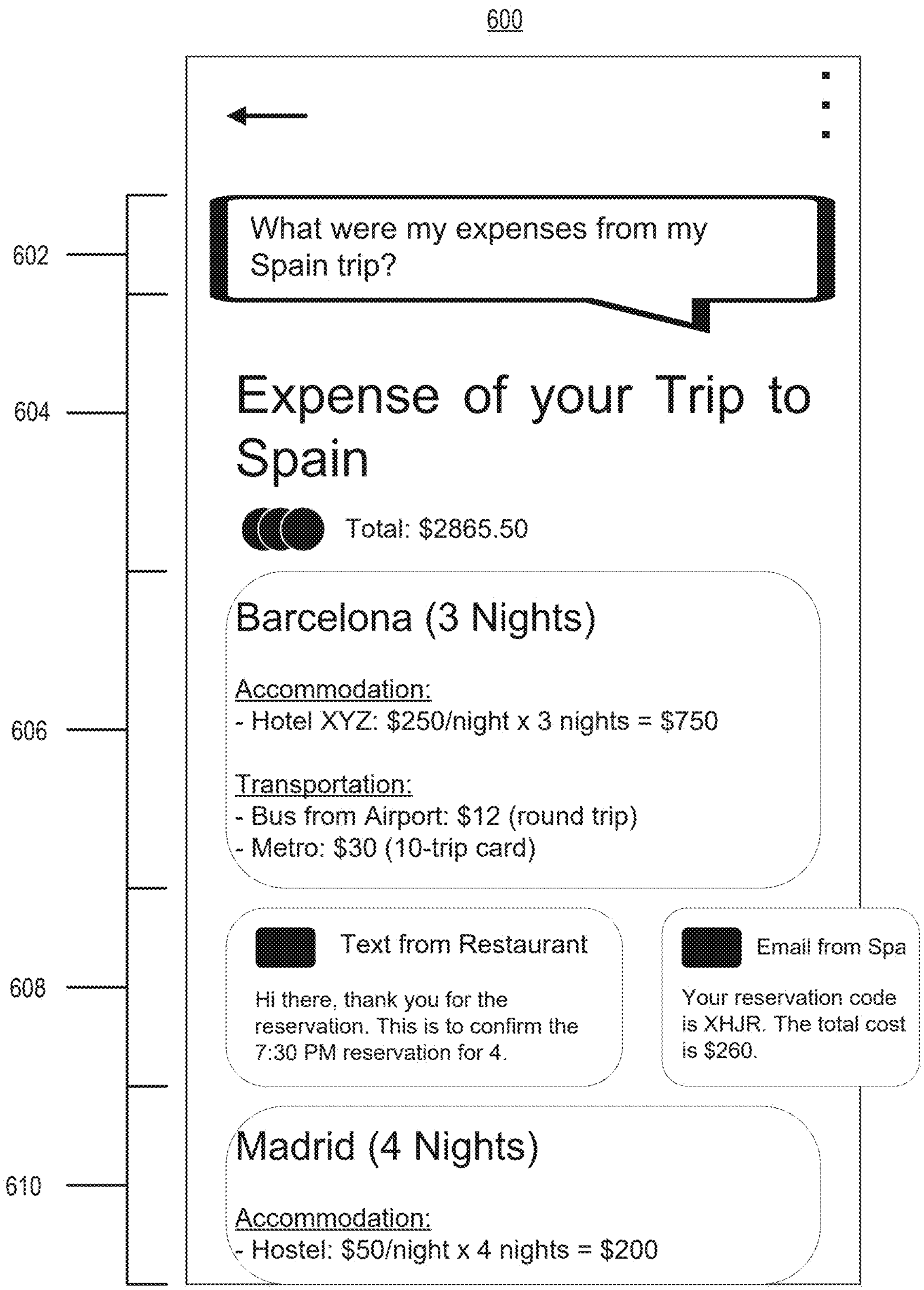
FIG. 6 depicts an illustration of an example response interface according to example embodiments of the present disclosure.

FIG. 6 depicts an illustration of an example response interface 600 according to example embodiments of the present disclosure. In particular, FIG. 6 depicts an example model-generated response (including 604, 606, 608, and 610) to a search query 602. The model-generated response (including 604, 606, 608, and 610) depicted includes a structured output generated based on information retrieved from a plurality of different databases.

In particular, the response interface 600 can depict the search query 602 (e.g., "What were my expenses from my Spain trip?") with the model-generated response (including 604, 606, 608, and 610). The model-generated response can include a plurality of parts, which may include a header 604 (e.g., "Expense of your Trip to Spain") with a summary response (e.g., "Total: $2865.50"), a first response panel 606 (e.g., a panel breaking down Barcelona expenses), a second response panel 610 (e.g., a panel breaking down Madrid expenses), and a resource information carousel 608. The resource information carousel 608 can include a plurality of interface panels that provide the resource search result that are pertinent to the search query, which may include emails, texts, calendar entries, etc.

Figure 7:
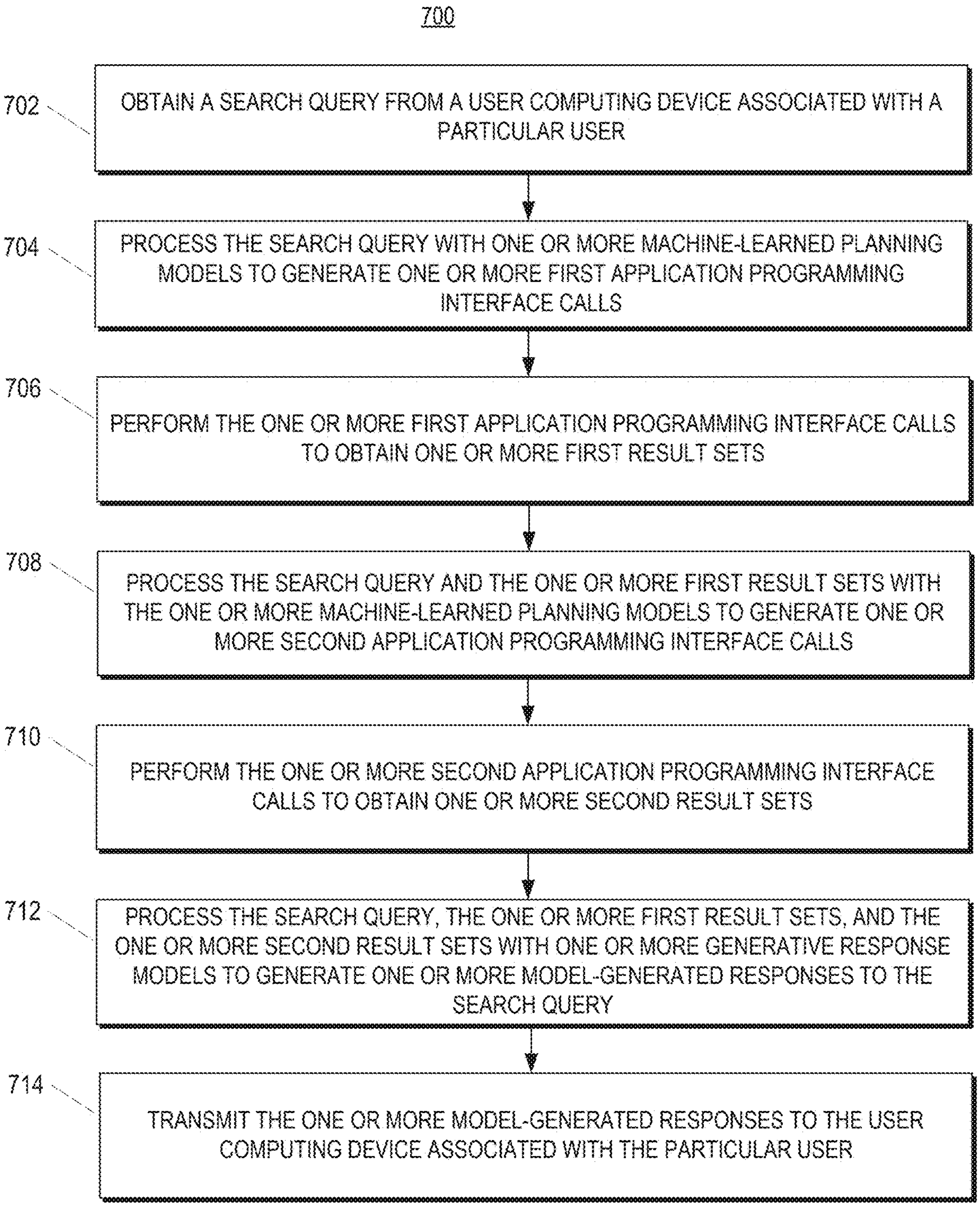
FIG. 7 depicts a flow chart diagram of an example method to perform multi-stage search according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a search query from a user computing device associated with a particular user. The search query can include one or more text strings, one or more images, one or more audio clips, one or more tokens, one or more embeddings, one or more context datasets, metadata, multimodal data, and/or other data. The search query may be obtained via a graphical keyboard interface, a microphone, and/or other input mediums.

At 704, the computing system can process the search query with one or more machine-learned planning models to generate one or more first application programming interface calls. The one or more first programming interface calls can include one or more first queries and instructions to interface with one or more first application-specific index datasets of a plurality of different application-specific index datasets. The one or more first queries may include one or more specialized queries generated to perform a first particular search associated with a first particular task. The one or more first queries may be formatted based on the one or more first application-specific index datasets to be searched.

In some implementations, the computing system can obtain a plurality of personal datasets from a plurality of different applications associated with a plurality of different profiles associated with the particular user, process the plurality of personal datasets to generate the plurality of different application-specific index datasets, and store plurality of different application-specific index datasets in association with one or more personal identifiers associated with the particular user. The one or more personal identifiers can be associated with a centralized profile of the particular user. The centralized profile can include information descriptive of biographical data of the particular user. In some implementations, the one or more machine-learned planning models can be communicatively connected with the centralized profile. Predictions of the one or more machine-learned planning models can be conditioned on the information of the centralized profile.

At 706, the computing system can perform the one or more first application programming interface calls to obtain one or more first result sets. The one or more first results sets may include text data, image data, audio data, latent encoding data, location data, web resource data, and/or other data. The one or more first result sets may be embedded, compressed, and/or segmented before processing. The one or more first application programming interface calls may be performed by one or more first particular application programming interfaces.

At 708, the computing system can process the search query and the one or more first result sets with the one or more machine-learned planning models to generate one or more second application programming interface calls. The one or more second programming interface calls can include one or more second queries and instructions to interface with one or more second application-specific index datasets of the plurality of different application-specific index datasets. The one or more second queries may include one or more specialized queries generated to perform a second particular search associated with a second particular task. The one or more second queries may be formatted based on the one or more second application-specific index datasets to be searched.

At 710, the computing system can perform the one or more second application programming interface calls to obtain one or more second result sets. The one or more first application programming interface calls can include instructions for interfacing with indexed email data associated with the particular user. The one or more second application programming interface calls can include instructions for interfacing with indexed image data associated with the particular user. In some implementations, the indexed image data may have been obtained from a native image gallery application on the user computing device. The one or more first results sets may include text data, image data, audio data, latent encoding data, location data, web resource data, and/or other data. The one or more second result sets may be embedded, compressed, and/or segmented before processing. The one or more second application programming interface calls may be performed by one or more second particular application programming interfaces.

At 712, the computing system can process the search query, the one or more first result sets, and the one or more second result sets with one or more generative response models to generate one or more model-generated responses to the search query. The one or more model-generated responses can include details of the one or more first result sets and the one or more second result sets in a natural language response to one or more prompts of the search query.

At 714, the computing system can transmit the one or more model-generated responses to the user computing device associated with the particular user. The one or more model-generated responses may include a structured output that provides the details of the first results sets and the second results sets in a format that is directly responsive to the search query. The structured output may include a table (e.g., a comparison table), a timeline (e.g., a trip timeline annotated with images and information associated with different trips), a graphic (e.g., a graphical representations of the details), an itinerary, and/or other structured output types.

Figure 8:
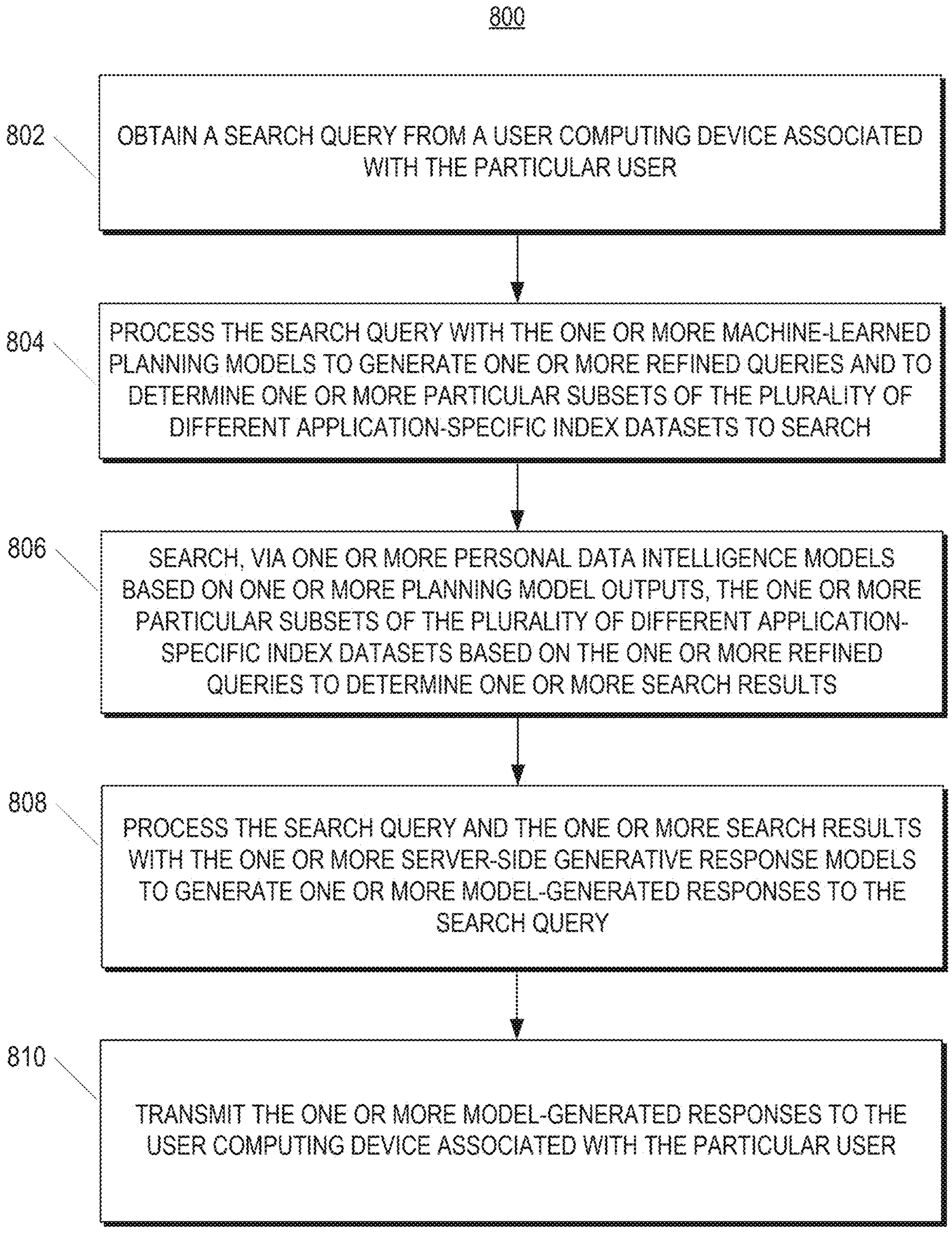
FIG. 8 depicts a flow chart diagram of an example method to perform server-side search processing according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a search query from a user computing device associated with the particular user. The search query can include text data, image, data, audio data, latent encoding data, location data, multimodal data, and/or other data. The search query can be descriptive of a general question associated with multiple data instances (e.g., "Where have I eaten in Chicago during my three trips?", "How much money have I spent on bags over the past two years?", "Between all communication methods, how many messages have I sent to John and what were they about?", etc.) and/or specific instance questions (e.g., "What was our booking number for the hotel reservation next week?", "Where did we go on our anniversary last year?", "What was the last movie I watched?", etc.). The search query may be obtained via one or more user interfaces. The search query may be obtained based on an on-device query processing model determining to send the search query to the server for query processing planning.

At 804, the computing system can process the search query with the one or more machine-learned planning models to generate one or more refined queries and to determine one or more particular subsets of the plurality of different application-specific index datasets to search. The one or more machine-learned planning models can be configured to process a query to generate predicted planning data descriptive of particular tools to utilize and particular datasets to search. The one or more particular subsets of the plurality of different application-specific index datasets can include an email index dataset and a photo gallery index dataset. The one or more machine-learned planning models can include a pre-trained large language model tuned to perform dataset predictions and task-specific query generation. The tuning may include a labeled training dataset, reinforcement based learning, fixing a large subset of the model parameters while only tuning the remaining parameters, soft prompt tuning, and/or other tuning techniques. The one or more one or more particular subsets of the plurality of different application-specific index datasets may include a browser history, a search history, emails, texts, social media messages, calendars, photo galleries, profile data, and/or other indexes. In some implementations, the one or more machine-learned planning models may be part of a hybrid architecture between on-device and server and may be configured to generate predictions for on-device searches and server-side searches. For example, the text messages and locations may be on-device, while images and other media may be on the server.

In some implementations, the index datasets may be generated via one or more embedding techniques. For example, images may be indexed by processing the images with one or more image captioning models (e.g., one or more vision language models) to generate one or more image captions, embedding the images, embedding the image captions, and indexing the image embeddings, the text embeddings, and/or the metadata. In some implementations, the images may be processed to generate one or more individual recognitions, one or more object recognitions, one or more location recognitions, and/or one or more other label determinations, which can then be indexed. For maps and/or location instances, lat-long data (e.g., latitude and longitude identifiers), addresses, and/or other location data may be embedded. Additionally and/or alternatively, business details from a map application (e.g., reviews, store-type, menus, images, etc.) may be embedded and indexed with the embedded location data. For browser history data, viewed content items (e.g., viewed passages) may be determined then embedded. In some implementations, the accessed webpage (or accessed document) may be processed to determine a centerpiece (or focal point) of the viewed web resource, the centerpiece (or focal point) can be segmented, and the entire web resource (or document) and/or the centerpiece (or focal point) may be embedded and indexed. The centerpiece determination can strip away advertisements and/or other non-related content.

At 806, the computing system can search, via one or more personal data intelligence models based on one or more planning model outputs, the one or more particular subsets of the plurality of different application-specific index datasets based on the one or more refined queries to determine one or more search results. A plurality of different application-specific index datasets can be stored in a memory of the server computing system. The plurality of different application-specific index datasets can be descriptive of personal data instances across a plurality of different application profiles associated with a particular user. The server computing system can include one or more application programming interfaces configured to interface with one or more application indexes based on outputs of the one or more machine-learned planning models. The one or more application programming interfaces can interface with the personal data intelligence model to perform the search of the one or more particular subsets of the plurality of different application-specific index datasets. The plurality of different application-specific index datasets can include first party data, third party data, local data, and/or other data.

At 808, the computing system can process the search query and the one or more search results with the one or more server-side generative response models to generate one or more model-generated responses to the search query. The one or more model-generated responses can include details of the one or more search results in a natural language response to a prompt of the search query. The server computing system may store the one or more server-side generative response models that may be tuned to process queries and result datasets to generate predicted responses. The one or more server-side generative response models can include one or more language models (e.g., an autoregressive language model), one or more vision language models, one or more image generation models (e.g., a text-to-image diffusion model), and/or one or more other generative models. The one or more server-side generative response models may be leveraged based on the one or more search results being data stored on one or more server computing systems. In some implementations, the one or more on-device generative response models may be leveraged based on the one or more search results being data stored locally on the user computing device.

At 810, the computing system can transmit the one or more model-generated responses to the user computing device associated with the particular user. The one or more model-generated response may be encoded, compressed, and/or encrypted before being transmitted to the user computing device. In some implementations, personal identifiers may be abstracted, tokenized, and/or encrypted. The one or more model-generated responses may include text, images, audio, tables, lists, graphics, videos, itineraries, etc.

Possible use cases can include:

"A user may be desperately trying to find an important email about a flight confirmation or an event invite. They know it's somewhere in their email, but it's buried under years of other emails."

"A user may remember visiting a great restaurant or a unique store a few months ago, but they can't recall the name or the exact location."

"A user may be researching a topic and may want to pull together information they've found across various searches, emails, and documents. It may be a scattered mess."

"A user may simply want a better way to manage and stay on top of the vast amounts of information spread across their application services ecosystem."

Home shopping and tracking the realtor I met in an open house: "we remembered the agency but couldn't remember the name of the agent. My husband was pretty sure we had an email from her in our joint email address. He kept looking for 15 min. I remembered that I take photos of everything and decided to search my photos. Bingo! (Location+Photos+email)"

Home shopping: "every weekend, we head to various open houses and also tour homes that I have booked with walkthrough booking app. I use the booking app to navigate from house to house. I feel exhausted at the end of all of these and then I need to organize what we saw that weekend vs. last weekend. I wish I could just get a summary of all the locations I had been to in these home shopping marathons. (location+Photos+emails)"

"A user needs to find a receipt for a recent purchase for a return, warranty claim, or expense report. They know it's somewhere in their email or maybe a photo on google photos."

"A user sees a product they like on a website or in a social media post. They want to quickly compare prices or see if they've mentioned the product in emails or searches before."

"A user is anxiously awaiting a package. They want to track its progress without having to dig through emails for the shipping confirmation or tracking number."

"A user needs to find an invitation for a party or event. They know they received it via email but can't remember the details or who sent it."

"A user remembers seeing a helpful video or article about a home repair project but can't remember where they saw it."

"I want the list of all restaurants and outings with my husband on our anniversaries and birthdays for the last 19 years."

"I forgot all the research I have done for shopping. Give me the list (links) of all the black skirts I have searched for in the last 3 months."

"Give me the list of all the sites I have visited last week. Organize them by topic."

"All legal docs I need (mine, parents, family) are stored in different places, photos, drive, email, etc. I don't want to worry about where I search and I just want to ask to pull it for me. E.g., Give me the most recent copy of my sister's passport."

"A user needs a digital copy of their driver's license or passport. Generally needed while filling out forms for traveling. They don't remember if it's in their photos, or if it's in their email or document drive."

"What is my license plate number?"

"What model is my furnace/hot water heater/washing machine/refrigerator?"

"How big is the couch in the living room/How tall is the glass sliding door in my bedroom?"

"When's the last time/show me the times I saw [this band]."

"What did I order last time I was here?"

"Where/when did I meet this person?"

Figure 9A:
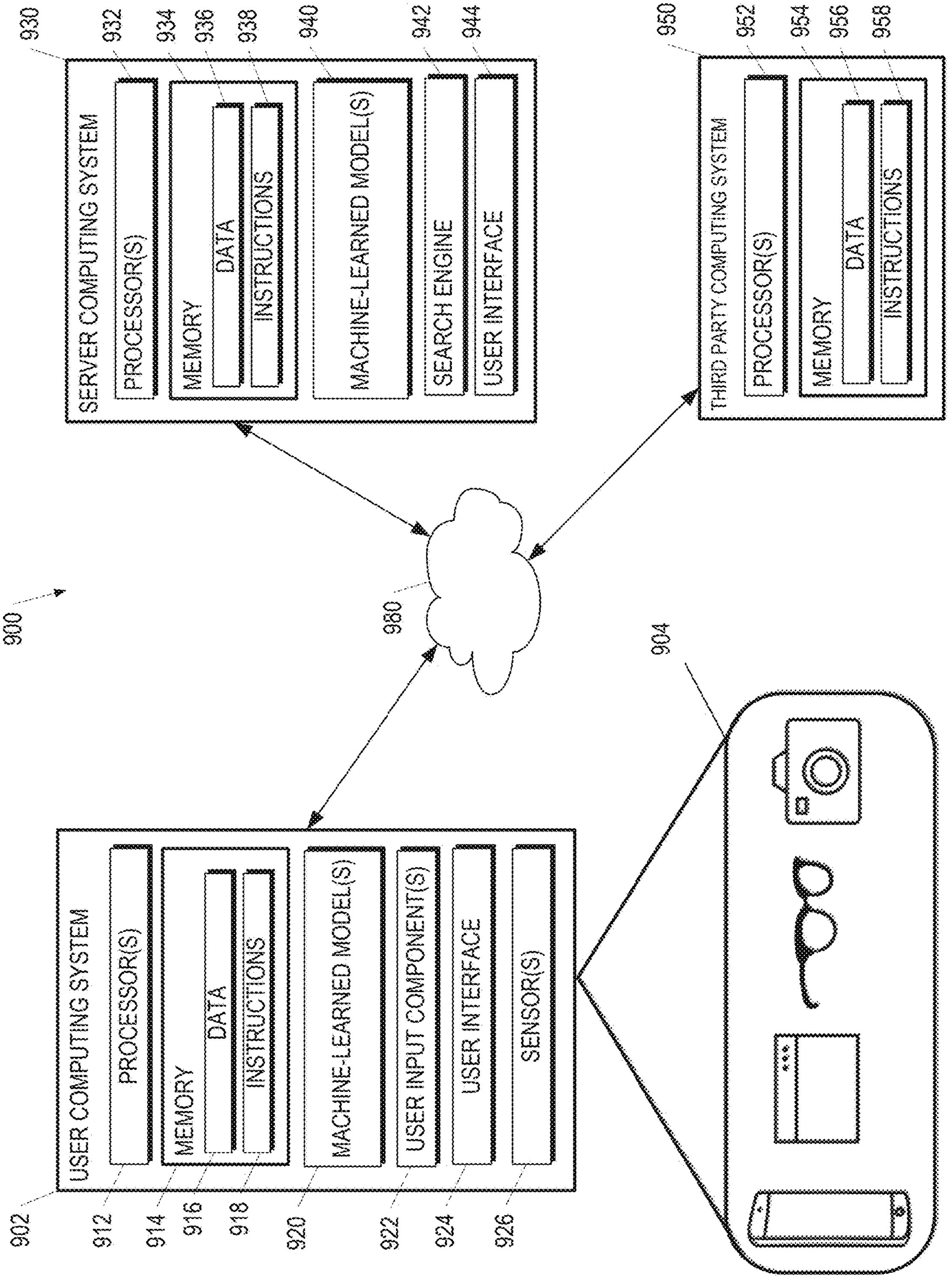
FIG. 9A depicts a block diagram of an example computing system that performs user data search according to example embodiments of the present disclosure.

FIG. 9A depicts a block diagram of an example computing system 900 that performs user data search according to example embodiments of the present disclosure. The system 900 includes a user computing system 902, a server computing system 930, and/or a third party computing system 950 that are communicatively coupled over a network 980.

The user computing system 902 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 902 includes one or more processors 912 and a memory 914. The one or more processors 912 can be any suitable processing device (e.g., a processor core, a microprocessor, an ASIC, a FPGA, a controller, a microcontroller, etc.) and can be one processor or a plurality of processors that are operatively connected. The memory 914 can include one or more non-transitory computer-readable storage mediums, such as RAM, ROM, EEPROM, EPROM, flash memory devices, magnetic disks, etc., and combinations thereof. The memory 914 can store data 916 and instructions 918 which are executed by the processor 912 to cause the user computing system 902 to perform operations.

In some implementations, the user computing system 902 can store or include one or more machine-learned models 920. For example, the machine-learned models 920 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 920 can be received from the server computing system 930 over network 980, stored in the user computing device memory 914, and then used or otherwise implemented by the one or more processors 912. In some implementations, the user computing system 902 can implement multiple parallel instances of a single machine-learned model 920 (e.g., to perform parallel machine-learned model processing across multiple instances of input data and/or detected features).

More particularly, the one or more machine-learned models 920 may include one or more detection models, one or more classification models, one or more segmentation models, one or more augmentation models, one or more generative models, one or more natural language processing models, one or more optical character recognition models, and/or one or more other machine-learned models. The one or more machine-learned models 920 can include one or more transformer models. The one or more machine-learned models 920 may include one or more neural radiance field models, one or more diffusion models, and/or one or more autoregressive language models.

The one or more machine-learned models 920 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 920 can process image data, text data, audio data, and/or latent encoding data to generate output data that can include image data, text data, audio data, and/or latent encoding data. The one or more machine-learned models 920 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Machine-learned model(s) can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) can include a single or multiple instances of the same model configured to operate on data from input(s). Machine-learned model(s) can include an ensemble of different models that can cooperatively interact to process data from input(s). For example, machine-learned model(s) can employ a mixture-of-experts structure. See, e.g., Zhou et al., *Mixture-of-Experts with Expert Routing Routing*, ARXIV:2202.09368v2 (Oct. 14, 2022).

Input(s) can generally include or otherwise represent various types of data. Input(s) can include one type or many different types of data. Output(s) can be data of the same type(s) or of different types of data as compared to input(s). Output(s) can include one type or many different types of data.

Example data types for input(s) or output(s) include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audiovisual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs or outputs, example combinations of data types include image data and audio data, image data and natural language data, natural language data and software code data, image data and biometric data, sensor data and medical data, etc. It is to be understood that any combination of data types in an input or an output can be present.

An example input can include one or multiple data types, such as the example data types noted above. An example output can include one or multiple data types, such as the example data types noted above. The data type(s) of input can be the same as or different from the data type(s) of output. It is to be understood that the example data types noted above are provided for illustrative purposes only. Data types contemplated within the scope of the present disclosure are not limited to those examples noted above.

Additionally or alternatively, one or more machine-learned models 940 can be included in or otherwise stored and implemented by the server computing system 930 that communicates with the user computing system 902 according to a client-server relationship. For example, the machine-learned models 940 can be implemented by the server computing system 930 as a portion of a web service (e.g., a viewfinder service, a visual search service, an image processing service, an ambient computing service, and/or an overlay application service). Thus, one or more models 920 can be stored and implemented at the user computing system 902 and/or one or more models 940 can be stored and implemented at the server computing system 930.

The user computing system 902 can also include one or more user input components 922 that receives user input. For example, the user input component 922 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system 902 can store and/or provide one or more user interfaces 924, which may be associated with one or more applications. The one or more user interfaces 924 can be configured to receive inputs and/or provide data for display (e.g., image data, text data, audio data, one or more user interface elements, an augmented-reality experience, a virtual reality experience, and/or other data for display. The user interfaces 924 may be associated with one or more other computing systems (e.g., server computing system 930 and/or third party computing system 950). The user interfaces 924 can include a viewfinder interface, a search interface, a generative model interface, a social media interface, and/or a media content gallery interface.

The user computing system 902 may include and/or receive data from one or more sensors 926. The one or more sensors 926 may be housed in a housing component that houses the one or more processors 912, the memory 914, and/or one or more hardware components, which may store, and/or cause to perform, one or more software packets. The one or more sensors 926 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 902 may include, and/or be part of, a user computing device 904. The user computing device 904 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more user computing devices 904. For example, a camera of a smartphone may be utilized to capture image data descriptive of the environment, and/or an overlay application of the user computing device 904 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage mediums, such as RAM, ROM, EEPROM, EPROM, flash memory devices, magnetic disks, etc., and combinations thereof. The memory 934 can store data 936 and instructions 938 which are executed by the processor 932 to cause the server computing system 930 to perform operations.

In some implementations, the server computing system 930 includes or is otherwise implemented by one or more server computing devices. In instances in which the server computing system 930 includes plural server computing devices, such server computing devices can operate according to sequential computing architectures, parallel computing architectures, or some combination thereof.

As described above, the server computing system 930 can store or otherwise include one or more machine-learned models 940. For example, the models 940 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 940 are discussed with reference to FIG. 9B.

Additionally and/or alternatively, the server computing system 930 can include and/or be communicatively connected with a search engine 942 that may be utilized to crawl one or more databases (and/or resources). The search engine 942 can process data from the user computing system 902, the server computing system 930, and/or the third party computing system 950 to determine one or more search results associated with the input data. The search engine 942 may perform term based search, label based search, Boolean based searches, image search, embedding based search (e.g., nearest neighbor search), multimodal search, and/or one or more other search techniques.

The server computing system 930 may store and/or provide one or more user interfaces 944 for obtaining input data and/or providing output data to one or more users. The one or more user interfaces 944 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 902 and/or the server computing system 930 can train the models 920 and/or 940 via interaction with the third party computing system 950 that is communicatively coupled over the network 980. The third party computing system 950 can be separate from the server computing system 930 or can be a portion of the server computing system 930. Alternatively and/or additionally, the third party computing system 950 may be associated with one or more web resources, one or more web platforms, one or more other users, and/or one or more contexts.

An example machine-learned model can include a generative model (e.g., a large language model, a foundation model, a vision language model, an image generation model, a text-to-image model, an audio generation model, and/or other generative models).

Training and/or tuning the machine-learned model can include obtaining a training instance. A set of training data can include a plurality of training instances divided between multiple datasets (e.g., a training dataset, a validation dataset, or testing dataset). A training instance can be labeled or unlabeled. The runtime inferences can form training instances when a model is trained using an evaluation of the model's performance on that runtime instance (e.g., online training/learning). Example data types for the training instance and various tasks associated therewith are described throughout the present disclosure.

In some implementations, the computing system 900 may utilize one or more soft prompts for conditioning the one or more machine-learned models (920 and/or 940) for downstream tasks. The one or more soft prompts can include a set of tunable parameters that can be trained (or tuned) as the parameters of the one or more machine-learned models (920 and/or 940) are fixed. The one or more soft prompts 924 can be trained for a specific task and/or a specific set of tasks. Alternatively and/or additionally, the one or more soft prompts 924 may be trained to condition the one or more machine-learned models (920 and/or 940) to perform inferences for a particular individual, one or more entities, and/or one or more tasks such that the output is tailored for that particular individual, particular entities, and/or particular task. The one or more soft prompts 924 can be obtained and processed with one or more inputs by the one or more machine-learned models (920 and/or 940).

The one or more soft prompts can include a set of machine-learned weights. In particular, the one or more soft prompts can include weights that were trained to condition a generative model to generate model-generated content with one or more particular attributes. For example, the one or more soft prompts can be utilized by a user to generate content based on the fine-tuning. The one or more soft prompts can be extended to a plurality of tasks. For example, the computing system 900 may tune the set of parameters on a plurality of different content attributes and/or types. The one or more soft prompts may include a plurality of learned vector representations that may be model-readable.

A particular soft prompt can be obtained based on a particular task, individual, content type, etc. The particular soft prompt can include a set of learned parameters. The set of learned parameters can be processed with the generative model to generate the model-generated image.

The user computing system 902 and/or the server computing system 930 may store one or more soft prompts associated with the particular user and/or particular task. The soft prompt(s) can include a set of parameters. The user computing system 902 and/or the server computing system 930 may leverage the set of parameters of the soft prompt(s) and a generative model to generate a model-generated content item. In some implementations, the model-generated content item can be generated based on the set of parameters associated with the particular individual and/or task.

The utilization of a soft prompt (i.e., a set of parameters that can be processed with a generative model for downstream task conditioning) can reduce the computational cost for parameter tuning for object-specific content generation by reducing the parameters to be tuned. The set of parameters can be limited and may be adjusted while the parameters of the pre-trained generative model stay fixed. The set of parameters of the soft prompt can be utilized to condition the pre-trained generative model (e.g., the machine-learned image generation model and/or language model) for particular downstream tasks (e.g., response generation and/or image rendering).

In some implementations, the generative language model and/or one or more soft prompts (e.g., a set of machine-learned parameters that can be processed with the input by the generative language model) can be trained to generate content with particular attributes.

In some implementations, the server computing system 930 can include a prompt library. The prompt library can store a plurality of prompt templates (e.g., a plurality of hard prompt templates (e.g., text prompt templates)) and/or a plurality of soft prompts. The plurality of prompt templates can include hard prompt templates (e.g., text string data) that may be combined with the user input to generate a more detailed and complete prompt for the generative model to process. The templates can include text descriptive of the request. The templates may be object-specific, user-specific, and/or content-specific. The plurality of prompt templates may include few-shot examples.

The prompt library can store a plurality of soft prompts. The plurality of soft prompts may be associated with a plurality of different content attributes and/or a plurality of different individuals. The plurality of soft prompts can include learned parameters and/or learned weights that can be processed with the generative model to condition the generative model to generate content items with particular attributes. The plurality of soft prompts may have been tuned by freezing the parameters of a pre-trained generative model, while the parameters of the soft prompt are learned based on a particular task and/or user. The plurality of soft prompts can include a plurality of different soft prompts associated with a plurality of different users and/or a plurality of different sets of users.

The third party computing system 950 can include one or more processors 952 and a memory 954. The one or more processors 952 can be any suitable processing device (e.g., a processor core, a microprocessor, an ASIC, a FPGA, a controller, a microcontroller, etc.) and can be one processor or a plurality of processors that are operatively connected. The memory 954 can include one or more non-transitory computer-readable storage mediums, such as RAM, ROM, EEPROM, EPROM, flash memory devices, magnetic disks, etc., and combinations thereof. The memory 954 can store data 956 and instructions 958 which are executed by the processor 952 to cause the third party computing system 950 to perform operations. In some implementations, the third party computing system 950 includes or is otherwise implemented by one or more server computing devices.

The network 980 can be any type of communications network, such as a local area network (e.g., intranet), wide area network (e.g., Internet), or some combination thereof and can include any number of wired or wireless links. In general, communication over the network 980 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, the task can be a generative task, and the one or more machine-learned models (e.g., 920 and/or 940) can be configured to output content generated in view of one or more inputs. For instance, the inputs can be or otherwise represent data of one or more modalities that encodes context for generating additional content.

In some implementations, the task can be a text completion task. The machine-learned models can be configured to process the inputs that represent textual data and to generate the outputs that represent additional textual data that completes a textual sequence that includes the inputs. For instance, the machine-learned models can be configured to generate the outputs to complete a sentence, paragraph, or portion of text that follows from a portion of text represented by inputs.

In some implementations, the task can be an instruction following task. The machine-learned models can be configured to process the inputs that represent instructions to perform a function and to generate the outputs that advance a goal of satisfying the instruction function (e.g., at least a step of a multi-step procedure to perform the function). The outputs can represent data of the same or of a different modality as the inputs. For instance, the inputs can represent textual data (e.g., natural language instructions for a task to be performed) and the machine-learned models can process the inputs to generate the outputs that represent textual data responsive to the instructions (e.g., natural language responses, programming language responses, machine language responses, etc.). The inputs can represent image data (e.g., image-based instructions for a task to be performed, optionally accompanied by textual instructions) and the machine-learned models can process the inputs to generate the outputs that represent textual data responsive to the instructions (e.g., natural language responses, programming language responses, machine language responses, etc.). One or more outputs can be iteratively or recursively generated to sequentially process and accomplish steps toward accomplishing the requested functionality. For instance, an initial output can be executed by an external system or be processed by the machine-learned models to complete an initial step of performing a function. Multiple steps can be performed, with a final output being obtained that is responsive to the initial instructions.

In some implementations, the task can be a question answering task. The machine-learned models can be configured to process the inputs that represent a question to answer and to generate the outputs that advance a goal of returning an answer to the question (e.g., at least a step of a multi-step procedure to perform the function). The outputs can represent data of the same or of a different modality as the inputs. For instance, the inputs can represent textual data (e.g., natural language instructions for a task to be performed) and the machine-learned models can process the inputs to generate the outputs that represent textual data responsive to the question (e.g., natural language responses, programming language responses, machine language responses, etc.). The inputs can represent image data (e.g., image-based instructions for a task to be performed, optionally accompanied by textual instructions) and the machine-learned models can process the inputs to generate the outputs that represent textual data responsive to the question (e.g., natural language responses, programming language responses, machine language responses, etc.). One or more outputs can be iteratively or recursively generated to sequentially process and accomplish steps toward answering the question. For instance, an initial output can be executed by an external system or be processed by the machine-learned models to complete an initial step of obtaining an answer to the question (e.g., querying a database, performing a computation, executing a script, etc.). Multiple steps can be performed, with a final output being obtained that is responsive to the question.

In some implementations, the task can be an image generation task. The machine-learned models can be configured to process the inputs that represent context regarding a desired portion of image content. The context can include text data, image data, audio data, etc. Machine-learned models can be configured to generate the outputs that represent image data that depicts imagery related to the context. For instance, the machine-learned models can be configured to generate pixel data of an image. Values for channels associated with the pixels in the pixel data can be selected based on the context (e.g., based on a probability determined based on the context).

In some implementations, the task can be an audio generation task. Machine-learned models can be configured to process the inputs that represent context regarding a desired portion of audio content. The context can include text data, image data, audio data, etc. The machine-learned models can be configured to generate the outputs that represent audio data related to the context. For instance, the machine-learned models can be configured to generate waveform data in the form of an image (e.g., a spectrogram). Values for channels associated with pixels of the image can be selected based on the context. The machine-learned models can be configured to generate waveform data in the form of a sequence of discrete samples of a continuous waveform. Values of the sequence can be selected based on the context (e.g., based on a probability determined based on the context).

In some implementations, the task can be a data generation task. Machine-learned models can be configured to process the inputs that represent context regarding a desired portion of data (e.g., data from various data domains, such as sensor data, image data, multimodal data, statistical data, etc.). The desired data can be, for instance, synthetic data for training other machine-learned models. The context can include arbitrary data types. The machine-learned models can be configured to generate the outputs that represent data that aligns with the desired data. For instance, the machine-learned models can be configured to generate data values for populating a dataset. Values for the data objects can be selected based on the context (e.g., based on a probability determined based on the context).

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 902 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing system 900.

The central intelligence layer can communicate with a central device data layer. The central device data layer can be a centralized repository of data for the computing system 900. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 9B:
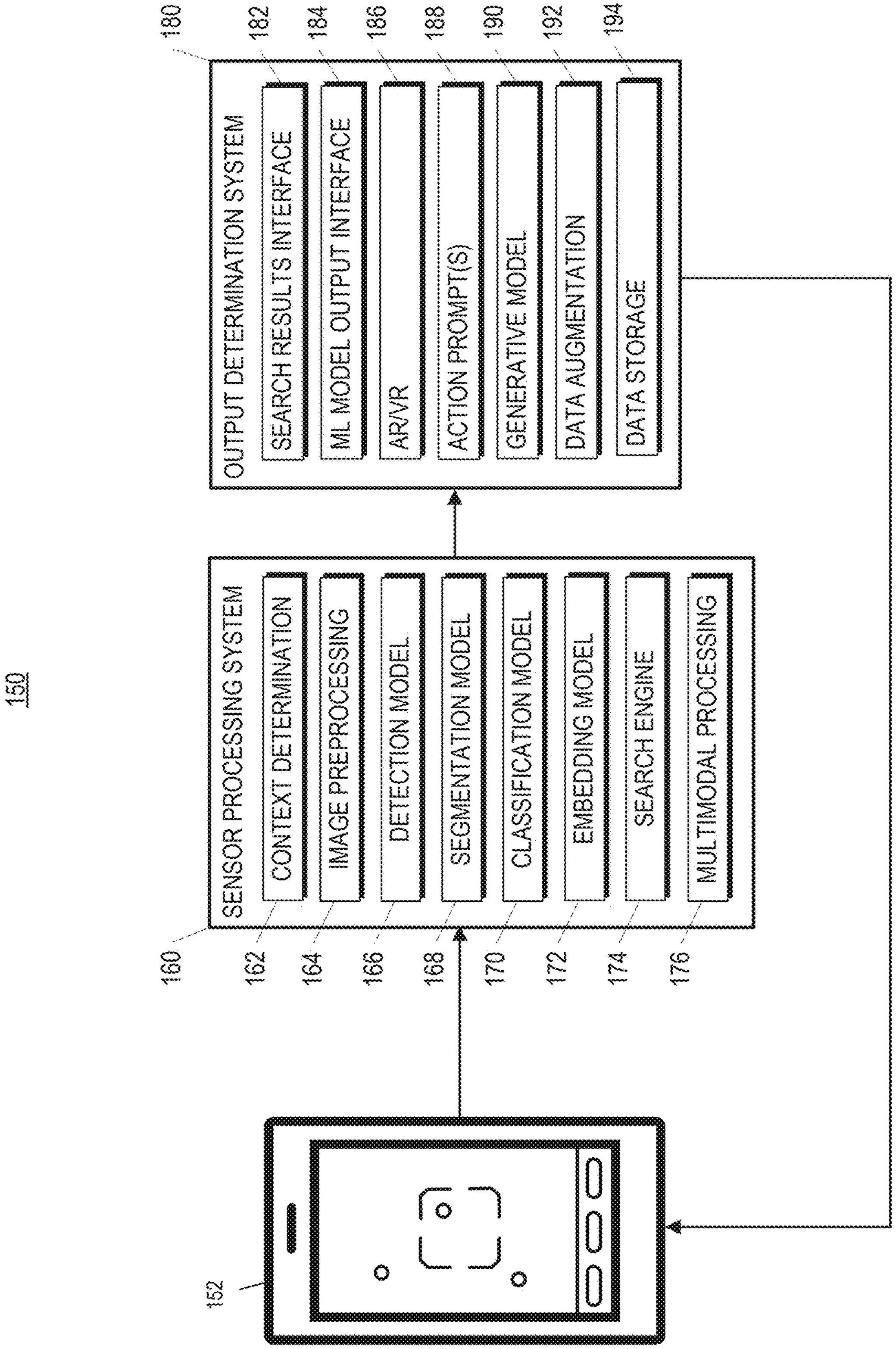
FIG. 9B depicts a block diagram of an example computing system that performs user data search according to example embodiments of the present disclosure.

FIG. 9B depicts a block diagram of an example computing system 150 that performs user data search according to example embodiments of the present disclosure. In particular, the example computing system 150 can include one or more computing devices 152 that can be utilized to obtain, and/or generate, one or more datasets that can be processed by a sensor processing system 160 and/or an output determination system 180 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 152 (e.g., one or more sensors in the computing device 152). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 152 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 160. The sensor processing system 160 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 162, which may determine a context associated with one or more content items. The context determination block 162 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 160 may include an image preprocessing block 164. The image preprocessing block 164 may be utilized to adjust one or more values of an obtained and/or received image to prepare the image to be processed by one or more machine-learned models and/or one or more search engines 174. The image preprocessing block 164 may resize the image, adjust saturation values, adjust resolution, strip and/or add metadata, and/or perform one or more other operations.

In some implementations, the sensor processing system 160 can include one or more machine-learned models, which may include a detection model 166, a segmentation model 168, a classification model 170, an embedding model 172, and/or one or more other machine-learned models. For example, the sensor processing system 160 may include one or more detection models 166 that can be utilized to detect particular features in the processed dataset. In particular, one or more images can be processed with the one or more detection models 166 to generate one or more bounding boxes associated with detected features in the one or more images.

Additionally and/or alternatively, one or more segmentation models 168 can be utilized to segment one or more portions of the dataset from the one or more datasets. For example, the one or more segmentation models 168 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 170 can be utilized to process image data, text data, audio data, latent encoding data, multimodal data, and/or other data to generate one or more classifications. The one or more classification models 170 can include one or more image classification models, one or more object classification models, one or more text classification models, one or more audio classification models, and/or one or more other classification models. The one or more classification models 170 can process data to determine one or more classifications.

In some implementations, data may be processed with one or more embedding models 172 to generate one or more embeddings. For example, one or more images can be processed with the one or more embedding models 172 to generate one or more image embeddings in an embedding space. The one or more image embeddings may be associated with one or more image features of the one or more images. In some implementations, the one or more embedding models 172 may be configured to process multimodal data to generate multimodal embeddings. The one or more embeddings can be utilized for classification, search, and/or learning embedding space distributions.

The sensor processing system 160 may include one or more search engines 174 that can be utilized to perform one or more searches. The one or more search engines 174 may crawl one or more databases (e.g., one or more local databases, one or more global databases, one or more private databases, one or more public databases, one or more specialized databases, and/or one or more general databases) to determine one or more search results. The one or more search engines 174 may perform feature matching, text based search, embedding based search (e.g., k-nearest neighbor search), metadata based search, multimodal search, web resource search, image search, text search, and/or application search.

Additionally and/or alternatively, the sensor processing system 160 may include one or more multimodal processing blocks 176, which can be utilized to aid in the processing of multimodal data. The one or more multimodal processing blocks 176 may include generating a multimodal query and/or a multimodal embedding to be processed by one or more machine-learned models and/or one or more search engines 174.

The output(s) of the sensor processing system 160 can then be processed with an output determination system 180 to determine one or more outputs to provide to a user. The output determination system 180 may include heuristic based determinations, machine-learned model based determinations, user selection based determinations, and/or context based determinations.

The output determination system 180 may determine how and/or where to provide the one or more search results in a search results interface 182. Additionally and/or alternatively, the output determination system 180 may determine how and/or where to provide the one or more machine-learned model outputs in a machine-learned model output interface 184. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 160 may be utilized to generate and/or provide an augmented-reality experience and/or a virtual-reality experience 186. For example, the one or more obtained datasets may be processed to generate one or more augmented-reality rendering assets and/or one or more virtual-reality rendering assets, which can then be utilized to provide an augmented-reality experience and/or a virtual-reality experience 186 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 188 may be determined based on the output(s) of the sensor processing system 160. For example, a search prompt, a purchase prompt, a generate prompt, a reservation prompt, a call prompt, a redirect prompt, and/or one or more other prompts may be determined to be associated with the output(s) of the sensor processing system 160. The one or more action prompts 188 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 160 may be processed with one or more generative models 190 to generate a model-generated content item that can then be provided to a user. The generation may be prompted based on a user selection and/or may be automatically performed (e.g., automatically performed based on one or more conditions, which may be associated with a threshold amount of search results not being identified).

The one or more generative models 190 can include language models (e.g., large language models and/or vision language models), image generation models (e.g., text-to-image generation models and/or image augmentation models), audio generation models, video generation models, graph generation models, and/or other data generation models (e.g., other content generation models). The one or more generative models 190 can include one or more transformer models, one or more convolutional neural networks, one or more recurrent neural networks, one or more feedforward neural networks, one or more generative adversarial networks, one or more self-attention models, one or more embedding models, one or more encoders, one or more decoders, and/or one or more other models. In some implementations, the one or more generative models 190 can include one or more autoregressive models (e.g., a machine-learned model trained to generate predictive values based on previous behavior data) and/or one or more diffusion models (e.g., a machine-learned model trained to generate predicted data based on generating and processing distribution data associated with the input data).

The one or more generative models 190 can be trained to process input data and generate model-generated content items, which may include a plurality of predicted words, pixels, signals, and/or other data. The model-generated content items may include novel content items that are not the same as any pre-existing work. The one or more generative models 90 can leverage learned representations, sequences, and/or probability distributions to generate the content items, which may include phrases, storylines, settings, objects, characters, beats, lyrics, and/or other aspects that are not included in pre-existing content items.

The one or more generative models 190 may include a vision language model.

The vision language model can be trained, tuned, and/or configured to process image data and/or text data to generate a natural language output. The vision language model may leverage a pre-trained large language model (e.g., a large autoregressive language model) with one or more encoders (e.g., one or more image encoders and/or one or more text encoders) to provide detailed natural language outputs that emulate natural language composed by a human.

The vision language model may be utilized for zero-shot image classification, few shot image classification, image captioning, multimodal query distillation, multimodal question and answering, and/or may be tuned and/or trained for a plurality of different tasks. The vision language model can perform visual question answering, image caption generation, feature detection (e.g., content monitoring (e.g., for inappropriate content)), object detection, scene recognition, and/or other tasks.

The vision language model may leverage a pre-trained language model that may then be tuned for multimodality. Training and/or tuning of the vision language model can include image-text matching, masked-language modeling, multimodal fusing with cross attention, contrastive learning, prefix language model training, and/or other training techniques. For example, the vision language model may be trained to process an image to generate predicted text that is similar to ground truth text data (e.g., a ground truth caption for the image). In some implementations, the vision language model may be trained to replace masked tokens of a natural language template with textual tokens descriptive of features depicted in an input image. Alternatively and/or additionally, the training, tuning, and/or model inference may include multi-layer concatenation of visual and textual embedding features. In some implementations, the vision language model may be trained and/or tuned via jointly learning image embedding and text embedding generation, which may include training and/or tuning a system to map embeddings to a joint feature embedding space that maps text features and image features into a shared embedding space. The joint training may include image-text pair parallel embedding and/or may include triplet training. In some implementations, the images may be utilized and/or processed as prefixes to the language model.

The one or more generative models 190 may be stored on-device and/or may be stored on a server computing system. In some implementations, the one or more generative models 190 can perform on-device processing to determine suggested searches, suggested actions, and/or suggested prompts. The one or more generative models 190 may include one or more compact vision language models that may include less parameters than a vision language model stored and operated by the server computing system. The compact vision language model may be trained via distillation training. In some implementations, the visional language model may process the display data to generate suggestions. The display data can include a single image descriptive of a screenshot and/or may include image data, metadata, and/or other data descriptive of a period of time preceding the current displayed content (e.g., the applications, images, videos, messages, and/or other content viewed within the past 30 seconds). The user computing device may generate and store a rolling buffer window (e.g., 30 seconds) of data descriptive of content displayed during the buffer. Once the time has elapsed, the data may be deleted. The rolling buffer window data may be utilized to determine a context, which can be leveraged for query, content, action, and/or prompt suggestion.

In some implementations, the generative models 190 can include machine-learned sequence processing models. An example system can pass inputs to sequence processing models. Sequence processing models can include one or more machine-learned components. Sequence processing models can process the data from inputs to obtain an input sequence. Input sequence can include one or more input elements obtained from inputs. The sequence processing model can process the input sequence using prediction layers to generate an output sequence. The output sequence can include one or more output elements generated based on input sequence. The system can generate outputs based on output sequence.

The output determination system 180 may process the one or more datasets and/or the output(s) of the sensor processing system 160 with a data augmentation block 192 to generate augmented data. For example, one or more images can be processed with the data augmentation block 192 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 160 may be stored based on a data storage block 194 determination.

The output(s) of the output determination system 180 can then be provided to a user via one or more output components of the user computing device 152. For example, one or more user interface elements associated with the one or more outputs can be provided for display via a visual display of the user computing device 152.

The processes may be performed iteratively and/or continuously. One or more user inputs to the provided user interface elements may condition and/or affect successive processing loops.

Figure 10:
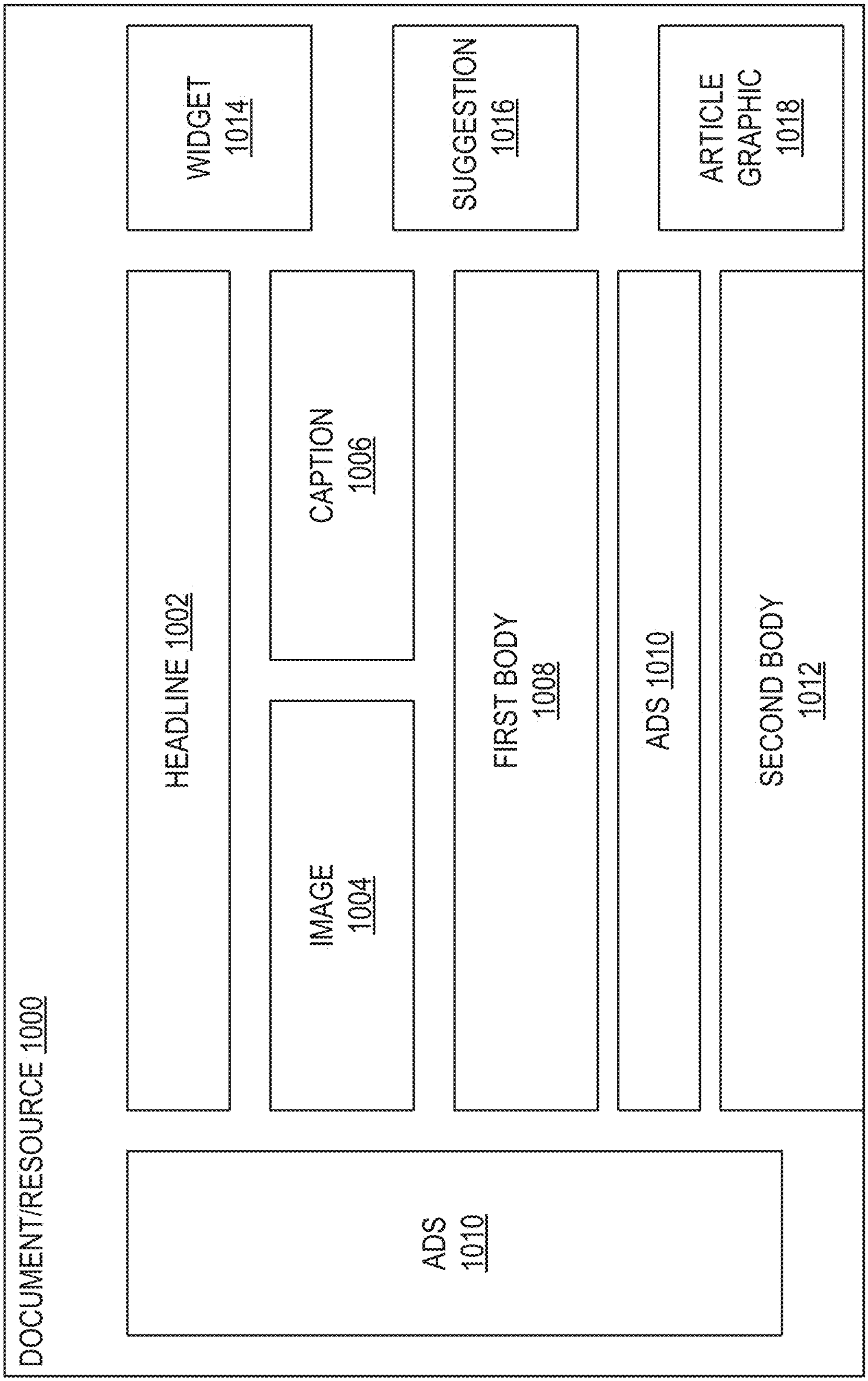
FIG. 10 depicts an illustration of an example document according to example embodiments of the present disclosure.

FIG. 10 depicts an illustration of an example document 1000 according to example embodiments of the present disclosure. In particular, FIG. 10 depicts an example document 1000 (or resource) that may be pertinent for a user search. For example, the document 1000 (or resource) may be a web page previously viewed by the user. For indexing the document 1000 (or resource), the systems and methods disclosed herein may perform centerpiece (or focal point) determination then embedding and indexing the segmented portion.

In particular, the document 1000 (or resource) may include ads 1010, widgets 1014, suggestions 1016, and/or other features that may not be a focal point of the document 1000 and/or may not be directed to the central focus of the document 1000. For example, the document 1000 (or resource) may be processed with a document understanding model to determine the headline 1002, the image 1004, the caption 1006, the first body text 1008, and the second body text 1012 are associated with the focal point of the document 1000. The headline 1002, the image 1004, the caption 1006, the first body text 1008, and the second body text 1012 can then be segmented, embedded, then indexed for a future search instance.

In some implementations, the systems and methods can be directed to systems and methods for visual information query processing and response generation. In particular, the systems and methods disclosed herein can leverage one or more machine-learned language models (e.g., a tuned and/or conditioned large language model) for planning and reasoning, which can include application programming interface tool calls. For example, input data including text data and image data can be obtained. The text data can be descriptive of a query associated with the image data (e.g., "When was this object invented?"). The input data can be processed with a machine-learned model to generate first planning data. The first planning data can include an application programming interface call to provide a first set of data (e.g., one or more images of the image data) to a first data processing tool (e.g., an object detection and captioning model). First output data (e.g., one or more segmented image patches with captions and/or classifications) can then be obtained from the first data processing tool based on the transmission of the first set of data. The first output data can then be processed with the machine-learned model to determine if a response can be generated and/or to generate second planning data to perform another data processing tool. The systems and methods can iteratively generate application programming interface calls and output data processing until a response (e.g., a response to the query) is generated.

Responding to visual questions that necessitate external knowledge, such as "What event is commemorated by the building depicted in this image?", can be a complex task. The task can present a combinatorial search space that demands a sequence of actions, including invoking APIs, analyzing their responses, and making informed decisions. Existing language models and/or search engines alone may struggle with the task as language understanding and web resource identification separately may not provide an adequate response.

The systems and methods disclosed herein can leverage a machine-learned language model and one or more data processing tools to perform visual information seeking. In particular, the systems and methods can utilize a machine-learned language model for planning and reasoning. For example, the machine-learned language model can process input data and/or output data from a data processing tool to determine an action (e.g., a next action) for obtaining relevant information for responding to the input data. The machine-learned language model can determine application programming interface calls to request information from one or more data processing tools. The machine-learned language model can generate planning data that includes the API call and may include a model-generated query to be provided to the one or more data processing tools.

Additionally and/or alternatively, the machine-learned language model can process the outputs from the one or more data processing tools to determine the relevant information from the outputs. The machine-learned language model can then determine whether further data processing tools are to be performed before generating the response data to provide to the user.

The planning and reasoning processing can be performed iteratively until the machine-learned language model determines a response can be generated and provided. In some implementations, the systems and methods can include a working memory that stores the input data and the outputs of the one or more data processing models to track and utilize the obtained and generated data throughout the different stages of the visual information retrieval and responding process.

The systems and methods can include conditioning the machine-learned model on action example sets. The action example sets can include collected user behavior data descriptive of user selections in a user interface for how the user would perform the visual information seeking task when utilizing a plurality of data processing tools. A transition graph may be constructed and/or learned based on the collected user behavior data. The transition graph may be associated with a particular task and/or a particular group of tasks. The conditioned machine-learned model can then perform information seeking planning and reasoning.

The systems and methods of the present disclosure provide a number of technical effects and benefits. As one example, the system and methods can be utilized to leverage a machine-learned language model for tool processing planning and reasoning, which can enable the system to accurately and efficiently respond to visual information queries. In particular, a language model can be conditioned to iteratively process data to determine when and/or how to utilize one or more data processing tools (e.g., an object detection tool, an image captioning tool, a web search tool, an image search tool, etc.). Additionally and/or alternatively, the language model can be conditioned to process the outputs of the data processing tools to extract relevant information that can then be utilized to determine another API call and/or to generate the final response. In some implementations, a user interface can be utilized to collect user behavior data that can be utilized to condition the language model based on the actions performed by a set of users.

Another example technical effect and benefit relates to improved computational efficiency and improvements in the functioning of a computing system. For example, a technical benefit of the systems and methods of the present disclosure is the ability to reduce the computational resources needed for machine-learned model visual information seeking by reducing the instances of useless tool calls. In particular, the language model may process data and generate planning data one state at a time in order to mitigate the instances of a tool being utilized in a useless manner. In particular, pre-planning of data processing tool uses for an entire pipeline can lead to instances in which an output of one tool may cause the use of another tool to be needless, counter-productive, redundant, and/or illogical. The systems and methods disclosed herein can iteratively utilize the machine-learned language model to generate planning data (e.g., API calls) based on the input data, tool outputs, and/or reasoning data.

Figure 11:
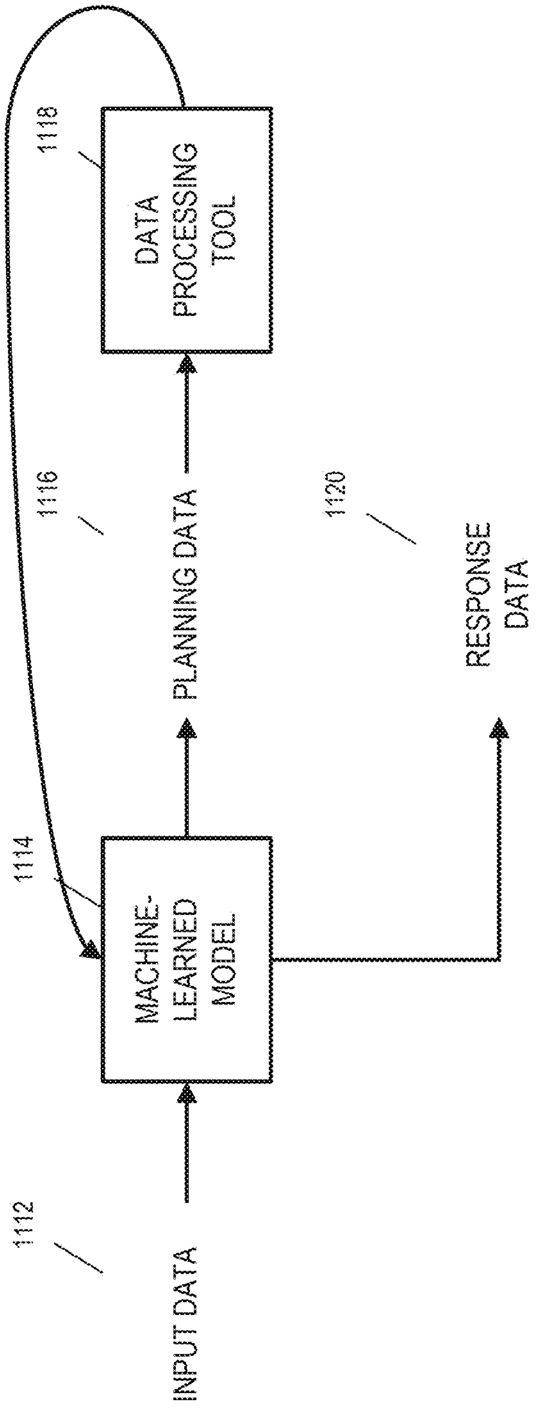
FIG. 11 depicts a block diagram of an example visual information determination system according to example embodiments of the present disclosure.

FIG. 11 depicts a block diagram of an example visual information determination system 1110 according to example embodiments of the present disclosure. In some implementations, the visual information determination system 1110 is configured to receive, and/or obtain, a set of input data 1112 descriptive of a prompt associated with requesting information associated with one or more images and, as a result of receipt of the input data 1112, generate, determine, and/or provide response data 1120 that is descriptive of a response to the prompt. Thus, in some implementations, the visual information determination system 1110 can include a machine-learned model 1114 that is operable to plan data processing tool 1118 calls and reason whether further calls are to be performed before generating a response.

In particular, the visual information determination system 1110 can include obtaining input data 1112. The input data 1112 can include text data and image data descriptive of a prompt. The prompt may be associated with a request to receive information associated with one or more details in one or more images of the image data (e.g., "What is the origin of this building?").

The input data 1112 can be processed with a machine-learned model 1114 (e.g., a large language model) to generate planning data 1116. The planning data 1116 can be descriptive of an action to perform. For example, the planning data 1116 can include an application programming interface call to transmit data to a data processing tool 1118. In some implementations, the planning data 1116 can include a model-generated dataset that may be generated to provide the data processing tool 1118 with a particular set of data to obtain information.

The data processing tool 1118 may include an object detection model, an image classification model, an image captioning model, a segmentation model, an object classification model, a computer vision model, an optical character recognition model, an augmentation model, a generative model, a visual question answering model, a web search engine, an image search engine, and/or another tool. The data processing tool 1118 may be separate from the machine-learned model 1114 that generated the planning data 1114.

The output of the data processing tool 1118 may be obtained and processed with the machine-learned model to determine (or extract) the relevant information from the output. The output and the input data 1112 can be processed with the machine-learned model 1114 to determine whether another data processing tool call is to be performed. The generation of planning data 1116, processing with data processing tool(s) 1118 and processing of the output of the data processing tool(s) 1118 may be performed until the machine-learned model 1114 determines a response can be generated. If the machine-learned model 1114 determines no further API calls are required to respond to the prompt, the machine-learned model 1114 (e.g., a generative language model) may generate response data 1120. The response data 1120 may be descriptive of a response to the prompt and may include one or more natural language text strings. In some implementations, the response data may include image data, links, latent encoding data, audio data, statistical data, multimodal data, and/or other data.

Figure 12:
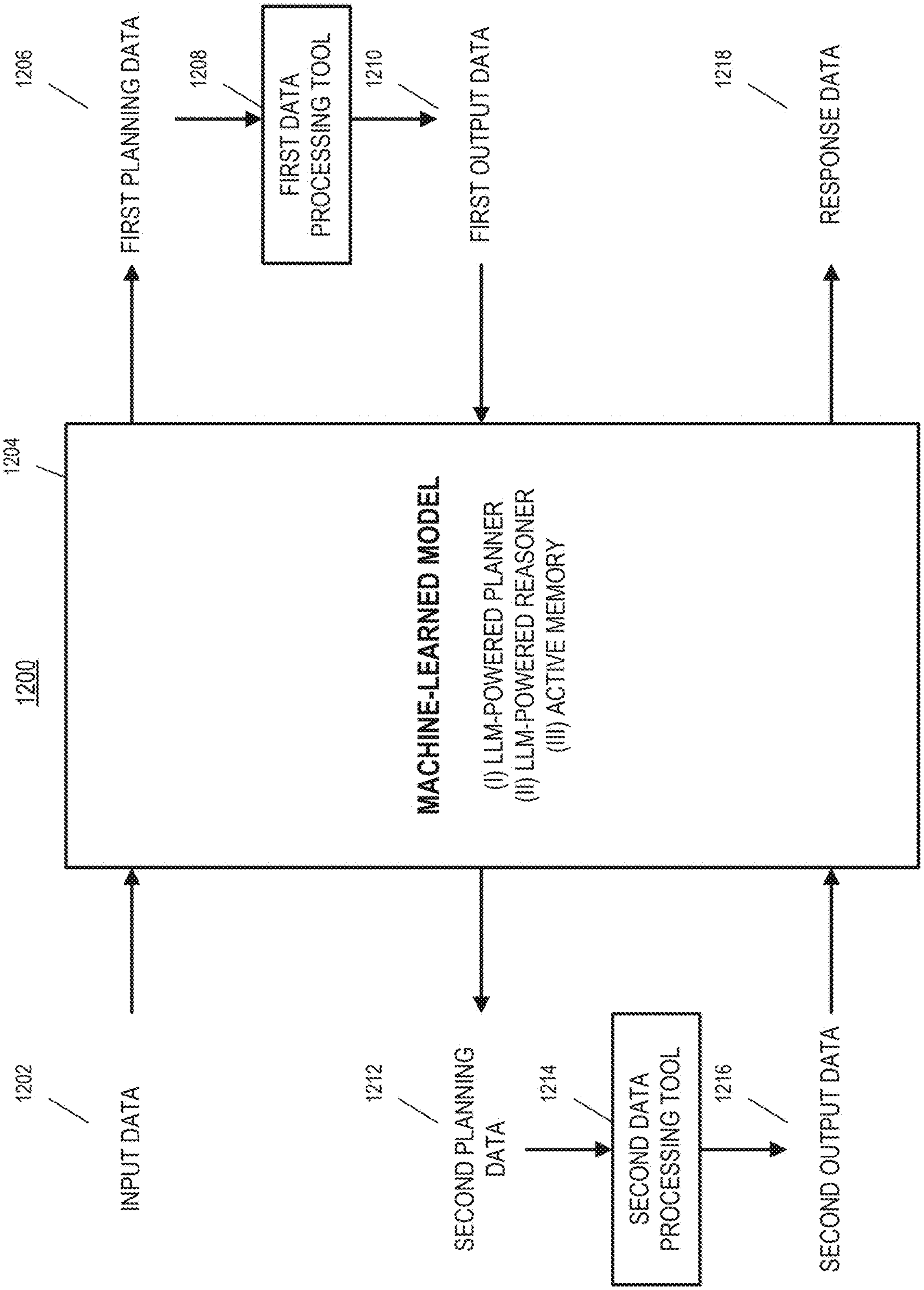
FIG. 12 depicts a block diagram of an example visual information seeking system according to example embodiments of the present disclosure.

FIG. 12 depicts a block diagram of an example visual information seeking system 1200 according to example embodiments of the present disclosure. The visual information seeking system 1200 is similar to the visual information determination system 1110 of FIG. 11 except that the visual information seeking system 1200 further includes a first data processing tool 1208 and a second data processing tool 1214. For example, the visual information seeking system 1200 can utilize any number of different data processing tools to perform visual information seeking.

In particular, input data 1202 can be obtained from a user computing system. The input data 1202 can be descriptive of a query associated with one or more features in one or more images of the input data 1202. The input data 1202 may be obtained via one or more user interfaces.

The input data 1202 can be processed with a machine-learned model 1204 to generate first planning data 1206. The machine-learned model 1204 can include an LLM-powered planner block, an LLM-powered reasoner block, and an active memory. The LLM-powered planner block can determine when, what, and how to utilize one or more data processing tools. The LLM-powered reasoner block can extract relevant information from the outputs of the data processing tools. Additionally and/or alternatively, the LLM-powered planner block can determine when enough information is obtained to respond to the query. The active memory can continually obtain and store the data obtained and/or generated throughout the visual information seeking process.

The first planning data 1206 can include an application programming interface call to transmit a first set of data to a first data processing tool 1208. The first set of data can include a portion of the input data 1202 and/or a model-generated dataset. The first data processing tool 1208 can process the first set of data to generate first output data 1210.

The first output data 1210 can be obtained then processed with the machine-learned model 1204 to generate second planning data 1212. The second planning data 1212 can include an application programming interface call to transmit a second set of data to a second data processing tool 1214. The second set of data can include a portion of the input data 1202, a portion of the first output data 1210, and/or a model-generated dataset. The second data processing tool 1214 can process the second set of data to generate second output data 1216.

The first data processing tool 1208 and the second data processing tool 1214 may differ. For example, the first data processing tool 1208 may include an image segmentation model and an object classification model, and the second data processing tool 1214 may include one or more search engines.

The second output data 1216 can be obtained and processed with the machine-learned model 1204. The input data 1202, the first output data 1210, and/or the second output data 216 can then be utilized to generate response data 1218 descriptive of a response to the query of the input data 1202.

Figure 13:
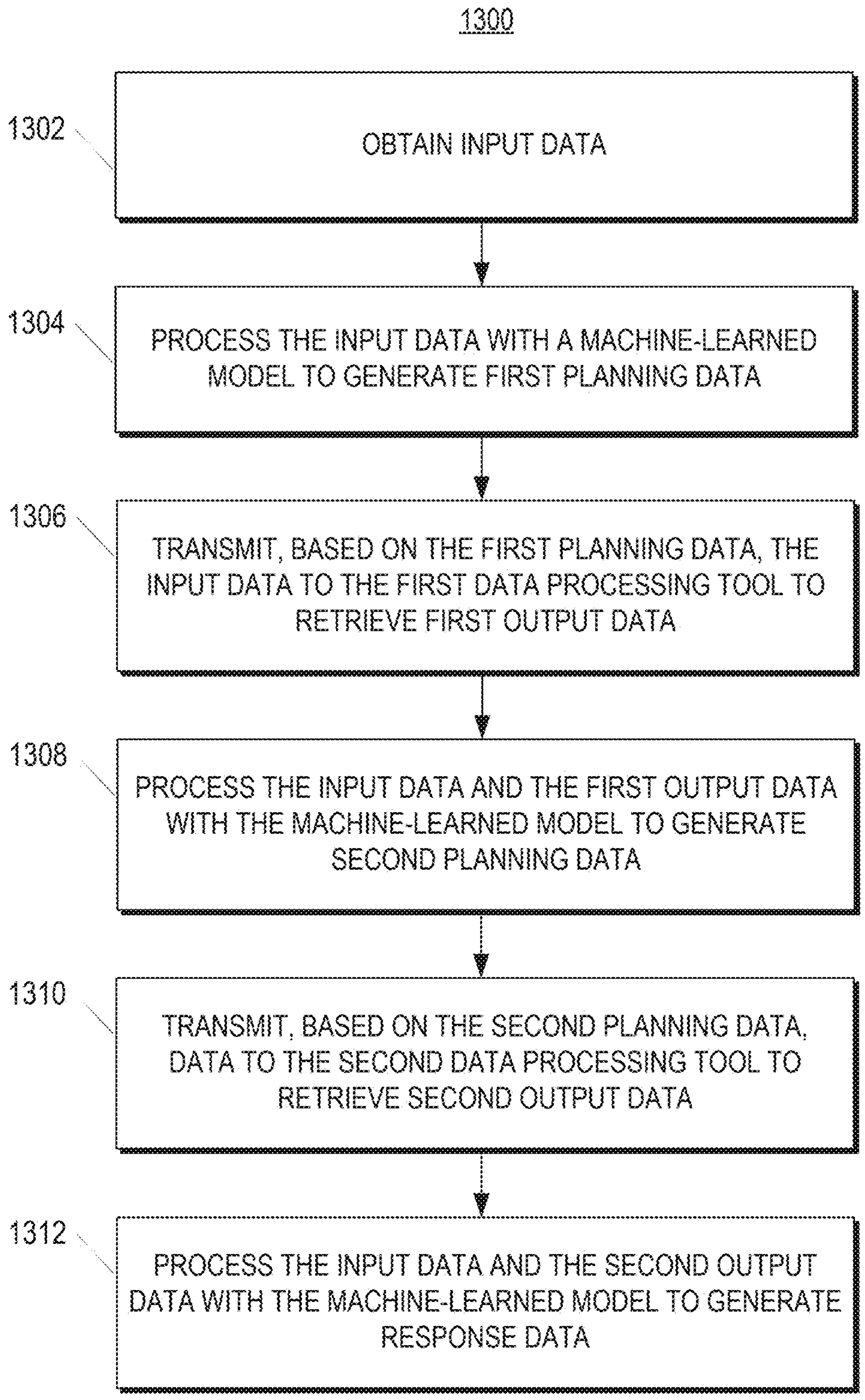
FIG. 13 depicts a flow chart diagram of an example method to perform visual query processing according to example embodiments of the present disclosure.

FIG. 13 depicts a flow chart diagram of an example method to perform according to example embodiments of the present disclosure. Although FIG. 13 depicts steps performed in a particular order for purposes of illustration and discussion, the methods of the present disclosure are not limited to the particularly illustrated order or arrangement. The various steps of the method 1300 can be omitted, rearranged, combined, and/or adapted in various ways without deviating from the scope of the present disclosure.

At 1302, a computing system can obtain input data. The input data can include image data and text data. The text data can include a query associated with the image data. The image data can include one or more objects. Additionally and/or alternatively, the text data can be descriptive of one or more questions associated with object details for one or more objects depicted in one or more images of the image data (e.g., "What year was this building built?", "What type of bird is this?", and/or "How do you make this thing?").

At 1304, the computing system can process the input data with a machine-learned model to generate first planning data. The first planning data can be descriptive of instructions to provide the input data to a first data processing tool. In some implementations, the first data processing tool can include an object detection model. The machine-learned model can include an autoregressive language model. In some implementations, the machine-learned model may be conditioned (e.g., parameter tuned and/or few shot example conditioned) for visual information seeking based planning and/or visual information seeking based reasoning. For example, the machine-learned model may be conditioned to determine when and/or what application programming interface calls are to be performed for different visual information seeking tasks. The machine-learned model may be conditioned to process the received outputs from the application programming interface calls to determine when and/or what relevant information was retrieved. In some implementations, the machine-learned model may be conditioned to iteratively determine API calls and process API outputs until a determined end output is received. The end output may then be processed to generate a response.

At 1306, the computing system can transmit, based on the first planning data, the input data to the first data processing tool to retrieve first output data. The first output data can include one or more bounding boxes associated with one or more objects in the image data. In some implementations, the first output data can include one or more segmented portions of one or more images of the image data and caption data associated with the one or more segmented portions. The caption data can be descriptive of an object classification associated with one or more objects detected in the one or more segmented portions of one or more images.

At 1308, the computing system can process the input data and the first output data with the machine-learned model to generate second planning data. The second planning data can be descriptive of instructions to transmit data to a second data processing tool. The second data processing tool can include a search engine. In some implementations, the second planning data can include a model-generated query. The model-generated query can be transmitted to the second data processing tool to retrieve the second output data. In some implementations, the model-generated query can be generated based on the input data and the first output data. The model-generated query can be descriptive of the query of the input data modified based on the first output data.

At 1310, the computing system can transmit, based on the second planning data, data to the second data processing tool to retrieve second output data. The first planning data and/or the second planning data may include a model-generated query that may be provided to and/or processed with the respective data processing model associated with the planning data. The second data processing tool may receive data via an application programming interface that was instructed to transmit the data based on the second planning data.

At 1312, the computing system can process the input data and the second output data with the machine-learned model to generate response data. The response data can be descriptive of a response to the query. The response data can include a natural language text string that is responsive to the query of the input data.

In some implementations, the computing system can process the input data and the second output data with the machine-learned model to generate third planning data. The third planning data can be descriptive of instructions to transmit data to a third data processing tool. The computing system can transmit, based on the third planning data, data to the third data processing tool to retrieve third output data and can process the input data and the third output data with the machine-learned model to generate the response data.

Figure 14:
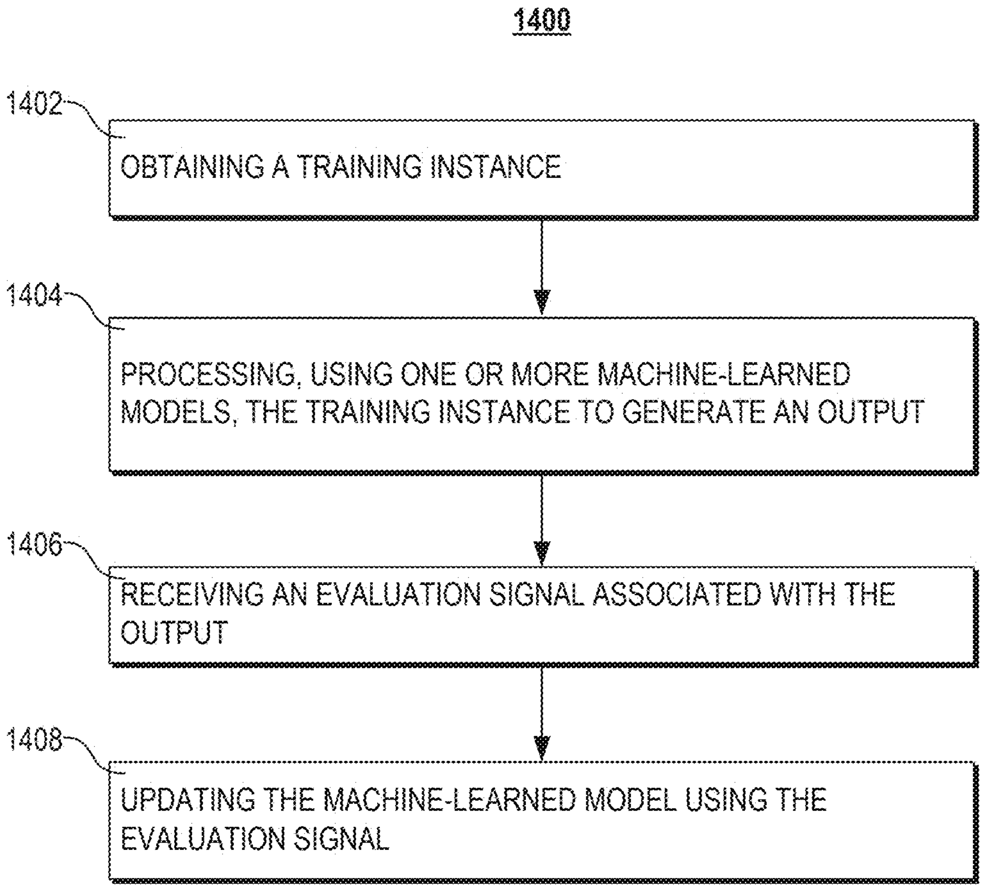
FIG. 14 depicts a flow chart diagram illustrating an example method for training a machine-learned model according to example implementations of aspects of the present disclosure.

FIG. 14 depicts a flowchart of a method 1400 for training one or more machine-learned models according to aspects of the present disclosure. For instance, an example machine-learned model can include a planning model, an on-device generative response model, a server-side generative response model, a document understanding model, and/or other machine-learned model.

One or more portion(s) of example method 1400 can be implemented by a computing system that includes one or more computing devices such as, for example, computing systems described with reference to the other figures. Each respective portion of example method 1400 can be performed by any (or any combination) of one or more computing devices. Moreover, one or more portion(s) of example method 1400 can be implemented on the hardware components of the device(s) described herein, for example, to train one or more systems or models. FIG. 14 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 14 is described with reference to elements/terms described with respect to other systems and figures for exemplary illustrated purposes and is not meant to be limiting. One or more portions of example method 1400 can be performed additionally, or alternatively, by other systems.

At 1402, example method 1400 can include obtaining a training instance. A set of training data can include a plurality of training instances divided between multiple datasets (e.g., a training dataset, a validation dataset, or testing dataset). A training instance can be labeled or unlabeled. Although referred to in example method 1400 as a "training" instance, it is to be understood that runtime inferences can form training instances when a model is trained using an evaluation of the model's performance on that runtime instance (e.g., online training/learning). Example data types for the training instance and various tasks associated therewith are described throughout the present disclosure.

At 1404, example method 1400 can include processing, using one or more machine-learned models, the training instance to generate an output. The output can be directly obtained from the one or more machine-learned models or can be a downstream result of a chain of processing operations that includes an output of the one or more machine-learned models.

At 1406, example method 1400 can include receiving an evaluation signal associated with the output. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s).

At 1408, example method 1400 can include updating the machine-learned model using the evaluation signal. For example, values for parameters of the machine-learned model(s) can be learned, in some embodiments, using various training or learning techniques, such as, for example, backwards propagation. For example, the evaluation signal can be backpropagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Example method 1400 can include implementing a number of generalization techniques (e.g., weight decays, dropouts, etc.) to improve the generalization capability of the models being trained.

In some implementations, example method 1400 can be implemented for training a machine-learned model from an initialized state to a fully trained state (e.g., when the model exhibits a desired performance profile, such as based on accuracy, precision, recall, etc.).

In some implementations, example method 1400 can be implemented for particular stages of a training procedure. For instance, in some implementations, example method 1400 can be implemented for pre-training a machine-learned model. Pre-training can include, for instance, large-scale training over potentially noisy data to achieve a broad base of performance levels across a variety of tasks/data types. In some implementations, example method 1400 can be implemented for fine-tuning a machine-learned model. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on user feedback on model performance during use.

Figure 15:
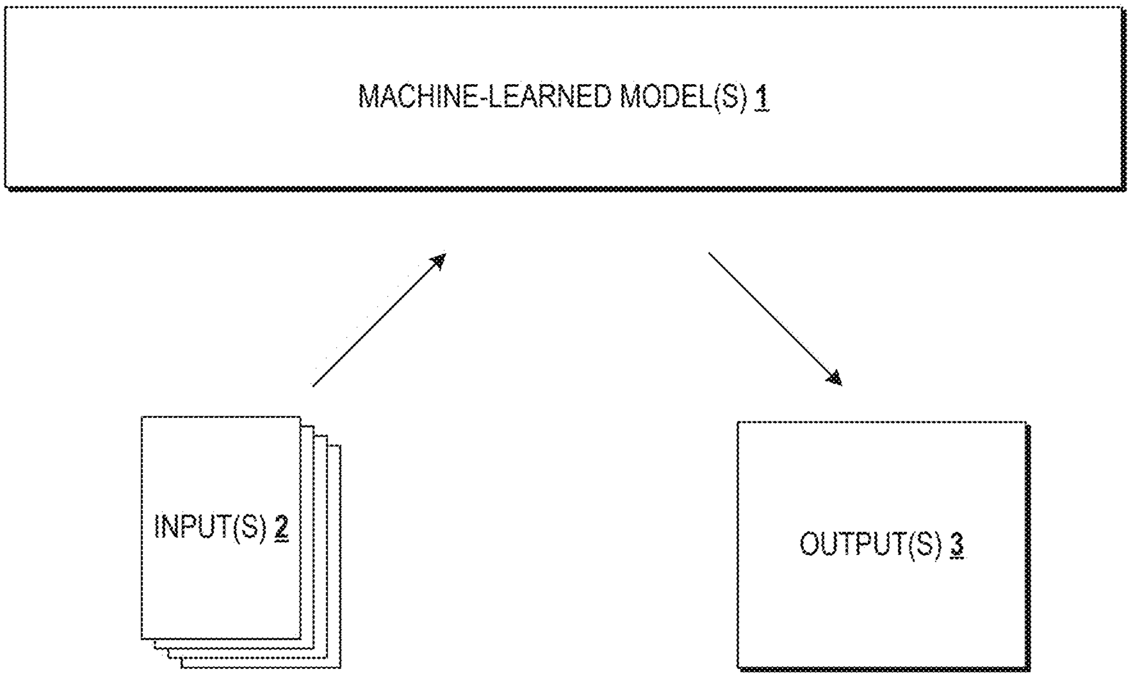
FIG. 15 depicts a block diagram of an example processing flow for using machine-learned model(s) to process input(s) to generate output(s) according to example implementations of aspects of the present disclosure.

FIG. 15 is a block diagram of an example processing flow for using machine-learned model(s) 1 to process input(s) 2 to generate output(s) 3.

Machine-learned model(s) 1 can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) 1 can include a single or multiple instances of the same model configured to operate on data from input(s) 2. Machine-learned model(s) 1 can include an ensemble of different models that can cooperatively interact to process data from input(s) 2. For example, machine-learned model(s) 1 can employ a mixture-of-experts structure. See, e.g., Zhou et al., *Mixture-of-Experts with Expert Routing Routing*, ARXIV: 2202.09368v2 (Oct. 14, 2022).

Input(s) 2 can generally include or otherwise represent various types of data. Input(s) 2 can include one type or many different types of data. Output(s) 3 can be data of the same type(s) or of different types of data as compared to input(s) 2. Output(s) 3 can include one type or many different types of data.

Example data types for input(s) 2 or output(s) 3 include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audiovisual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs 2 or outputs 3, example combinations of data types include image data and audio data, image data and natural language data, natural language data and software code data, image data and biometric data, sensor data and medical data, etc. It is to be understood that any combination of data types in an input 2 or an output 3 can be present.

An example input 2 can include one or multiple data types, such as the example data types noted above. An example output 3 can include one or multiple data types, such as the example data types noted above. The data type(s) of input 2 can be the same as or different from the data type(s) of output 3. It is to be understood that the example data types noted above are provided for illustrative purposes only. Data types contemplated within the scope of the present disclosure are not limited to those examples noted above.

Figure 16:
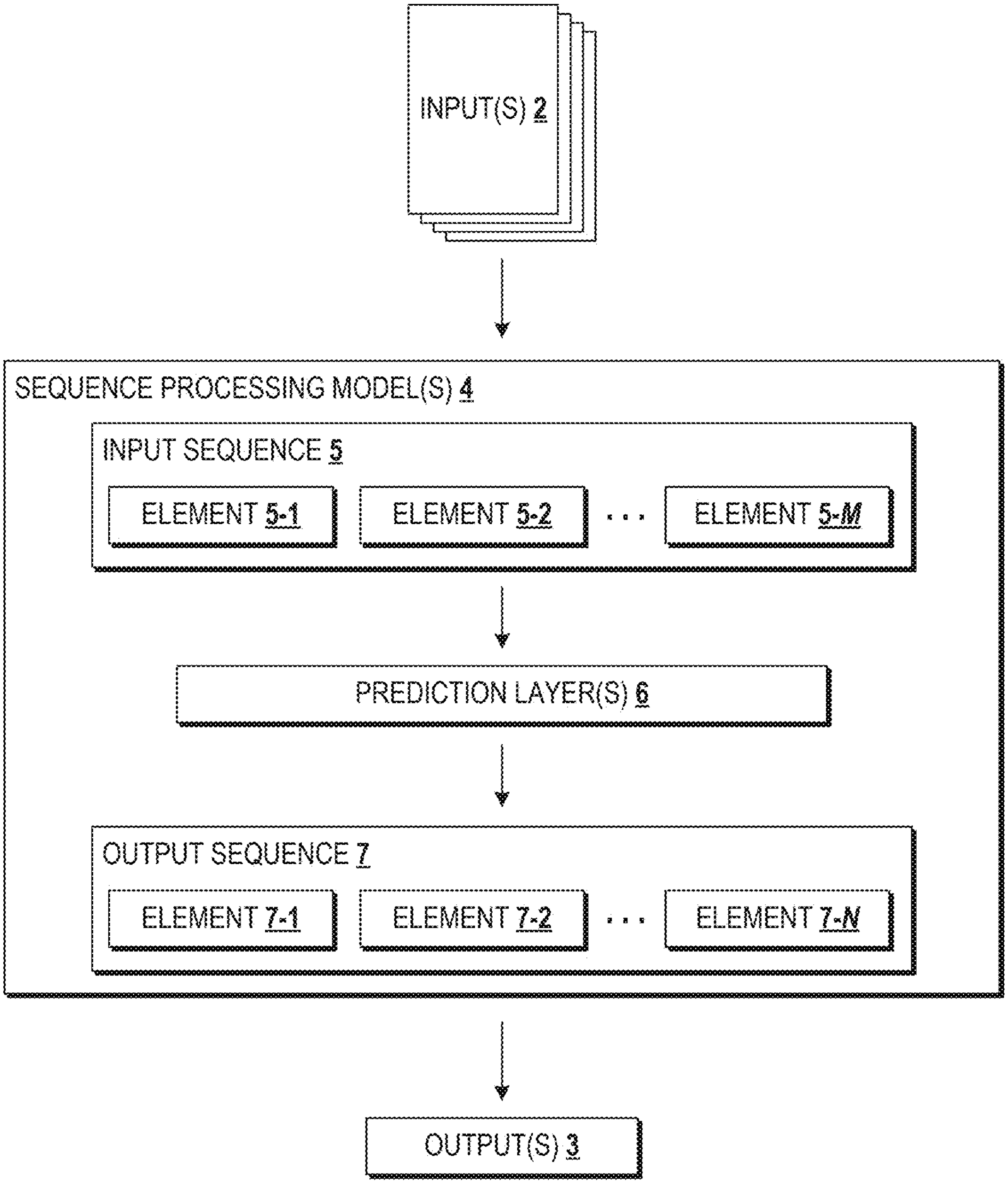
FIG. 16 depicts a block diagram of an example sequence processing model according to example implementations of aspects of the present disclosure.

FIG. 16 is a block diagram of an example implementation of an example machine-learned model configured to process sequences of information. For instance, an example implementation of machine-learned model(s) 1 can include machine-learned sequence processing model(s) 4. An example system can pass input(s) 2 to sequence processing model(s) 4. Sequence processing model(s) 4 can include one or more machine-learned components. Sequence processing model(s) 4 can process the data from input(s) 2 to obtain an input sequence 5. Input sequence 5 can include one or more input elements 5-1, 5-2, . . . , 5-M, etc. obtained from input(s) 2. Sequence processing model 4 can process input sequence 5 using prediction layer(s) 6 to generate an output sequence 7. Output sequence 7 can include one or more output elements 7-1, 7-2, . . . , 7-N, etc. generated based on input sequence 5. The system can generate output(s) 3 based on output sequence 7.

Sequence processing model(s) 4 can include one or multiple machine-learned model components configured to ingest, generate, or otherwise reason over sequences of information. For example, some example sequence processing models in the text domain are referred to as "Large Language Models," or LLMs. See, e.g., PaLM 2 Technical Report, GOOGLE, https://ai.google/static/documents/palm2techreport.pdf (n.d.). Other example sequence processing models can operate in other domains, such as image domains, see, e.g., Dosovitskiy et al., *An Image is Worth* 16×16 *Words: Transformers for Image Recognition at Scale*, ARXIV:2010.11929v2 (Jun. 3, 2021), audio domains, e.g. e.g., Agostinelli et al., *MusicLM: Generating Music From Text*, ARXIV:2301.11325v1 (Jan. 26, 2023), biochemical domains, see, e.g., Jumper et al., Highly accurate protein structure prediction with AlphaFold, 596 Nature 583 (Aug. 26, 2021), by way of example. Sequence processing model(s) 4 can process one or multiple types of data simultaneously. Sequence processing model(s) 4 can include relatively large models (e.g., more parameters, computationally expensive, etc.), relatively small models (e.g., fewer parameters, computationally lightweight, etc.), or both.

In general, sequence processing model(s) 4 can obtain input sequence 5 using data from input(s) 2. For instance, input sequence 5 can include a representation of data from input(s) 2 in a format understood by sequence processing model(s) 4. One or more machine-learned components of sequence processing model(s) 4 can ingest the data from input(s) 2, parse the data into pieces compatible with the processing architectures of sequence processing model(s) 4 (e.g., via "tokenization"), and project the pieces into an input space associated with prediction layer(s) 6 (e.g., via "embedding").

Sequence processing model(s) 4 can ingest the data from input(s) 2 and parse the data into a sequence of elements to obtain input sequence 5. For example, a portion of input data from input(s) 2 can be broken down into pieces that collectively represent the content of the portion of the input data. The pieces can provide the elements of the sequence.

Elements 5-1, 5-2, . . . , 5-M can represent, in some cases, building blocks for capturing or expressing meaningful information in a particular data domain. For instance, the elements can describe "atomic units" across one or more domains. For example, for textual input source(s), the elements can correspond to groups of one or more words or sub-word components, such as sets of one or more characters.

For example, elements 5-1, 5-2, . . . , 5-M can represent tokens obtained using a tokenizer. For instance, a tokenizer can process a given portion of an input source and output a series of tokens (e.g., corresponding to input elements 5-1, 5-2, . . . , 5-M) that represent the portion of the input source. Various approaches to tokenization can be used. For instance, textual input source(s) can be tokenized using a byte-pair encoding (BPE) technique. See, e.g., Kudo et al., *SentencePiece: A simple and language independent subword tokenizer and detokenizer for Neural Text Processing*, PROCEEDINGS OF THE 2018 CONFERENCE ON EMPIRICAL METHODS IN NATURAL LANGUAGE PROCESSING (System Demonstrations), pages 66-71 (Oct. 31-Nov. 4, 2018), https://aclanthology.org/D18-2012.pdf. Image-based input source(s) can be tokenized by extracting and serializing patches from an image.

In general, arbitrary data types can be serialized and processed into input sequence 5. It is to be understood that element(s) 5-1, 5-2, . . . , 5-M depicted in FIG. 16 can be the tokens or can be the embedded representations thereof.

Prediction layer(s) 6 can predict one or more output elements 7-1, 7-2, . . . , 7-N based on the input elements. Prediction layer(s) 6 can include one or more machine-learned model architectures, such as one or more layers of learned parameters that manipulate and transform the input (s) to extract higher-order meaning from, and relationships between, input element(s) 5-1, 5-2, . . . , 5-M. In this manner, for instance, example prediction layer(s) 6 can predict new output element(s) in view of the context provided by input sequence 5.

Prediction layer(s) 6 can evaluate associations between portions of input sequence 5 and a particular output element. These associations can inform a prediction of the likelihood that a particular output follows the input context. For example, consider the textual snippet, "The carpenter's toolbox was small and heavy. It was full of ______." Example prediction layer(s) 6 can identify that "It" refers back to "toolbox" by determining a relationship between the respective embeddings. Example prediction layer(s) 6 can also link "It" to the attributes of the toolbox, such as "small" and "heavy." Based on these associations, prediction layer(s) 6 can, for instance, assign a higher probability to the word "nails" than to the word "sawdust."

A transformer is an example architecture that can be used in prediction layer(s) 4. See, e.g., Vaswani et al., *Attention Is All Need Need*, ARXIV:1706.03762v7 (Aug. 2, 2023). A transformer is an example of a machine-learned model architecture that uses an attention mechanism to compute associations between items within a context window. The context window can include a sequence that contains input sequence 5 and potentially one or more output element(s) 7-1, 7-2, . . . , 7-N. A transformer block can include one or more attention layer(s) and one or more post-attention layer(s) (e.g., feedforward layer(s), such as a multi-layer perceptron).

Prediction layer(s) 6 can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layer(s) 6 can leverage various kinds of artificial neural networks that can understand or generate sequences of information.

Output sequence 7 can include or otherwise represent the same or different data types as input sequence 5. For instance, input sequence 5 can represent textual data, and output sequence 7 can represent textual data. Input sequence 5 can represent image, audio, or audiovisual data, and output sequence 7 can represent textual data (e.g., describing the image, audio, or audiovisual data). It is to be understood that prediction layer(s) 6, and any other interstitial model components of sequence processing model(s) 4, can be configured to receive a variety of data types in input sequence(s) 5 and output a variety of data types in output sequence(s) 7.

Output sequence 7 can have various relationships to input sequence 5. Output sequence 7 can be a continuation of input sequence 5. Output sequence 7 can be complementary to input sequence 5. Output sequence 7 can translate, transform, augment, or otherwise modify input sequence 5. Output sequence 7 can answer, evaluate, confirm, or otherwise respond to input sequence 5. Output sequence 7 can implement (or describe instructions for implementing) an instruction provided via input sequence 5.

Output sequence 7 can be generated autoregressively. For instance, for some applications, an output of one or more prediction layer(s) 6 can be passed through one or more output layers (e.g., softmax layer) to obtain a probability distribution over an output vocabulary (e.g., a textual or symbolic vocabulary) conditioned on a set of input elements in a context window. In this manner, for instance, output sequence 7 can be autoregressively generated by sampling a likely next output element, adding that element to the context window, and re-generating the probability distribution based on the updated context window, and sampling a likely next output element, and so forth.

Output sequence 7 can also be generated non-autoregressively. For instance, multiple output elements of output sequence 7 can be predicted together without explicit sequential conditioning on each other. See, e.g., Saharia et al., Non-Autoregressive Machine Translation with Latent Alignments, ARXIV:2004.07437v3 (Nov. 16, 2020).

Output sequence 7 can include one or multiple portions or elements. In an example content generation configuration, output sequence 7 can include multiple elements corresponding to multiple portions of a generated output sequence (e.g., a textual sentence, values of a discretized waveform, computer code, etc.). In an example classification configuration, output sequence 7 can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

Figure 17:
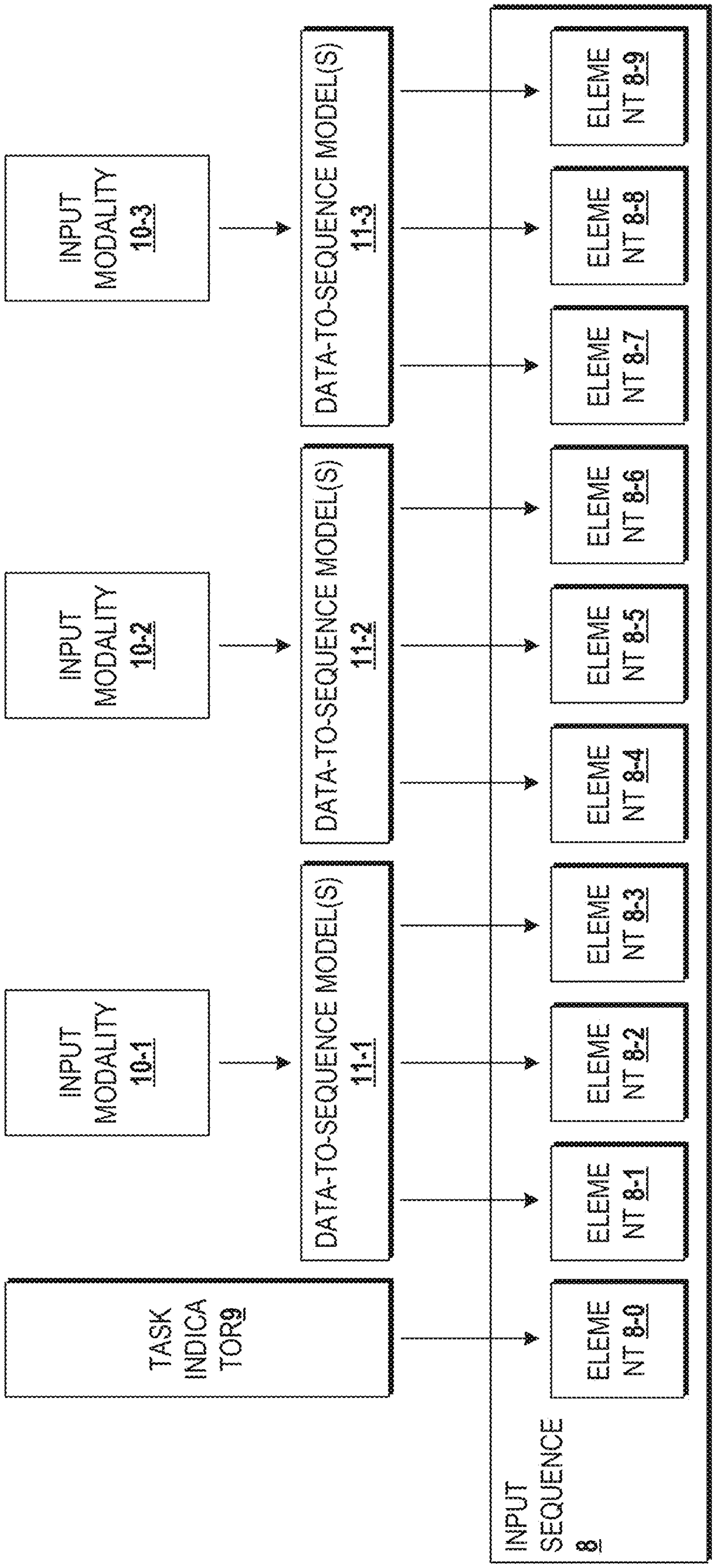
FIG. 17 depicts a block diagram of an example technique for populating an example input sequence for processing by a sequence processing model according to example implementations of aspects of the present disclosure.

FIG. 17 is a block diagram of an example technique for populating an example input sequence 8. Input sequence 8 can include various functional elements that form part of the model infrastructure, such as an element 8-0 obtained from a task indicator 9 that signals to any model(s) that process input sequence 8 that a particular task is being performed (e.g., to help adapt a performance of the model(s) to that particular task). Input sequence 8 can include various data elements from different data modalities. For instance, an input modality 10-1 can include one modality of data. A data-to-sequence model 11-1 can process data from input modality 10-1 to project the data into a format compatible with input sequence 8 (e.g., one or more vectors dimensioned according to the dimensions of input sequence 8) to obtain elements 8-1, 8-2, 8-3. Another input modality 10-2 can include a different modality of data. A data-to-sequence model 11-2 can project data from input modality 10-2 into a format compatible with input sequence 8 to obtain elements 8-4, 8-5, 8-6. Another input modality 10-3 can include yet another different modality of data. A data-to-sequence model 11-3 can project data from input modality 10-3 into a format compatible with input sequence 8 to obtain elements 8-7, 8-8, 8-9.

Input sequence 8 can be the same as or different from input sequence 5. Input sequence 8 can be a multimodal input sequence that contains elements that represent data from different modalities using a common dimensional representation. For instance, an embedding space can have P dimensions. Input sequence 8 can be configured to contain a plurality of elements that have P dimensions. In this manner, for instance, example implementations can facilitate information extraction and reasoning across diverse data modalities by projecting data into elements in the same embedding space for comparison, combination, or other computations therebetween.

For example, elements 8-0, . . . , 8-9 can indicate particular locations within a multidimensional embedding space. Some elements can map to a set of discrete locations in the embedding space. For instance, elements that correspond to discrete members of a predetermined vocabulary of tokens can map to discrete locations in the embedding space that are associated with those tokens. Other elements can be continuously distributed across the embedding space. For instance, some data types can be broken down into continuously defined portions (e.g., image patches) that can be described using continuously distributed locations within the embedding space.

In some implementations, the expressive power of the embedding space may not be limited to meanings associated with any particular set of tokens or other building blocks. For example, a continuous embedding space can encode a spectrum of high-order information. An individual piece of information (e.g., a token) can map to a particular point in that space: for instance, a token for the word "dog" can be projected to an embedded value that points to a particular location in the embedding space associated with canine-related information. Similarly, an image patch of an image of a dog on grass can also be projected into the embedding space. In some implementations, the projection of the image of the dog can be similar to the projection of the word "dog" while also having similarity to a projection of the word "grass," while potentially being different from both. In some implementations, the projection of the image patch may not exactly align with any single projection of a single word. In some implementations, the projection of the image patch can align with a combination of the projections of the words "dog" and "grass." In this manner, for instance, a high-order embedding space can encode information that can be independent of data modalities in which the information is expressed.

Task indicator 9 can include a model or model component configured to identify a task being performed and inject, into input sequence 8, an input value represented by element 8-0 that signals which task is being performed. For instance, the input value can be provided as a data type associated with an input modality and projected along with that input modality (e.g., the input value can be a textual task label that is embedded along with other textual data in the input; the input value can be a pixel-based representation of a task that is embedded along with other image data in the input; etc.). The input value can be provided as a data type that differs from or is at least independent from other input(s). For instance, the input value represented by element 8-0 can be a learned embedding within a continuous embedding space.

Input modalities 10-1, 10-2, and 10-3 can be associated with various different data types (e.g., as described above with respect to input(s) 2 and output(s) 3).

Data-to-sequence models 11-1, 11-2, and 11-3 can be the same or different from each other. Data-to-sequence models 11-1, 11-2, and 11-3 can be adapted to each respective input modality 10-1, 10-2, and 10-3. For example, a textual data-to-sequence model can subdivide a portion of input text and project the subdivisions into element(s) in input sequence 8 (e.g., elements 8-1, 8-2, 8-3, etc.). An image data-to-sequence model can subdivide an input image and project the subdivisions into element(s) in input sequence 8 (e.g., elements 8-4, 8-5, 8-6, etc.). An arbitrary datatype data-to-sequence model can subdivide an input of that arbitrary datatype and project the subdivisions into element(s) in input sequence 8 (e.g., elements 8-7, 8-8, 8-9, etc.).

Data-to-sequence models 11-1, 11-2, and 11-3 can form part of machine-learned sequence processing model(s) 4. Data-to-sequence models 11-1, 11-2, and 11-3 can be jointly trained with or trained independently from machine-learned sequence processing model(s) 4. Data-to-sequence models 11-1, 11-2, and 11-3 can be trained end-to-end with machine-learned sequence processing model(s) 4.

Figure 18:
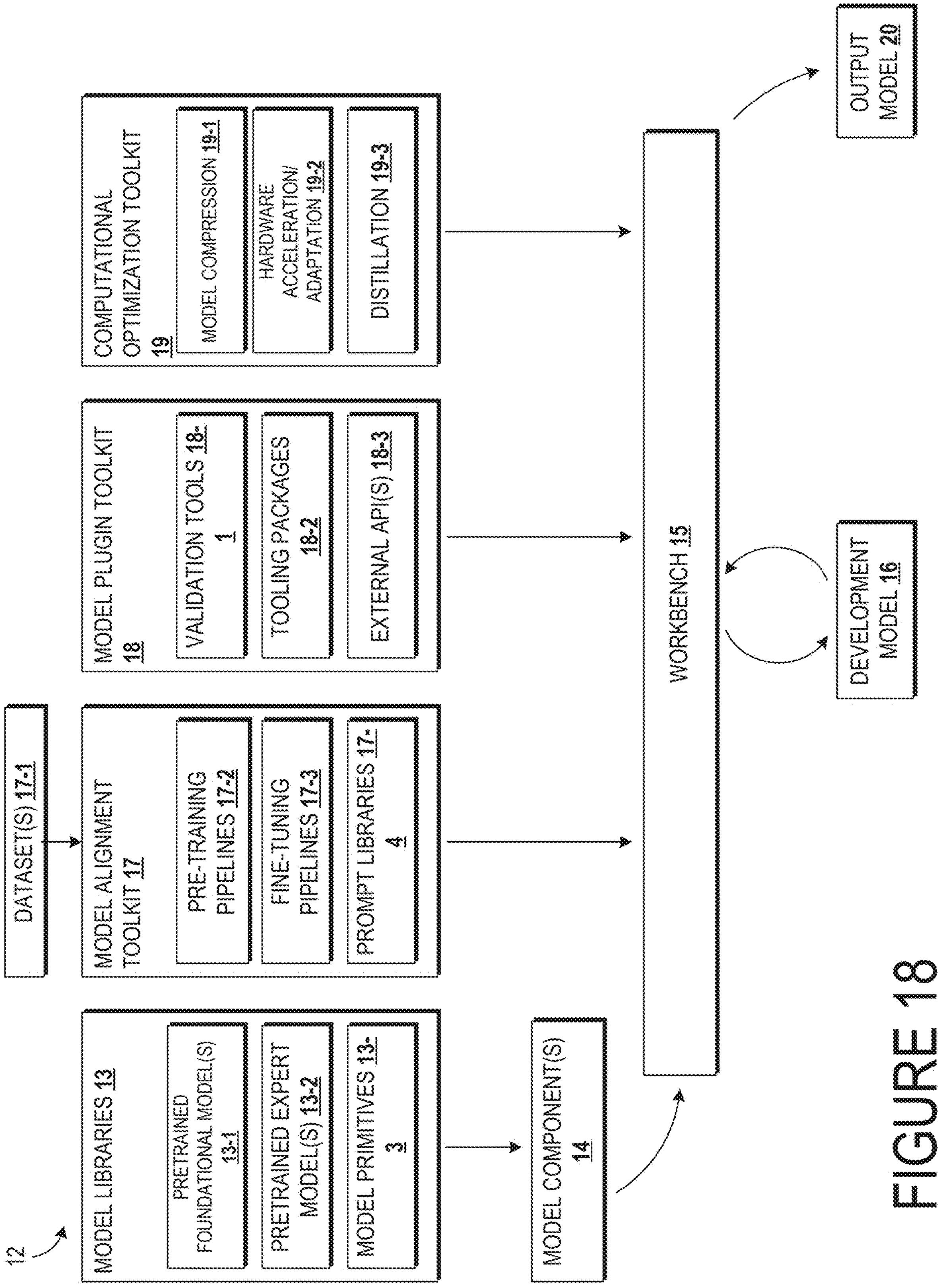
FIG. 18 depicts a block diagram of an example model development platform according to example implementations of aspects of the present disclosure.

FIG. 18 is a block diagram of an example model development platform 12 that can facilitate creation, adaptation, and refinement of example machine-learned models (e.g., machine-learned model(s) 1, sequence processing model(s) 4, etc.). Model development platform 12 can provide a number of different toolkits that developer systems can employ in the development of new or adapted machine-learned models.

Model development platform 12 can provide one or more model libraries 13 containing building blocks for new models. Model libraries 13 can include one or more pre-trained foundational models 13-1, which can provide a backbone of processing power across various tasks. Model libraries 13 can include one or more pre-trained expert models 13-2, which can be focused on performance in particular domains of expertise. Model libraries 13 can include various model primitives 13-3, which can provide low-level architectures or components (optionally pre-trained), which can be assembled in various arrangements as desired.

Model development platform 12 can receive selections of various model components 14. Model development platform 12 can pass selected model components 14 to a workbench 15 that combines selected model components 14 into a development model 16.

Workbench 15 can facilitate further refinement and adaptation of development model 16 by leveraging a number of different toolkits integrated with model development platform 12. For example, workbench 15 can facilitate alignment of the development model 16 with a desired performance profile on various tasks using a model alignment toolkit 17.

Model alignment toolkit 17 can provide a number of tools for causing development model 16 to generate outputs aligned with desired behavioral characteristics. Alignment can include increasing an accuracy, precision, recall, etc. of model outputs. Alignment can include enforcing output styles, schema, or other preferential characteristics of model outputs. Alignment can be general or domain-specific. For instance, a pre-trained foundational model 13-1 can begin with an initial level of performance across multiple domains. Alignment of the pre-trained foundational model 13-1 can include improving a performance in a particular domain of information or tasks (e.g., even at the expense of performance in another domain of information or tasks).

Model alignment toolkit 17 can integrate one or more dataset(s) 17-1 for aligning development model 16. Curated dataset(s) 17-1 can include labeled or unlabeled training data. Dataset(s) 17-1 can be obtained from public domain datasets. Dataset(s) 17-1 can be obtained from private datasets associated with one or more developer system(s) for the alignment of bespoke machine-learned model(s) customized for private use-cases.

Pre-training pipelines 17-2 can include a machine-learned model training workflow configured to update development model 16 over large-scale, potentially noisy datasets. For example, pre-training can leverage unsupervised learning techniques (e.g., de-noising, etc.) to process large numbers of training instances to update model parameters from an initialized state and achieve a desired baseline performance. Pre-training pipelines 17-2 can leverage unlabeled datasets in dataset(s) 17-1 to perform pre-training. Workbench 15 can implement a pre-training pipeline 17-2 to pre-train development model 16.

Fine-tuning pipelines 17-3 can include a machine-learned model training workflow configured to refine the model parameters of development model 16 with higher-quality data. Fine-tuning pipelines 17-3 can update development model 16 by conducting supervised training with labeled dataset(s) in dataset(s) 17-1. Fine-tuning pipelines 17-3 can update development model 16 by conducting reinforcement learning using reward signals from user feedback signals. Workbench 15 can implement a fine-tuning pipeline 17-3 to fine-tune development model 16.

Prompt libraries 17-4 can include sets of inputs configured to induce behavior aligned with desired performance criteria. Prompt libraries 17-4 can include few-shot prompts (e.g., inputs providing examples of desired model outputs for prepending to a desired runtime query), chain-of-thought prompts (e.g., inputs providing step-by-step reasoning within the exemplars to facilitate thorough reasoning by the model), and the like.

Example prompts can be retrieved from an available repository of prompt libraries 17-4. Example prompts can be contributed by one or more developer systems using workbench 15.

In some implementations, pre-trained or fine-tuned models can achieve satisfactory performance without exemplars in the inputs. For instance, zero-shot prompts can include inputs that lack exemplars. Zero-shot prompts can be within a domain within a training dataset or outside of the training domain(s).

Prompt libraries 17-4 can include one or more prompt engineering tools. Prompt engineering tools can provide workflows for retrieving or learning optimized prompt values. Prompt engineering tools can facilitate directly learning prompt values (e.g., input element values) based on one or more training iterations. Workbench 15 can implement prompt engineering tools in development model 16.

Prompt libraries 17-4 can include pipelines for prompt generation. For example, inputs can be generated using development model 16 itself or other machine-learned models. In this manner, for instance, a first model can process information about a task and output an input for a second model to process in order to perform a step of the task. The second model can be the same as or different from the first model. Workbench 15 can implement prompt generation pipelines in development model 16.

Prompt libraries 17-4 can include pipelines for context injection. For instance, a performance of development model 16 on a particular task can improve if provided with additional context for performing the task. Prompt libraries 17-4 can include software components configured to identify desired context, retrieve the context from an external source (e.g., a database, a sensor, etc.), and add the context to the input prompt. Workbench 15 can implement context injection pipelines in development model 16.

Although various training examples described herein with respect to model development platform 12 refer to "pre-training" and "fine-tuning," it is to be understood that model alignment toolkit 17 can generally support a wide variety of training techniques adapted for training a wide variety of machine-learned models. Example training techniques can correspond to the example training method 1400 described above.

Model development platform 12 can include a model plugin toolkit 18. Model plugin toolkit 18 can include a variety of tools configured for augmenting the functionality of a machine-learned model by integrating the machine-learned model with other systems, devices, and software components. For instance, a machine-learned model can use tools to increase performance quality where appropriate. For instance, deterministic tasks can be offloaded to dedicated tools in lieu of probabilistically performing the task with an increased risk of error. For instance, instead of autoregressively predicting the solution to a system of equations, a machine-learned model can recognize a tool to call for obtaining the solution and pass the system of equations to the appropriate tool. The tool can be a traditional system of equations solver that can operate deterministically to resolve the system of equations. The output of the tool can be returned in response to the original query. In this manner, tool use can allow some example models to focus on the strengths of machine-learned models—e.g., understanding an intent in an unstructured request for a task—while augmenting the performance of the model by offloading certain tasks to a more focused tool for rote application of deterministic algorithms to a well-defined problem.

Model plugin toolkit 18 can include validation tools 18-1. Validation tools 18-1 can include tools that can parse and confirm output(s) of a machine-learned model. Validation tools 18-1 can include engineered heuristics that establish certain thresholds applied to model outputs. For example, validation tools 18-1 can ground the outputs of machine-learned models to structured data sources (e.g., to mitigate "hallucinations").

Model plugin toolkit 18 can include tooling packages 18-2 for implementing one or more tools that can include scripts or other executable code that can be executed alongside development model 16. Tooling packages 18-2 can include one or more inputs configured to cause machine-learned model(s) to implement the tools (e.g., few-shot prompts that induce a model to output tool calls in the proper syntax, etc.). Tooling packages 18-2 can include, for instance, fine-tuning training data for training a model to use a tool.

Model plugin toolkit 18 can include interfaces for calling external application programming interfaces (APIs) 18-3. For instance, in addition to or in lieu of implementing tool calls or tool code directly with development model 16, development model 16 can be aligned to output instruction that initiate API calls to send or obtain data via external systems.

Model plugin toolkit 18 can integrate with prompt libraries 17-4 to build a catalog of available tools for use with development model 16. For instance, a model can receive, in an input, a catalog of available tools, and the model can generate an output that selects a tool from the available tools and initiates a tool call for using the tool.

Model development platform 12 can include a computational optimization toolkit 19 for optimizing a computational performance of development model 16. For instance, tools for model compression 19-1 can allow development model 16 to be reduced in size while maintaining a desired level of performance. For instance, model compression 19-1 can include quantization workflows, weight pruning and sparsification techniques, etc. Tools for hardware acceleration 19-2 can facilitate the configuration of the model storage and execution formats to operate optimally on different hardware resources. For instance, hardware acceleration 19-2 can include tools for optimally sharding models for distributed processing over multiple processing units for increased bandwidth, lower unified memory requirements, etc. Tools for distillation 19-3 can provide for the training of lighter-weight models based on the knowledge encoded in development model 16. For instance, development model 16 can be a highly performant, large machine-learned model optimized using model development platform 12. To obtain a lightweight model for running in resource-constrained environments, a smaller model can be a "student model" that learns to imitate development model 16 as a "teacher model." In this manner, for instance, the investment in learning the parameters and configurations of development model 16 can be efficiently transferred to a smaller model for more efficient inference.

Workbench 15 can implement one, multiple, or none of the toolkits implemented in model development platform 12. Workbench 15 can output an output model 20 based on development model 16. Output model 20 can be a deployment version of development model 16. Output model 20 can be a development or training checkpoint of development model 16. Output model 20 can be a distilled, compressed, or otherwise optimized version of development model 16.

Figure 19:
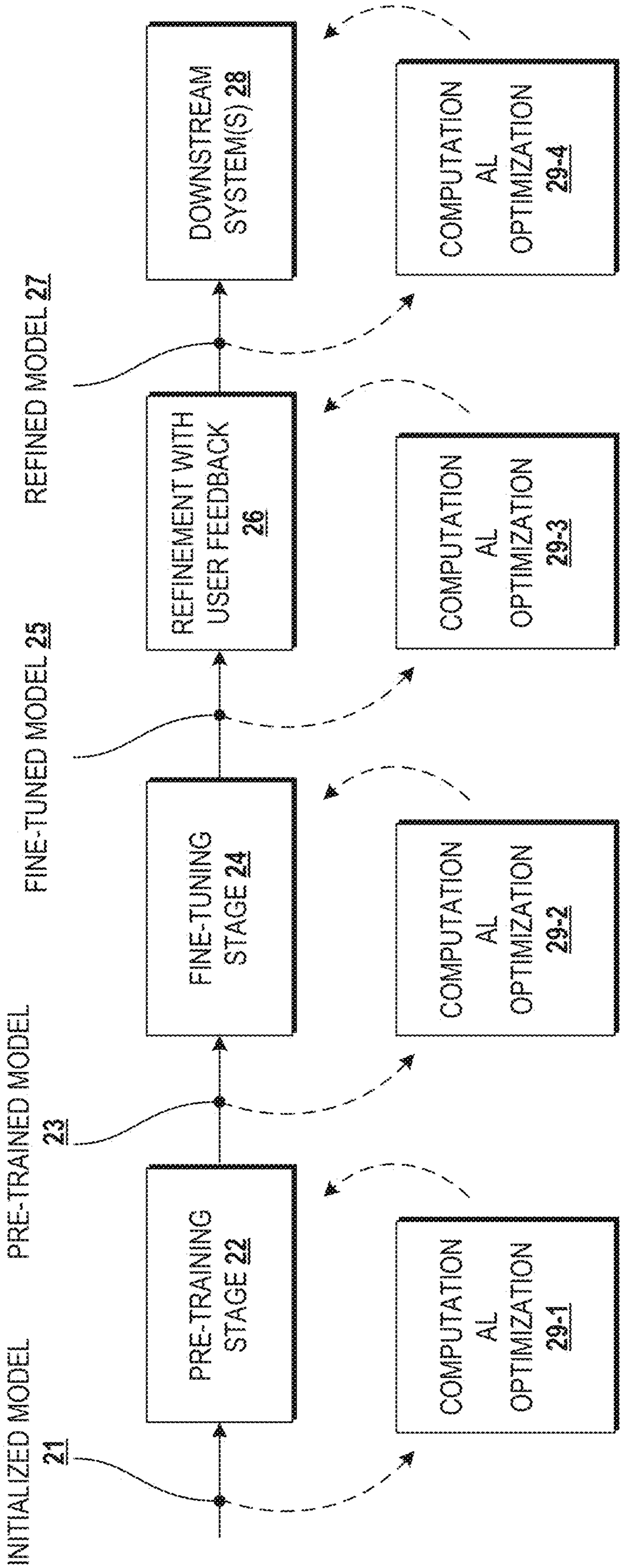
FIG. 19 depicts a block diagram of an example training workflow for training a machine-learned model according to example implementations of aspects of the present disclosure.

FIG. 19 is a block diagram of an example training flow for training a machine-learned development model 16. One or more portion(s) of the example training flow can be implemented by a computing system that includes one or more computing devices such as, for example, computing systems described with reference to the other figures. Each respective portion of the example training flow can be performed by any (or any combination) of one or more computing devices. Moreover, one or more portion(s) of the example training flow can be implemented on the hardware components of the device(s) described herein, for example, to train one or more systems or models. FIG. 19 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 19 is described with reference to elements/terms described with respect to other systems and figures for exemplary illustrated purposes and is not meant to be limiting. One or more portions of the example training flow can be performed additionally, or alternatively, by other systems.

Initially, development model 16 can persist in an initial state as an initialized model 21. Development model 16 can be initialized with weight values. Initial weight values can be random or based on an initialization schema. Initial weight values can be based on prior pre-training for the same or for a different model.

Initialized model 21 can undergo pre-training in a pre-training stage 22. Pre-training stage 22 can be implemented using one or more pre-training pipelines 17-2 over data from dataset(s) 17-1. Pre-training can be omitted, for example, if initialized model 21 is already pre-trained (e.g., development model 16 contains, is, or is based on a pre-trained foundational model or an expert model).

Pre-trained model 23 can then be a new version of development model 16, which can persist as development model 16 or as a new development model. Pre-trained model 23 can be the initial state if development model 16 was already pre-trained. Pre-trained model 23 can undergo fine-tuning in a fine-tuning stage 24. Fine-tuning stage 24 can be implemented using one or more fine-tuning pipelines 17-3 over data from dataset(s) 17-1. Fine-tuning can be omitted, for example, if a pre-trained model as satisfactory performance, if the model was already fine-tuned, or if other tuning approaches are preferred.

Fine-tuned model 29 can then be a new version of development model 16, which can persist as development model 16 or as a new development model. Fine-tuned model 29 can be the initial state if development model 16 was already fine-tuned. Fine-tuned model 29 can undergo refinement with user feedback 26. For instance, refinement with user feedback 26 can include reinforcement learning, optionally based on human feedback from human users of fine-tuned model 25. As reinforcement learning can be a form of fine-tuning, it is to be understood that fine-tuning stage 24 can subsume the stage for refining with user feedback 26. Refinement with user feedback 26 can produce a refined model 27. Refined model 27 can be output to downstream system(s) 28 for deployment or further development.

In some implementations, computational optimization operations can be applied before, during, or after each stage. For instance, initialized model 21 can undergo computational optimization 29-1 (e.g., using computational optimization toolkit 19) before pre-training stage 22. Pre-trained model 23 can undergo computational optimization 29-2 (e.g., using computational optimization toolkit 19) before fine-tuning stage 24. Fine-tuned model 25 can undergo computational optimization 29-3 (e.g., using computational optimization toolkit 19) before refinement with user feedback 26. Refined model 27 can undergo computational optimization 29-4 (e.g., using computational optimization toolkit 19) before output to downstream system(s) 28. Computational optimization(s) 29-1, . . . , 29-4 can all be the same, all be different, or include at least some different optimization techniques.

Figure 20:
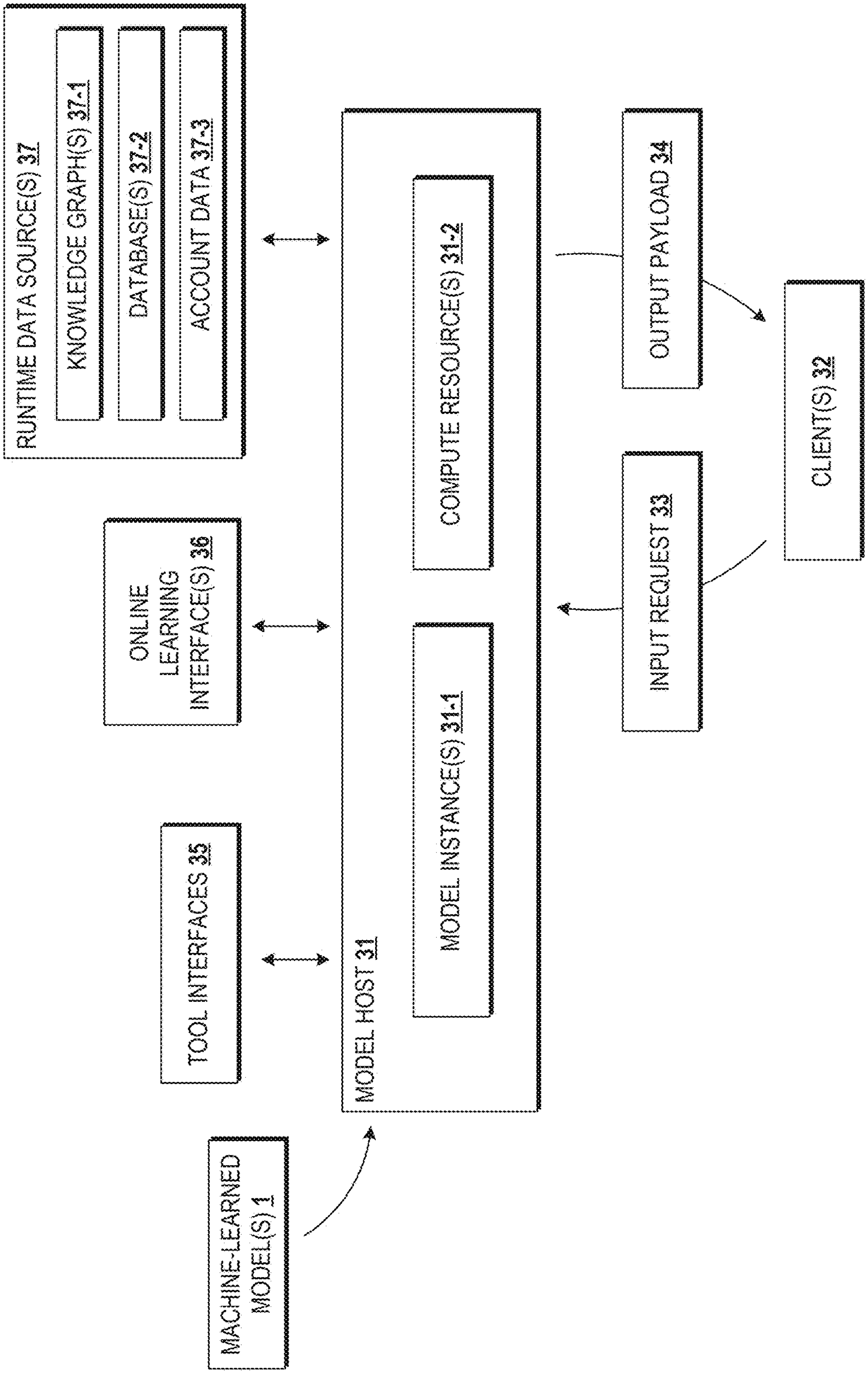
FIG. 20 depicts a block diagram of an inference system for operating one or more machine-learned model(s) to perform inference according to example implementations of aspects of the present disclosure.

FIG. 20 is a block diagram of an inference system for operating one or more machine-learned model(s) 1 to perform inference (e.g., for training, for deployment, etc.). A model host 31 can receive machine-learned model(s) 1. Model host 31 can host one or more model instance(s) 31-1, which can be one or multiple instances of one or multiple models. Model host 31 can host model instance(s) 31-1 using available compute resources 31-2 associated with model host 31.

Model host 31 can perform inference on behalf of one or more client(s) 32. Client(s) 32 can transmit an input request 33 to model host 31. Using input request 33, model host 31 can obtain input(s) 2 for input to machine-learned model(s) 1. Machine-learned model(s) 1 can process input(s) 2 to generate output(s) 3. Using output(s) 3, model host 31 can return an output payload 34 for responding to input request 33 from client(s) 32. Output payload 34 can include or be based on output(s) 3.

Model host 31 can leverage various other resources and tools to augment the inference task. For instance, model host 31 can communicate with tool interfaces 35 to facilitate tool use by model instance(s) 31-1. Tool interfaces 35 can include local or remote APIs. Tool interfaces 35 can include integrated scripts or other software functionality. Model host 31 can engage online learning interface(s) 36 to facilitate ongoing improvements to machine-learned model(s) 1. For instance, online learning interface(s) 36 can be used within reinforcement learning loops to retrieve user feedback on inferences served by model host 31. Model host 31 can access runtime data source(s) 37 for augmenting input(s) 2 with additional contextual information. For instance, runtime data source(s) 37 can include a knowledge graph 37-1 that facilitates structured information retrieval for information associated with input request(s) 33 (e.g., a search engine service). Runtime data source(s) 37 can include public or private, external or local database(s) 37-2 that can store information associated with input request(s) 33 for augmenting input(s) 2. Runtime data source(s) 37 can include account data 37-3 which can be retrieved in association with a user account corresponding to a client 32 for customizing the behavior of model host 31 accordingly.

Model host 31 can be implemented by one or multiple computing devices or systems. Client(s) 2 can be implemented by one or multiple computing devices or systems, which can include computing devices or systems shared with model host 31.

For example, model host 31 can operate on a server system that provides a machine-learning service to client device(s) that operate client(s) 32 (e.g., over a local or wide-area network). Client device(s) can be end-user devices used by individuals. Client device(s) can be server systems that operate client(s) 32 to provide various functionality as a service to downstream end-user devices.

In some implementations, model host 31 can operate on a same device or system as client(s) 32. Model host 31 can be a machine-learning service that runs on-device to provide machine-learning functionality to one or multiple applications operating on a client device, which can include an application implementing client(s) 32. Model host 31 can be a part of a same application as client(s) 32. For instance, model host 31 can be a subroutine or method implemented by one part of an application, and client(s) 32 can be another subroutine or method that engages model host 31 to perform inference functions within the application. It is to be understood that model host 31 and client(s) 32 can have various different configurations.

Model instance(s) 31-1 can include one or more machine-learned models that are available for performing inference. Model instance(s) 31-1 can include weights or other model components that are stored in persistent storage, temporarily cached, or loaded into high-speed memory. Model instance(s) 31-1 can include multiple instance(s) of the same model (e.g., for parallel execution of more requests on the same model). Model instance(s) 31-1 can include instance(s) of different model(s). Model instance(s) 31-1 can include cached intermediate states of active or inactive model(s) used to accelerate inference of those models. For instance, an inference session with a particular model may generate significant amounts of computational results that can be re-used for future inference runs (e.g., using a KV cache for transformer-based models). These computational results can be saved in association with that inference session so that session can be executed more efficiently when resumed.

Compute resource(s) 31-2 can include one or more processors (central processing units, graphical processing units, tensor processing units, machine-learning accelerators, etc.) connected to one or more memory devices. Compute resource(s) 31-2 can include a dynamic pool of available resources shared with other processes. Compute resource(s) 31-2 can include memory devices large enough to fit an entire model instance in a single memory instance. Compute resource(s) 31-2 can also share model instance(s) across multiple memory devices (e.g., using data parallelization or tensor parallelization, etc.). This can be done to increase parallelization or to execute a large model using multiple memory devices which individually might not be able to fit the entire model into memory.

Input request 33 can include data for input(s) 2. Model host 31 can process input request 33 to obtain input(s) 2. Input(s) 2 can be obtained directly from input request 33 or can be retrieved using input request 33. Input request 33 can be submitted to model host 31 via an API.

Model host 31 can perform inference over batches of input requests 33 in parallel. For instance, a model instance 31-1 can be configured with an input structure that has a batch dimension. Separate input(s) 2 can be distributed across the batch dimension (e.g., rows of an array). The separate input(s) 2 can include completely different contexts. The separate input(s) 2 can be multiple inference steps of the same task. The separate input(s) 2 can be staggered in an input structure, such that any given inference cycle can be operating on different portions of the respective input(s) 2. In this manner, for instance, model host 31 can perform inference on the batch in parallel, such that output(s) 3 can also contain the batch dimension and return the inference results for the batched input(s) 2 in parallel. In this manner, for instance, batches of input request(s) 33 can be processed in parallel for higher throughput of output payload(s) 34.

Output payload 34 can include or be based on output(s) 3 from machine-learned model(s) 1. Model host 31 can process output(s) 3 to obtain output payload 34. This can include chaining multiple rounds of inference (e.g., iteratively, recursively, across the same model(s) or different model(s)) to arrive at a final output for a task to be returned in output payload 34. Output payload 34 can be transmitted to client(s) 32 via an API.

Online learning interface(s) 36 can facilitate reinforcement learning of machine-learned model(s) 1. Online learning interface(s) 36 can facilitate reinforcement learning with human feedback (RLHF). Online learning interface(s) 36 can facilitate federated learning of machine-learned model(s) 1.

Model host 31 can execute machine-learned model(s) 1 to perform inference for various tasks using various types of data. For example, various different input(s) 2 and output(s) 3 can be used for various different tasks. In some implementations, input(s) 2 can be or otherwise represent image data. Machine-learned model(s) 1 can process the image data to generate an output. As an example, machine-learned model(s) 1 can process the image data to generate an image recognition output (e.g., a recognition of the image data, a latent embedding of the image data, an encoded representation of the image data, a hash of the image data, etc.). As another example, machine-learned model(s) 1 can process the image data to generate an image segmentation output. As another example, machine-learned model(s) 1 can process the image data to generate an image classification output. As another example, machine-learned model(s) 1 can process the image data to generate an image data modification output (e.g., an alteration of the image data, etc.). As another example, machine-learned model(s) 1 can process the image data to generate an encoded image data output (e.g., an encoded and/or compressed representation of the image data, etc.). As another example, machine-learned model(s) 1 can process the image data to generate an upscaled image data output. As another example, machine-learned model(s) 1 can process the image data to generate a prediction output.

In some implementations, the task is a computer vision task. In some cases, input(s) 2 includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, input(s) 2 can be or otherwise represent natural language data. Machine-learned model(s) 1 can process the natural language data to generate an output. As an example, machine-learned model(s) 1 can process the natural language data to generate a language encoding output. As another example, machine-learned model(s) 1 can process the natural language data to generate a latent text embedding output. As another example, machine-learned model(s) 1 can process the natural language data to generate a translation output. As another example, machine-learned model(s) 1 can process the natural language data to generate a classification output. As another example, machine-learned model(s) 1 can process the natural language data to generate a textual segmentation output. As another example, machine-learned model(s) 1 can process the natural language data to generate a semantic intent output. As another example, machine-learned model(s) 1 can process the natural language data to generate an upscaled text or natural language output (e.g., text or natural language data that is higher quality than the input text or natural language, etc.). As another example, machine-learned model(s) 1 can process the natural language data to generate a prediction output (e.g., one or more predicted next portions of natural language content).

In some implementations, input(s) 2 can be or otherwise represent speech data (e.g., data describing spoken natural language, such as audio data, textual data, etc.). Machine-learned model(s) 1 can process the speech data to generate an output. As an example, machine-learned model(s) 1 can process the speech data to generate a speech recognition output. As another example, machine-learned model(s) 1 can process the speech data to generate a speech translation output. As another example, machine-learned model(s) 1 can process the speech data to generate a latent embedding output. As another example, machine-learned model(s) 1 can process the speech data to generate an encoded speech output (e.g., an encoded and/or compressed representation of the speech data, etc.). As another example, machine-learned model(s) 1 can process the speech data to generate an upscaled speech output (e.g., speech data that is higher quality than the input speech data, etc.). As another example, machine-learned model(s) 1 can process the speech data to generate a textual representation output (e.g., a textual representation of the input speech data, etc.). As another example, machine-learned model(s) 1 can process the speech data to generate a prediction output.

In some implementations, input(s) 2 can be or otherwise represent latent encoding data (e.g., a latent space representation of an input, etc.). Machine-learned model(s) 1 can process the latent encoding data to generate an output. As an example, machine-learned model(s) 1 can process the latent encoding data to generate a recognition output. As another example, machine-learned model(s) 1 can process the latent encoding data to generate a reconstruction output. As another example, machine-learned model(s) 1 can process the latent encoding data to generate a search output. As another example, machine-learned model(s) 1 can process the latent encoding data to generate a reclustering output. As another example, machine-learned model(s) 1 can process the latent encoding data to generate a prediction output.

In some implementations, input(s) 2 can be or otherwise represent statistical data. Statistical data can be, represent, or otherwise include data computed and/or calculated from some other data source. Machine-learned model(s) 1 can process the statistical data to generate an output. As an example, machine-learned model(s) 1 can process the statistical data to generate a recognition output. As another example, machine-learned model(s) 1 can process the statistical data to generate a prediction output. As another example, machine-learned model(s) 1 can process the statistical data to generate a classification output. As another example, machine-learned model(s) 1 can process the statistical data to generate a segmentation output. As another example, machine-learned model(s) 1 can process the statistical data to generate a visualization output. As another example, machine-learned model(s) 1 can process the statistical data to generate a diagnostic output.

In some implementations, input(s) 2 can be or otherwise represent sensor data. Machine-learned model(s) 1 can process the sensor data to generate an output. As an example, machine-learned model(s) 1 can process the sensor data to generate a recognition output. As another example, machine-learned model(s) 1 can process the sensor data to generate a prediction output. As another example, machine-learned model(s) 1 can process the sensor data to generate a classification output. As another example, machine-learned model(s) 1 can process the sensor data to generate a segmentation output. As another example, machine-learned model(s) 1 can process the sensor data to generate a visualization output. As another example, machine-learned model(s) 1 can process the sensor data to generate a diagnostic output. As another example, machine-learned model(s) 1 can process the sensor data to generate a detection output.

In some implementations, machine-learned model(s) 1 can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data). In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some implementations, the task is a generative task, and machine-learned model(s) 1 can be configured to output content generated in view of input(s) 2. For instance, input(s) 2 can be or otherwise represent data of one or more modalities that encodes context for generating additional content.

In some implementations, the task can be a text completion task. Machine-learned model(s) 1 can be configured to process input(s) 2 that represent textual data and to generate output(s) 3 that represent additional textual data that completes a textual sequence that includes input(s) 2. For instance, machine-learned model(s) 1 can be configured to generate output(s) 3 to complete a sentence, paragraph, or portion of text that follows from a portion of text represented by input(s) 2.

In some implementations, the task can be an instruction following task. Machine-learned model(s) 1 can be configured to process input(s) 2 that represent instructions to perform a function and to generate output(s) 3 that advance a goal of satisfying the instruction function (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the instructions (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the instructions (e.g., natural language responses, programming language responses, machine language responses, etc.). One or more output(s) 3 can be iteratively or recursively generated to sequentially process and accomplish steps toward accomplishing the requested functionality. For instance, an initial output can be executed by an external system or be processed by machine-learned model(s) 1 to complete an initial step of performing a function. Multiple steps can be performed, with a final output being obtained that is responsive to the initial instructions.

In some implementations, the task can be a question answering task. Machine-learned model(s) 1 can be configured to process input(s) 2 that represent a question to answer and to generate output(s) 3 that advance a goal of returning an answer to the question (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the question (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the question (e.g., natural language responses, programming language responses, machine language responses, etc.). One or more output(s) 3 can be iteratively or recursively generated to sequentially process and accomplish steps toward answering the question. For instance, an initial output can be executed by an external system or be processed by machine-learned model(s) 1 to complete an initial step of obtaining an answer to the question (e.g., querying a database, performing a computation, executing a script, etc.). Multiple steps can be performed, with a final output being obtained that is responsive to the question.

In some implementations, the task can be an image generation task. Machine-learned model(s) 1 can be configured to process input(s) 2 that represent context regarding a desired portion of image content. The context can include text data, image data, audio data, etc. Machine-learned model(s) 1 can be configured to generate output(s) 3 that represent image data that depicts imagery related to the context. For instance, machine-learned model(s) 1 can be configured to generate pixel data of an image. Values for channel(s) associated with the pixels in the pixel data can be selected based on the context (e.g., based on a probability determined based on the context).

In some implementations, the task can be an audio generation task. Machine-learned model(s) 1 can be configured to process input(s) 2 that represent context regarding a desired portion of audio content. The context can include text data, image data, audio data, etc. Machine-learned model(s) 1 can be configured to generate output(s) 3 that represent audio data related to the context. For instance, machine-learned model(s) 1 can be configured to generate waveform data in the form of an image (e.g., a spectrogram). Values for channel(s) associated with pixels of the image can be selected based on the context. Machine-learned model(s) 1 can be configured to generate waveform data in the form of a sequence of discrete samples of a continuous waveform. Values of the sequence can be selected based on the context (e.g., based on a probability determined based on the context).

In some implementations, the task can be a data generation task. Machine-learned model(s) 1 can be configured to process input(s) 2 that represent context regarding a desired portion of data (e.g., data from various data domains, such as sensor data, image data, multimodal data, statistical data, etc.). The desired data can be, for instance, synthetic data for training other machine-learned models. The context can include arbitrary data type(s). Machine-learned model(s) 1 can be configured to generate output(s) 3 that represent data that aligns with the desired data. For instance, machine-learned model(s) 1 can be configured to generate data values for populating a dataset. Values for the data object(s) can be selected based on the context (e.g., based on a probability determined based on the context).

Figure 21:
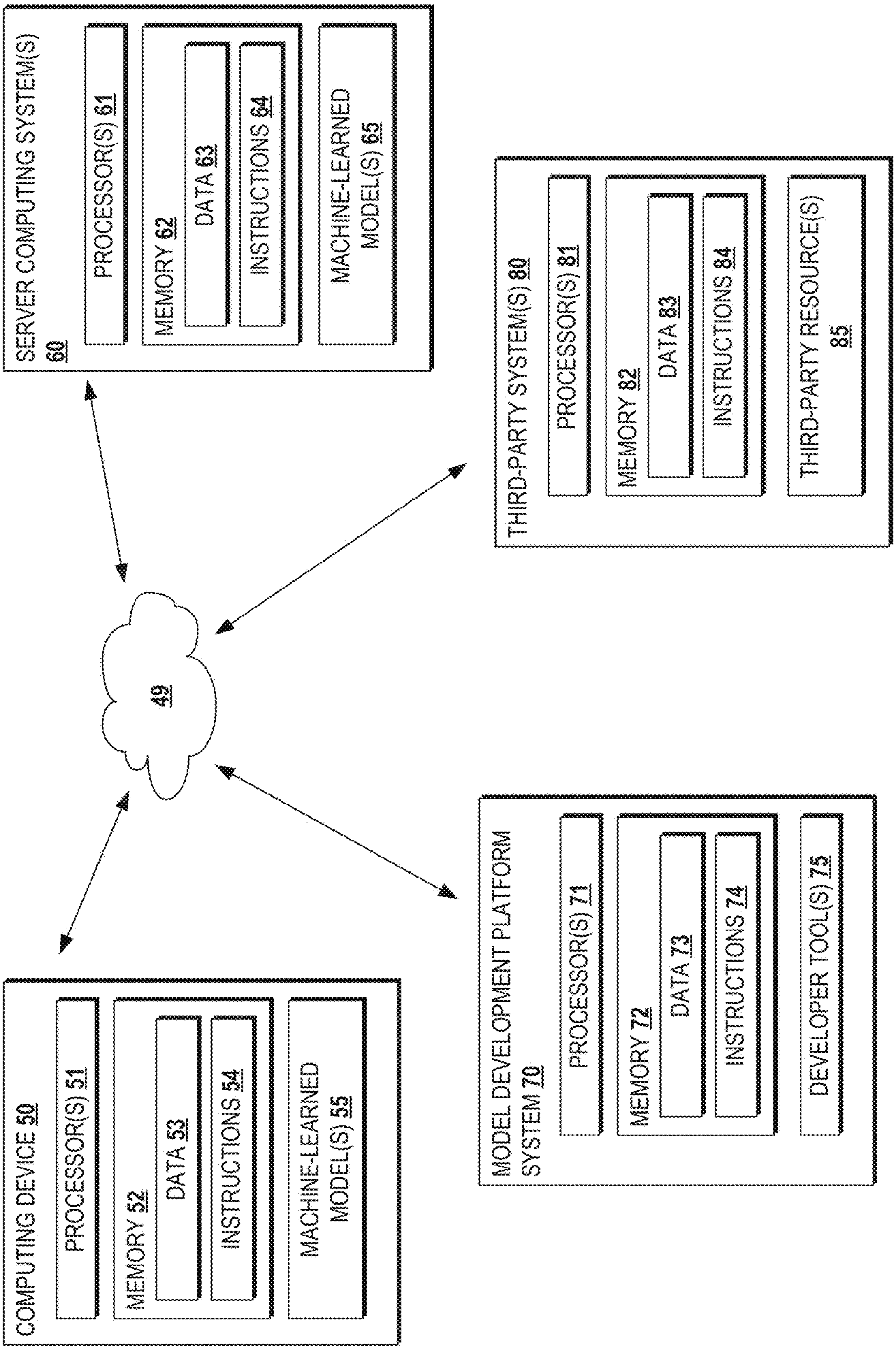
FIG. 21 depicts a block diagram of an example networked computing system according to example implementations of aspects of the present disclosure.

FIG. 21 is a block diagram of an example networked computing system that can perform aspects of example implementations of the present disclosure. The system can include a number of computing devices and systems that are communicatively coupled over a network 49. An example computing device 50 is described to provide an example of a computing device that can perform any aspect of the present disclosure (e.g., implementing model host 31, client(s) 32, or both). An example server computing system 60 is described as an example of a server computing system that can perform any aspect of the present disclosure (e.g., implementing model host 31, client(s) 32, or both). Computing device 50 and server computing system(s) 60 can cooperatively interact (e.g., over network 49) to perform any aspect of the present disclosure (e.g., implementing model host 31, client(s) 32, or both). Model development platform system 70 is an example system that can host or serve model development platform(s) 12 for development of machine-learned models. Third-party system(s) 80 are example system(s) with which any of computing device 50, server computing system(s) 60, or model development platform system(s) 70 can interact in the performance of various aspects of the present disclosure (e.g., engaging third-party tools, accessing third-party databases or other resources, etc.).

Network 49 can be any type of communications network, such as a local area network (e.g., intranet), wide area network (e.g., Internet), or some combination thereof and can include any number of wired or wireless links. In general, communication over network 49 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL). Network 49 can also be implemented via a system bus. For instance, one or more devices or systems of FIG. 21 can be co-located with, contained by, or otherwise integrated into one or more other devices or systems.

Computing device 50 can be any type of computing device, such as, for example, a personal computing device (e.g., laptop or desktop), a mobile computing device (e.g., smartphone or tablet), a gaming console or controller, a wearable computing device, an embedded computing device, a server computing device, a virtual machine operating on a host device, or any other type of computing device. Computing device 50 can be a client computing device. Computing device 50 can be an end-user computing device. Computing device 50 can be a computing device of a service provided that provides a service to an end user (who may use another computing device to interact with computing device 50).

Computing device 50 can include one or more processors 51 and a memory 52. Processor(s) 51 can be any suitable processing device (e.g., a processor core, a microprocessor, an ASIC, an FPGA, a controller, a microcontroller, etc.) and can be one processor or a plurality of processors that are operatively connected. Memory 52 can include one or more non-transitory computer-readable storage media, such as HBM, RAM, ROM, EEPROM, EPROM, flash memory devices, magnetic disks, etc., and combinations thereof. Memory 52 can store data 53 and instructions 54 which can be executed by processor(s) 51 to cause computing device 50 to perform operations. The operations can implement any one or multiple features described herein. The operations can implement example methods and techniques described herein.

Computing device 50 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, camera, LIDAR, a physical keyboard or other buttons, or other means by which a user can provide user input.

Computing device 50 can store or include one or more machine-learned models 55. Machine-learned models 55 can include one or more machine-learned model(s) 1, such as a sequence processing model 4. Machine-learned models 55 can include one or multiple model instance(s) 31-1. Machine-learned model(s) 55 can be received from server computing system(s) 60, model development platform system 70, third party system(s) 80 (e.g., an application distribution platform), or developed locally on computing device 50. Machine-learned model(s) 55 can be loaded into memory 52 and used or otherwise implemented by processor(s) 51. Computing device 50 can implement multiple parallel instances of machine-learned model(s) 55.

Server computing system(s) 60 can include one or more processors 61 and a memory 62. Processor(s) 61 can be any suitable processing device (e.g., a processor core, a microprocessor, an ASIC, an FPGA, a controller, a microcontroller, etc.) and can be one processor or a plurality of processors that are operatively connected. Memory 62 can include one or more non-transitory computer-readable storage media, such as HBM, RAM, ROM, EEPROM, EPROM, flash memory devices, magnetic disks, etc., and combinations thereof. Memory 62 can store data 63 and instructions 64 which can be executed by processor(s) 61 to cause server computing system(s) 60 to perform operations. The operations can implement any one or multiple features described herein. The operations can implement example methods and techniques described herein.

In some implementations, server computing system 60 includes or is otherwise implemented by one or multiple server computing devices. In instances in which server computing system 60 includes multiple server computing devices, such server computing devices can operate according to sequential computing architectures, parallel computing architectures, or some combination thereof.

Server computing system 60 can store or otherwise include one or more machine-learned models 65. Machine-learned model(s) 65 can be the same as or different from machine-learned model(s) 55. Machine-learned models 65 can include one or more machine-learned model(s) 1, such as a sequence processing model 4. Machine-learned models 65 can include one or multiple model instance(s) 31-1. Machine-learned model(s) 65 can be received from computing device 50, model development platform system 70, third party system(s) 80, or developed locally on server computing system(s) 60. Machine-learned model(s) 65 can be loaded into memory 62 and used or otherwise implemented by processor(s) 61. Server computing system(s) 60 can implement multiple parallel instances of machine-learned model(s) 65.

In an example configuration, machine-learned models 65 can be included in or otherwise stored and implemented by server computing system 60 to establish a client-server relationship with computing device 50 for serving model inferences. For instance, server computing system(s) 60 can implement model host 31 on behalf of client(s) 32 on computing device 50. For instance, machine-learned models 65 can be implemented by server computing system 60 as a portion of a web service (e.g., remote machine-learned model hosting service, such as an online interface for performing machine-learned model operations over a network on server computing system(s) 60). For instance, server computing system(s) 60 can communicate with computing device 50 over a local intranet or internet connection. For instance, computing device 50 can be a workstation or endpoint in communication with server computing system(s) 60, with implementation of machine-learned models 65 being managed by server computing system(s) 60 to remotely perform inference (e.g., for runtime or training operations), with output(s) returned (e.g., cast, streamed, etc.) to computing device 50. Machine-learned models 65 can work cooperatively or interoperatively with machine-learned models 55 on computing device 50 to perform various tasks.

Model development platform system(s) 70 can include one or more processors 71 and a memory 72. Processor(s) 71 can be any suitable processing device (e.g., a processor core, a microprocessor, an ASIC, an FPGA, a controller, a microcontroller, etc.) and can be one processor or a plurality of processors that are operatively connected. Memory 72 can include one or more non-transitory computer-readable storage media, such as HBM, RAM, ROM, EEPROM, EPROM, flash memory devices, magnetic disks, etc., and combinations thereof. Memory 72 can store data 73 and instructions 74 which can be executed by processor(s) 71 to cause model development platform system(s) 70 to perform operations. The operations can implement any one or multiple features described herein. The operations can implement example methods and techniques described herein. Example operations include the functionality described herein with respect to model development platform 12. This and other functionality can be implemented by developer tool(s) 75.

Third-party system(s) 80 can include one or more processors 81 and a memory 82. Processor(s) 81 can be any suitable processing device (e.g., a processor core, a microprocessor, an ASIC, an FPGA, a controller, a microcontroller, etc.) and can be one processor or a plurality of processors that are operatively connected. Memory 82 can include one or more non-transitory computer-readable storage media, such as HBM, RAM, ROM, EEPROM, EPROM, flash memory devices, magnetic disks, etc., and combinations thereof. Memory 82 can store data 83 and instructions 84 which can be executed by processor(s) 81 to cause third-party system(s) 80 to perform operations. The operations can implement any one or multiple features described herein. The operations can implement example methods and techniques described herein. Example operations include the functionality described herein with respect to tools and other external resources called when training or performing inference with machine-learned model(s) 1, 4, 16, 20, 55, 65, etc. (e.g., third-party resource(s) 85).

FIG. 21 illustrates one example arrangement of computing systems that can be used to implement the present disclosure. Other computing system configurations can be used as well. For example, in some implementations, one or both of computing system 50 or server computing system(s) 60 can implement all or a portion of the operations of model development platform system 70. For example, computing system 50 or server computing system(s) 60 can implement developer tool(s) 75 (or extensions thereof) to develop, update/train, or refine machine-learned models 1, 4, 16, 20, 55, 65, etc. using one or more techniques described herein with respect to model alignment toolkit 17. In this manner, for instance, computing system 50 or server computing system(s) 60 can develop, update/train, or refine machine-learned models based on local datasets (e.g., for model personalization/customization, as permitted by user data preference selections).

Figure 22:
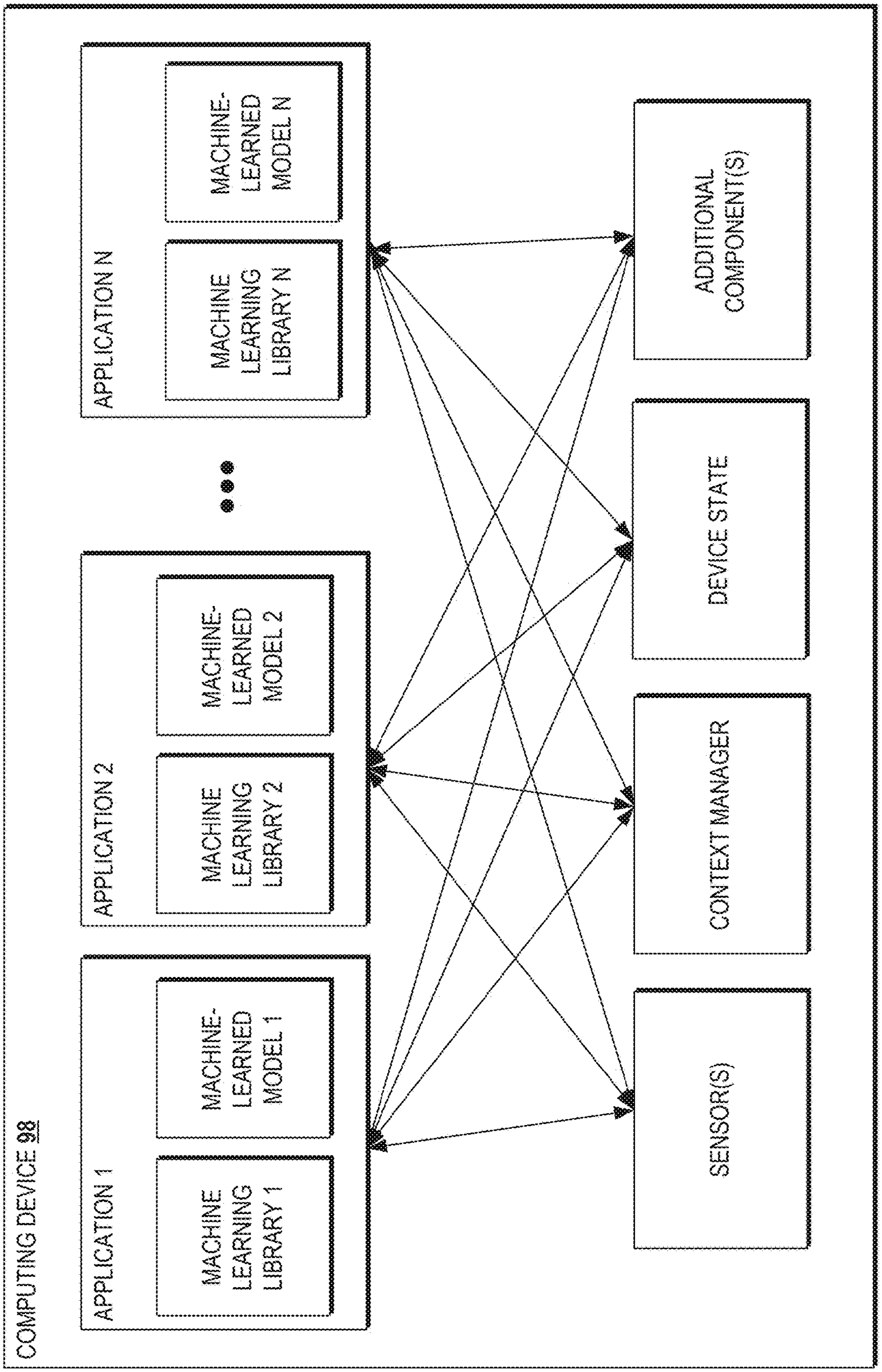
FIG. 22 depicts a block diagram of an example computing device according to example implementations of aspects of the present disclosure.

FIG. 22 is a block diagram of an example computing device 98 that performs according to example embodiments of the present disclosure. Computing device 98 can be a user computing device or a server computing device (e.g., computing device 50, server computing system(s) 60, etc.). Computing device 98 can implement model host 31. For instance, computing device 98 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 22, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 23:
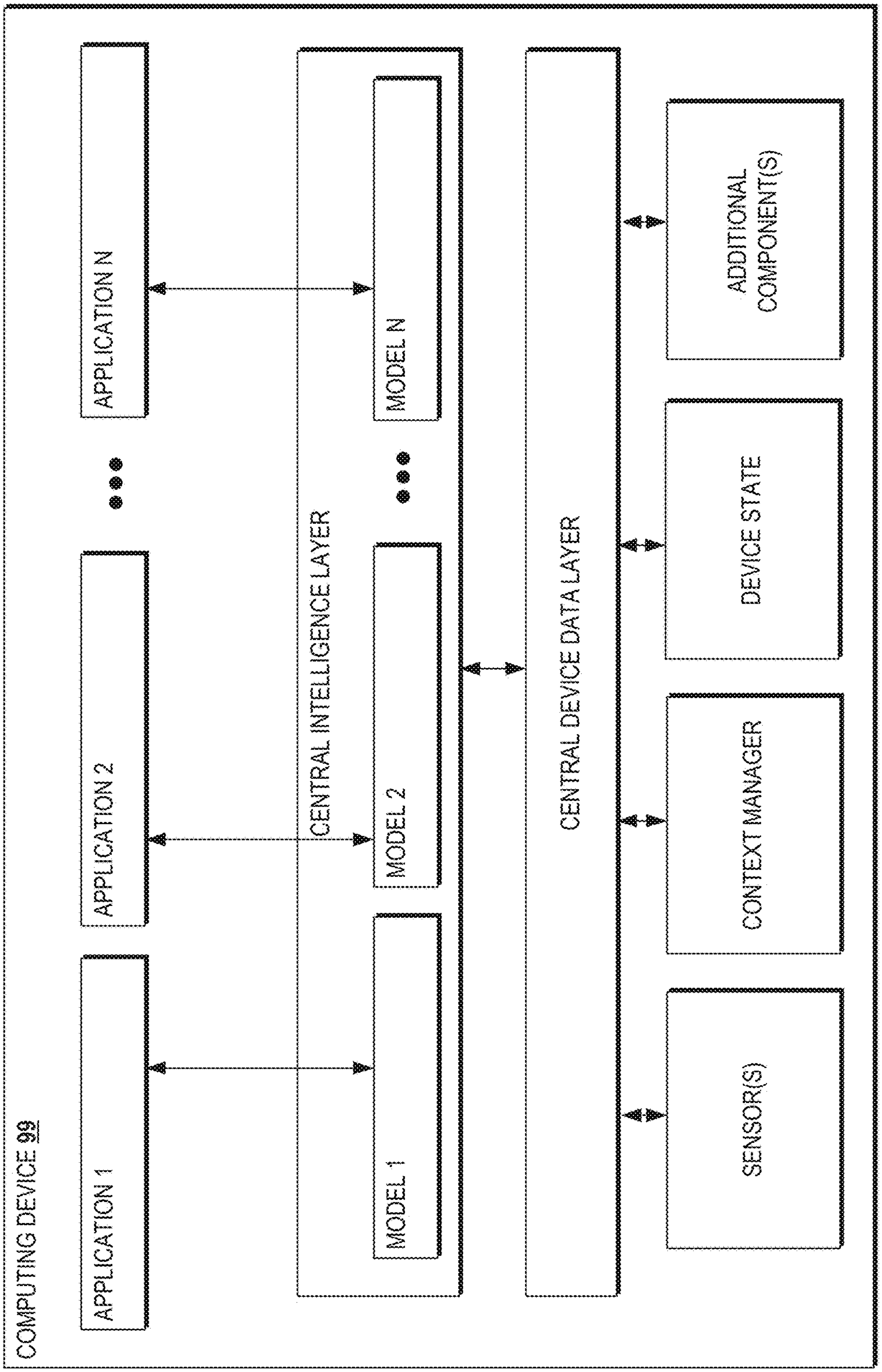
FIG. 23 depicts a block diagram of an example computing device according to example implementations of aspects of the present disclosure.

FIG. 23 is a block diagram of an example computing device 99 that performs according to example embodiments of the present disclosure. Computing device 99 can be the same as or different from computing device 98. Computing device 99 can be a user computing device or a server computing device (e.g., computing device 50, server computing system(s) 60, etc.). Computing device 98 can implement model host 31. For instance, computing device 99 can include a number of applications (e.g., applications 1 through N). Each application can be in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 23, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of computing device 99.

The central intelligence layer can communicate with a central device data layer. The central device data layer can be a centralized repository of data for computing device 99. As illustrated in FIG. 23, the central device data layer can communicate with a number of other components of the computing device, such as, for example, one or more sensors, a context manager, a device state component, or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y"

should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computer-implemented method for personal data indexing and search, the method comprising:

obtaining, by a computing system comprising one or more processors, a search query from a user computing device associated with a particular user;

processing, by the computing system, the search query with one or more machine-learned planning models to generate one or more first application programming interface calls, wherein the one or more first programming interface calls comprise one or more first queries and instructions to interface with one or more first application-specific index datasets of a plurality of different server-side application-specific index datasets;

performing, by the computing system, the one or more first application programming interface calls to obtain one or more first result sets;

processing, by the computing system, the search query and the one or more first result sets with the one or more machine-learned planning models to generate one or more second application programming interface calls and to determine one or more on-device datasets to search, wherein the one or more second programming interface calls comprises one or more second queries and instructions to interface with one or more second application-specific index datasets of the plurality of different server-side application-specific index datasets;

performing, by the computing system, the one or more second application programming interface calls to obtain one or more second result sets;

processing, by the computing system, the search query, the one or more first result sets, and the one or more second result sets with one or more generative response models to generate one or more model-generated responses to the search query, wherein the one or more model-generated responses comprise details of the one or more first result sets and the one or more second result sets in a natural language response to one or more prompts of the search query; and transmitting, by the computing system, the one or more model-generated responses along with planning data descriptive of the one or more on-device datasets to search to the user computing device associated with the particular user.

2. The method of claim 1, further comprising:

obtaining, by the computing system, a plurality of personal datasets from a plurality of different applications associated with a plurality of different profiles associated with the particular user;

processing, by the computing system, the plurality of personal datasets to generate the plurality of different server-side application-specific index datasets; and storing, by the computing system, plurality of different server-side application-specific index datasets in association with one or more personal identifiers associated with the particular user.

3. The method of claim 2, wherein the one or more personal identifiers are associated with a centralized profile of the particular user, wherein the centralized profile comprises information descriptive of biographical data of the particular user.

4. The method of claim 3, wherein the one or more machine-learned planning models are communicatively connected with the centralized profile, and wherein predictions of the one or more machine-learned planning models are conditioned on the information of the centralized profile.

5. The method of claim 1, wherein the one or more first application programming interface calls comprise instructions for interfacing with indexed email data associated with the particular user.

6. The method of claim 5, wherein the one or more second application programming interface calls comprise instructions for interfacing with indexed image data associated with the particular user, wherein the indexed image data was obtained from a native image gallery application on the user computing device.

7. A server computing system for cross-application search, the system comprising:

one or more machine-learned planning models configured to process a query to generate predicted planning data descriptive of particular tools to utilize and particular datasets to search;

one or more server-side generative response models tuned to process queries and result datasets to generate predicted responses;

a memory comprising a plurality of different server-side application-specific index datasets, wherein the plurality of different application-specific index datasets are descriptive of personal data instances across a plurality of different application profiles associated with a particular user;

one or more processors; and one or more non-transitory computer-readable media that collectively store instructions that, when executed by the one or more processors, cause the computing system to perform operations, the operations comprising:

obtaining a search query from a user computing device associated with the particular user;

processing the search query with the one or more machine-learned planning models to generate one or more refined queries and to determine one or more particular subsets of the plurality of different server-side application-specific index datasets to search and one or more on-device datasets to search;

searching, via one or more personal data intelligence models based on one or more planning model outputs, the one or more particular subsets of the plurality of different server-side application-specific index datasets based on the one or more refined queries to determine one or more search results;

processing the search query and the one or more search results with the one or more server-side generative response models to generate one or more model-generated responses to the search query, wherein the one or more model-generated responses comprise details of the one or more search results in a natural language response to a prompt of the search query; and transmitting the one or more model-generated responses to the user computing device associated with the particular user along with planning data descriptive of the one or more on-device datasets to search.

8. The system of claim 7, further comprising: one or more application programming interfaces configured to interface with one or more application indexes based on outputs of the one or more machine-learned planning models.

9. The system of claim 8, wherein the one or more application programming interfaces interface with the personal data intelligence model to perform the search of the one or more particular subsets of the plurality of different application-specific index datasets.

10. The system of claim 7, wherein the one or more particular subsets of the plurality of different server-side application-specific index datasets comprise an email index dataset and a photo gallery index dataset.

* * * * *